US010394329B2

(12) United States Patent
Moussette et al.

(10) Patent No.: US 10,394,329 B2
(45) Date of Patent: Aug. 27, 2019

(54) DEVICES, METHODS, AND GRAPHICAL USER INTERFACES FOR HAPTIC MIXING

(71) Applicant: Apple Inc., Cupertino, CA (US)

(72) Inventors: Camille Moussette, Los Gatos, CA (US); Brian T. Gleeson, Mountain View, CA (US); John B. Morrell, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/863,765

(22) Filed: Jan. 5, 2018

(65) Prior Publication Data
US 2018/0129292 A1 May 10, 2018

Related U.S. Application Data

(63) Continuation of application No. 15/270,885, filed on Sep. 20, 2016, now Pat. No. 9,864,432.
(Continued)

(51) Int. Cl.
G06F 3/041 (2006.01)
G06F 3/01 (2006.01)
(Continued)

(52) U.S. Cl.
CPC .......... *G06F 3/016* (2013.01); *G06F 1/1684* (2013.01); *G06F 3/0481* (2013.01);
(Continued)

(58) Field of Classification Search
CPC ...... G06F 3/016; G06F 3/0481; G06F 3/0488; G06F 3/04883; G06F 3/04886;
(Continued)

(56) References Cited

U.S. PATENT DOCUMENTS 5,959,624 A 9/1999 Johnston, Jr. et al.
5,990,869 A 11/1999 Kubica et al.
(Continued)

FOREIGN PATENT DOCUMENTS

AU 2016100246 A4 4/2016
CN 101375582 A 2/2009
(Continued)

OTHER PUBLICATIONS

Dosher et al., "Human Interaction with Small Haptic Effects", University of Washington, Seattle, WA, Jun. 2005, 16 pages.
(Continued)

*Primary Examiner* — Joe H Cheng
(74) *Attorney, Agent, or Firm* — Morgan, Lewis & Bockius LLP

(57) ABSTRACT

An electronic device receives a first set of one or more inputs corresponding to user interface elements displayed on the display and a first set of one or more tactile outputs, and also receives a second set of one or more inputs corresponding to one or more hardware elements and a second set of one or more tactile outputs. In response, in accordance with a determination that the first set of one or more tactile outputs and the second set of one or more tactile outputs overlap, the device outputs, with one or more tactile output generators, a modified tactile output sequence that is modified so as to emphasize the second set of one or more tactile outputs relative to the first set of one or more tactile outputs.

42 Claims, 39 Drawing Sheets

Related U.S. Application Data

(60) Provisional application No. 62/384,113, filed on Sep. 6, 2016.

(51) Int. Cl.
*G06F 3/0481* (2013.01)
*G06F 3/0488* (2013.01)
*G06F 3/16* (2006.01)
*G06F 1/16* (2006.01)

(52) U.S. Cl.
CPC ........ *G06F 3/0488* (2013.01); *G06F 3/04883* (2013.01); *G06F 3/04886* (2013.01); *G06F 3/16* (2013.01); *G06F 3/167* (2013.01)

(58) Field of Classification Search
CPC .......... G06F 3/16; G06F 3/167; G06F 3/1684; G06F 2203/04104; G06F 2203/04808
See application file for complete search history.

(56) References Cited

U.S. PATENT DOCUMENTS

| | | | |
|---|---|---|---|
| 6,424,251 B1 | 7/2002 | Byre | |
| 6,433,771 B1 | 8/2002 | Yocum et al. | |
| 6,560,165 B1 | 5/2003 | Barker | |
| 7,130,664 B1 | 10/2006 | Williams | |
| 7,305,257 B2 | 12/2007 | Ladouceur et al. | |
| 7,308,253 B2 | 12/2007 | Moody et al. | |
| 7,469,381 B2 | 12/2008 | Ording | |
| 7,479,949 B2 | 1/2009 | Jobs et al. | |
| 7,720,213 B2 | 5/2010 | Desai et al. | |
| 7,809,406 B2 | 10/2010 | Weinans | |
| 7,978,183 B2 | 7/2011 | Rosenberg et al. | |
| 8,026,814 B1 | 9/2011 | Heinze et al. | |
| 8,131,848 B1 | 3/2012 | Denise | |
| 8,165,640 B2 | 4/2012 | Mullen | |
| 8,204,548 B1 | 6/2012 | Blinn et al. | |
| 8,207,832 B2 | 6/2012 | Yun et al. | |
| 8,209,606 B2 | 6/2012 | Ording | |
| 8,266,550 B1 | 9/2012 | Cleron et al. | |
| 8,331,268 B2 | 12/2012 | Hicks, III | |
| 8,509,856 B1 | 8/2013 | Blinn et al. | |
| 8,548,418 B1 | 10/2013 | Jintaseranee et al. | |
| 8,619,051 B2 | 12/2013 | Lacroix et al. | |
| 8,624,864 B2 | 1/2014 | Birnbaum et al. | |
| 8,659,571 B2 | 2/2014 | Birnbaum et al. | |
| 8,676,274 B2 | 3/2014 | Li | |
| 8,698,766 B2 | 4/2014 | Ali et al. | |
| 8,717,151 B2 | 5/2014 | Forutanpour et al. | |
| 8,750,296 B2 | 6/2014 | Bosschaert et al. | |
| 8,754,757 B1 | 6/2014 | Ullrich et al. | |
| 8,768,838 B1 | 7/2014 | Hoffman | |
| 8,773,356 B2 | 7/2014 | Martin et al. | |
| 8,886,252 B2 | 11/2014 | Luke et al. | |
| 8,886,576 B1 | 11/2014 | Sanketi et al. | |
| 9,088,668 B1 | 7/2015 | Salvador | |
| 9,092,953 B1 | 7/2015 | Mortimer et al. | |
| 9,100,805 B2 | 8/2015 | Oshita | |
| 9,110,529 B2 | 8/2015 | Kido | |
| 9,166,823 B2 | 10/2015 | Karmarkar | |
| 9,189,932 B2 | 11/2015 | Kerdemelidis | |
| 9,247,525 B2 | 1/2016 | Jacobs et al. | |
| 9,357,052 B2 | 5/2016 | Ullrich | |
| 9,411,422 B1 | 8/2016 | McClendon et al. | |
| 9,430,796 B1 | 8/2016 | So | |
| 9,509,829 B2 | 11/2016 | Culbert et al. | |
| 9,542,820 B2 | 1/2017 | Moussette et al. | |
| 9,548,050 B2 | 1/2017 | Gruber et al. | |
| 9,588,586 B2* | 3/2017 | Rihn ........................ | G06F 3/011 |
| 9,690,382 B1 | 6/2017 | Moussette et al. | |
| 9,830,784 B2 | 11/2017 | Moussette et al. | |
| 9,852,590 B2* | 12/2017 | Bhatia .................... | G06F 3/016 |
| 9,864,432 B1* | 1/2018 | Moussette ............... | G06F 3/016 |
| 9,928,699 B2 | 3/2018 | Moussette et al. | |
| 9,984,539 B2 | 5/2018 | Moussette et al. | |
| 10,034,129 B1 | 7/2018 | Ellis et al. | |
| 2001/0002126 A1 | 5/2001 | Rosenberg et al. | |
| 2002/0080112 A1 | 6/2002 | Braun et al. | |
| 2002/0115478 A1 | 8/2002 | Fujisawa et al. | |
| 2004/0088353 A1 | 5/2004 | Mendelsohn et al. | |
| 2004/0213401 A1 | 10/2004 | Aupperle et al. | |
| 2004/0233161 A1 | 11/2004 | Shahoian et al. | |
| 2005/0231489 A1 | 10/2005 | Ladouceur et al. | |
| 2005/0275638 A1 | 12/2005 | Kolmykov-Zotov et al. | |
| 2005/0285846 A1 | 12/2005 | Funaki | |
| 2006/0026521 A1 | 2/2006 | Hotelling et al. | |
| 2006/0026535 A1 | 2/2006 | Hotelling et al. | |
| 2006/0045252 A1 | 3/2006 | Gorti et al. | |
| 2006/0248183 A1 | 11/2006 | Barton | |
| 2007/0046627 A1 | 3/2007 | Soh et al. | |
| 2007/0055770 A1 | 3/2007 | Karmakar et al. | |
| 2007/0088560 A1 | 4/2007 | Mock et al. | |
| 2007/0106457 A1 | 5/2007 | Rosenberg | |
| 2007/0146316 A1 | 6/2007 | Poupyrev et al. | |
| 2007/0193436 A1 | 8/2007 | Chu | |
| 2007/0226646 A1 | 9/2007 | Nagiyama et al. | |
| 2007/0274503 A1 | 11/2007 | Klemm et al. | |
| 2007/0283239 A1 | 12/2007 | Morris | |
| 2008/0024459 A1 | 1/2008 | Poupyrev et al. | |
| 2008/0122796 A1 | 5/2008 | Jobs et al. | |
| 2008/0174570 A1 | 7/2008 | Jobs et al. | |
| 2008/0270931 A1 | 10/2008 | Bamford | |
| 2009/0085878 A1 | 4/2009 | Heubel et al. | |
| 2009/0128581 A1 | 5/2009 | Brid et al. | |
| 2009/0135142 A1 | 5/2009 | Fu et al. | |
| 2009/0167509 A1 | 7/2009 | Fadell et al. | |
| 2009/0167704 A1 | 7/2009 | Terlizzi et al. | |
| 2009/0178008 A1 | 7/2009 | Herz et al. | |
| 2009/0215432 A1 | 8/2009 | Matsuoka | |
| 2009/0215479 A1 | 8/2009 | Karmarkar | |
| 2009/0222902 A1 | 9/2009 | Bender et al. | |
| 2009/0231271 A1 | 9/2009 | Heubel et al. | |
| 2009/0284463 A1 | 11/2009 | Morimoto et al. | |
| 2009/0292990 A1 | 11/2009 | Park et al. | |
| 2009/0303031 A1 | 12/2009 | Strohallen et al. | |
| 2009/0322497 A1 | 12/2009 | Ku et al. | |
| 2009/0325645 A1 | 12/2009 | Bang et al. | |
| 2009/0325647 A1 | 12/2009 | Cho et al. | |
| 2010/0017489 A1 | 1/2010 | Birnbaum et al. | |
| 2010/0099445 A1 | 4/2010 | Song et al. | |
| 2010/0114974 A1 | 5/2010 | Jung et al. | |
| 2010/0141411 A1 | 6/2010 | Ahn et al. | |
| 2010/0144395 A1 | 6/2010 | Komiya | |
| 2010/0156818 A1 | 6/2010 | Burrough et al. | |
| 2010/0231367 A1 | 9/2010 | Cruz-Hernandez et al. | |
| 2010/0231534 A1 | 9/2010 | Chaudhri et al. | |
| 2010/0231537 A1 | 9/2010 | Pisula et al. | |
| 2010/0267424 A1 | 10/2010 | Kim et al. | |
| 2010/0299638 A1 | 11/2010 | Choi | |
| 2010/0302003 A1 | 12/2010 | Zellner | |
| 2010/0302042 A1 | 12/2010 | Barnett et al. | |
| 2011/0001707 A1 | 1/2011 | Faubert et al. | |
| 2011/0017828 A1 | 1/2011 | Pine | |
| 2011/0018695 A1 | 1/2011 | Bells et al. | |
| 2011/0053577 A1 | 3/2011 | Lee et al. | |
| 2011/0074695 A1 | 3/2011 | Rapp et al. | |
| 2011/0081889 A1 | 4/2011 | Gao et al. | |
| 2011/0102349 A1 | 5/2011 | Harris | |
| 2011/0126148 A1 | 5/2011 | Krishnaraj et al. | |
| 2011/0141142 A1 | 6/2011 | Leffert et al. | |
| 2011/0148608 A1 | 6/2011 | Grant et al. | |
| 2011/0179388 A1 | 7/2011 | Fleizach et al. | |
| 2011/0190595 A1 | 8/2011 | Bennett et al. | |
| 2011/0202843 A1 | 8/2011 | Morris | |
| 2011/0210926 A1 | 9/2011 | Pasquero et al. | |
| 2011/0252346 A1 | 10/2011 | Chaudhri et al. | |
| 2011/0264491 A1 | 10/2011 | Birnbaum et al. | |
| 2011/0266375 A1 | 11/2011 | Ono et al. | |
| 2011/0267181 A1 | 11/2011 | Kildal | |
| 2011/0267294 A1 | 11/2011 | Kildal | |
| 2011/0270358 A1 | 11/2011 | Davis et al. | |
| 2011/0271181 A1 | 11/2011 | Tsai et al. | |
| 2011/0279380 A1 | 11/2011 | Weber et al. | |

(56) References Cited

U.S. PATENT DOCUMENTS

| | | |
|---|---|---|
| 2011/0279381 A1 | 11/2011 | Tong et al. |
| 2011/0316698 A1 | 12/2011 | Palin et al. |
| 2012/0019365 A1 | 1/2012 | Tuikka et al. |
| 2012/0026110 A1 | 2/2012 | Yamano |
| 2012/0050324 A1 | 3/2012 | Jeong et al. |
| 2012/0056806 A1 | 3/2012 | Rosenberg et al. |
| 2012/0062491 A1 | 3/2012 | Coni et al. |
| 2012/0105367 A1 | 5/2012 | Son et al. |
| 2012/0174033 A1 | 7/2012 | Joo |
| 2012/0191704 A1 | 7/2012 | Jones |
| 2012/0216139 A1 | 8/2012 | Ording et al. |
| 2012/0229276 A1 | 9/2012 | Ronkainen |
| 2012/0249461 A1 | 10/2012 | Flanagan et al. |
| 2012/0268412 A1 | 10/2012 | Cruz-Hernandez et al. |
| 2012/0286943 A1 | 11/2012 | Rothkopf et al. |
| 2012/0286944 A1 | 11/2012 | Forutanpour et al. |
| 2012/0299857 A1 | 11/2012 | Grant et al. |
| 2012/0299859 A1 | 11/2012 | Kinoshita |
| 2012/0306631 A1 | 12/2012 | Hughes |
| 2012/0306632 A1 | 12/2012 | Fleizach et al. |
| 2012/0306790 A1 | 12/2012 | Kyung et al. |
| 2012/0311477 A1 | 12/2012 | Mattos et al. |
| 2012/0327006 A1 | 12/2012 | Israr et al. |
| 2013/0091462 A1 | 4/2013 | Gray et al. |
| 2013/0165226 A1* | 6/2013 | Thorner .................. G06F 3/011 463/37 |
| 2013/0167058 A1 | 6/2013 | Levee et al. |
| 2013/0174137 A1 | 7/2013 | Kim |
| 2013/0201115 A1 | 8/2013 | Heubel |
| 2013/0222224 A1 | 8/2013 | Eriksson et al. |
| 2013/0225300 A1 | 8/2013 | Brinlee |
| 2013/0234929 A1 | 9/2013 | Libin |
| 2013/0244633 A1 | 9/2013 | Jacobs et al. |
| 2013/0262298 A1 | 10/2013 | Morley |
| 2013/0265268 A1 | 10/2013 | Okumura et al. |
| 2013/0282325 A1 | 10/2013 | Takahashi et al. |
| 2013/0290442 A1 | 10/2013 | Dgani |
| 2013/0300684 A1 | 11/2013 | Kim et al. |
| 2013/0307786 A1 | 11/2013 | Heubel |
| 2013/0316744 A1 | 11/2013 | Newham et al. |
| 2013/0318437 A1 | 11/2013 | Jung et al. |
| 2013/0321317 A1 | 12/2013 | Hirukawa |
| 2013/0326367 A1 | 12/2013 | Nakamura et al. |
| 2013/0332721 A1 | 12/2013 | Chaudhri et al. |
| 2014/0002386 A1 | 1/2014 | Rosenberg et al. |
| 2014/0007005 A1 | 1/2014 | Libin et al. |
| 2014/0024414 A1 | 1/2014 | Fuji |
| 2014/0039900 A1 | 2/2014 | Heubel et al. |
| 2014/0059427 A1 | 2/2014 | Dombrowski et al. |
| 2014/0074716 A1 | 3/2014 | Ni |
| 2014/0075375 A1 | 3/2014 | Hwang et al. |
| 2014/0082501 A1 | 3/2014 | Bae et al. |
| 2014/0091857 A1 | 4/2014 | Bernstein |
| 2014/0092037 A1 | 4/2014 | Kim |
| 2014/0132568 A1 | 5/2014 | Hirose et al. |
| 2014/0168110 A1 | 6/2014 | Araki et al. |
| 2014/0176415 A1 | 6/2014 | Buuck et al. |
| 2014/0176452 A1 | 6/2014 | Aleksov et al. |
| 2014/0176455 A1 | 6/2014 | Araki et al. |
| 2014/0181222 A1 | 6/2014 | Geris et al. |
| 2014/0181756 A1 | 6/2014 | Kuo |
| 2014/0197946 A1 | 7/2014 | Park et al. |
| 2014/0207880 A1 | 7/2014 | Malkin et al. |
| 2014/0210740 A1 | 7/2014 | Lee |
| 2014/0215494 A1 | 7/2014 | Kim |
| 2014/0218317 A1 | 8/2014 | Aberg et al. |
| 2014/0232657 A1 | 8/2014 | Aviles et al. |
| 2014/0253319 A1 | 9/2014 | Chang |
| 2014/0258857 A1 | 9/2014 | Dykstra-Erickson et al. |
| 2014/0267076 A1 | 9/2014 | Birnbaum et al. |
| 2014/0273858 A1 | 9/2014 | Panther et al. |
| 2014/0281924 A1 | 9/2014 | Chipman et al. |
| 2014/0292501 A1 | 10/2014 | Lim et al. |
| 2014/0292668 A1 | 10/2014 | Fricklas et al. |
| 2014/0292706 A1 | 10/2014 | Hunt et al. |
| 2014/0300454 A1 | 10/2014 | Lacroix et al. |
| 2014/0320402 A1 | 10/2014 | Stahlberg |
| 2014/0320431 A1 | 10/2014 | Cruz-Hernandez et al. |
| 2014/0320435 A1 | 10/2014 | Modarres et al. |
| 2014/0329567 A1 | 11/2014 | Chan et al. |
| 2014/0333564 A1 | 11/2014 | Hong et al. |
| 2014/0340316 A1 | 11/2014 | Gu et al. |
| 2014/0351698 A1 | 11/2014 | Nakagawa |
| 2014/0358709 A1 | 12/2014 | Wu |
| 2014/0363113 A1 | 12/2014 | McGavran et al. |
| 2014/0368440 A1 | 12/2014 | Polyakov et al. |
| 2015/0002477 A1 | 1/2015 | Cheatham, III et al. |
| 2015/0020015 A1 | 1/2015 | Zhou |
| 2015/0050966 A1 | 2/2015 | West |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067563 A1 | 3/2015 | Bernstein et al. |
| 2015/0067596 A1 | 3/2015 | Brown et al. |
| 2015/0070153 A1* | 3/2015 | Bhatia .................. G06F 3/016 340/407.1 |
| 2015/0070260 A1 | 3/2015 | Saboune et al. |
| 2015/0077335 A1 | 3/2015 | Taguchi et al. |
| 2015/0078586 A1 | 3/2015 | Ang et al. |
| 2015/0089613 A1 | 3/2015 | Tippett et al. |
| 2015/0097657 A1 | 4/2015 | Gandhi et al. |
| 2015/0103028 A1 | 4/2015 | Ruemelin et al. |
| 2015/0116239 A1 | 4/2015 | Kaplan et al. |
| 2015/0123775 A1 | 5/2015 | Kerdemelidis |
| 2015/0134531 A1 | 5/2015 | Xia |
| 2015/0135109 A1 | 5/2015 | Zambetti et al. |
| 2015/0138046 A1 | 5/2015 | Moon |
| 2015/0145656 A1 | 5/2015 | Levesque et al. |
| 2015/0145657 A1 | 5/2015 | Levesque et al. |
| 2015/0149899 A1 | 5/2015 | Bernstein et al. |
| 2015/0153828 A1 | 6/2015 | Monkhouse et al. |
| 2015/0153830 A1 | 6/2015 | Hirose et al. |
| 2015/0156196 A1 | 6/2015 | Kim et al. |
| 2015/0169059 A1 | 6/2015 | Behles et al. |
| 2015/0199172 A1 | 7/2015 | Ringuette et al. |
| 2015/0201065 A1 | 7/2015 | Shim et al. |
| 2015/0227204 A1 | 8/2015 | Gipson et al. |
| 2015/0227280 A1 | 8/2015 | Westerman et al. |
| 2015/0227589 A1 | 8/2015 | Chakrabarti et al. |
| 2015/0234464 A1 | 8/2015 | Yliaho |
| 2015/0244848 A1 | 8/2015 | Park et al. |
| 2015/0253835 A1 | 9/2015 | Yu |
| 2015/0254570 A1 | 9/2015 | Florence et al. |
| 2015/0254947 A1 | 9/2015 | Komori et al. |
| 2015/0261296 A1 | 9/2015 | Yoshikawa |
| 2015/0261387 A1 | 9/2015 | Petersen |
| 2015/0268725 A1 | 9/2015 | Levesque et al. |
| 2015/0286288 A1 | 10/2015 | Lee et al. |
| 2015/0293592 A1 | 10/2015 | Cheong et al. |
| 2015/0301838 A1 | 10/2015 | Steeves |
| 2015/0323996 A1 | 11/2015 | Obana et al. |
| 2015/0332226 A1 | 11/2015 | Wu et al. |
| 2015/0332565 A1 | 11/2015 | Cho et al. |
| 2015/0346916 A1 | 12/2015 | Jisrawi et al. |
| 2015/0350146 A1 | 12/2015 | Cary et al. |
| 2015/0365306 A1 | 12/2015 | Chaudhri et al. |
| 2016/0007290 A1 | 1/2016 | Lindemann et al. |
| 2016/0034253 A1 | 2/2016 | Bang et al. |
| 2016/0041750 A1 | 2/2016 | Cieplinski et al. |
| 2016/0062464 A1 | 3/2016 | Moussette et al. |
| 2016/0062465 A1 | 3/2016 | Moussette et al. |
| 2016/0062466 A1 | 3/2016 | Moussette et al. |
| 2016/0062590 A1 | 3/2016 | Karunamuni et al. |
| 2016/0063496 A1 | 3/2016 | Royyuru et al. |
| 2016/0063825 A1 | 3/2016 | Moussette et al. |
| 2016/0063826 A1 | 3/2016 | Morrell et al. |
| 2016/0063827 A1 | 3/2016 | Moussette et al. |
| 2016/0063828 A1 | 3/2016 | Moussette et al. |
| 2016/0063850 A1 | 3/2016 | Yang et al. |
| 2016/0065525 A1 | 3/2016 | Dye et al. |
| 2016/0123745 A1 | 5/2016 | Cotier et al. |
| 2016/0161922 A1 | 6/2016 | Shin |
| 2016/0165038 A1 | 6/2016 | Lim et al. |

(56) References Cited

U.S. PATENT DOCUMENTS

| | | |
|---|---|---|
| 2016/0179203 A1 | 6/2016 | Modarres et al. |
| 2016/0205244 A1 | 7/2016 | Dvortsov et al. |
| 2016/0246376 A1 | 8/2016 | Birnbaum et al. |
| 2016/0259499 A1 | 9/2016 | Kocienda et al. |
| 2016/0259519 A1 | 9/2016 | Foss et al. |
| 2016/0259528 A1 | 9/2016 | Foss et al. |
| 2016/0259542 A1 | 9/2016 | Chaudhri et al. |
| 2016/0295010 A1 | 10/2016 | Miller |
| 2016/0313875 A1 | 10/2016 | Williams et al. |
| 2016/0342973 A1 | 11/2016 | Jueng et al. |
| 2016/0349936 A1 | 12/2016 | Cho et al. |
| 2016/0357354 A1 | 12/2016 | Chen et al. |
| 2016/0357362 A1 | 12/2016 | Gauci et al. |
| 2016/0357363 A1 | 12/2016 | Decker et al. |
| 2017/0011210 A1 | 1/2017 | Cheong et al. |
| 2017/0031495 A1 | 2/2017 | Smith |
| 2017/0068511 A1 | 3/2017 | Brown et al. |
| 2017/0075520 A1 | 3/2017 | Bauer et al. |
| 2017/0075534 A1 | 3/2017 | Leschenko |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0358181 A1 | 12/2017 | Moussette et al. |
| 2018/0067557 A1 | 3/2018 | Robert et al. |
| 2018/0082552 A1 | 3/2018 | Moussette et al. |
| 2018/0204425 A1 | 7/2018 | Moussette et al. |
| 2018/0335848 A1 | 11/2018 | Moussette et al. |
| 2019/0050055 A1 | 2/2019 | Chaudhri et al. |

FOREIGN PATENT DOCUMENTS

| | | |
|---|---|---|
| CN | 101631162 A | 1/2010 |
| CN | 101901048 A | 12/2010 |
| CN | 102330123 A | 2/2012 |
| CN | 102484664 A | 5/2012 |
| CN | 102609078 A | 7/2012 |
| CN | 102651920 A | 8/2012 |
| CN | 103503428 A | 1/2014 |
| CN | 103649885 A | 3/2014 |
| CN | 1038438424 A | 6/2014 |
| CN | 104049746 A | 9/2014 |
| CN | 104123035 A | 10/2014 |
| CN | 104321723 A | 1/2015 |
| CN | 104412201 A | 3/2015 |
| CN | 104423595 A | 3/2015 |
| CN | 104508618 A | 4/2015 |
| CN | 105278746 A | 1/2016 |
| DE | 102010048745 A1 | 4/2012 |
| EP | 2 141 569 A2 | 1/2010 |
| EP | 2 194 697 A1 | 6/2010 |
| EP | 2 328 063 A1 | 1/2011 |
| EP | 2 378 406 A2 | 10/2011 |
| EP | 2 386 935 A1 | 11/2011 |
| EP | 2 434 387 A2 | 3/2012 |
| EP | 2 728 445 A2 | 5/2014 |
| EP | 2 733 575 A1 | 5/2014 |
| EP | 2 821 912 A1 | 1/2015 |
| EP | 2 827 225 A2 | 1/2015 |
| EP | 2 846 549 A1 | 3/2015 |
| EP | 2 847 658 A1 | 3/2015 |
| EP | 2 857 933 A1 | 4/2015 |
| EP | 2 977 859 A1 | 1/2016 |
| GB | 2532766 A | 6/2016 |
| GB | 2533572 A | 6/2016 |
| JP | 2000209311 A | 7/2000 |
| JP | 2004064117 A | 2/2004 |
| JP | 2004363999 A | 12/2004 |
| JP | 2008282125 A | 11/2008 |
| JP | 2010114702 A | 5/2010 |
| JP | 2010136151 A | 6/2010 |
| JP | 2011159110 A | 8/2011 |
| JP | 2013503578 A | 1/2013 |
| JP | 2013162167 A | 8/2013 |
| KR | 20130075412 A | 7/2013 |
| KR | 20140002563 A | 1/2014 |
| TW | I388995 B | 3/2013 |
| WO | WO 01/24158 A1 | 4/2001 |
| WO | WO 2004/053830 A1 | 6/2004 |
| WO | WO 2008/075082 A1 | 6/2008 |
| WO | WO 2012/081182 A1 | 6/2012 |
| WO | WO 2013/089294 A1 | 6/2013 |
| WO | WO 2013/156815 A1 | 10/2013 |
| WO | WO 2013/169300 A1 | 11/2013 |
| WO | WO 2013/169853 A1 | 11/2013 |
| WO | WO 2013/169854 A2 | 11/2013 |
| WO | WO 2013/169865 A2 | 11/2013 |
| WO | WO 2013/169875 A2 | 11/2013 |
| WO | WO 2014/095756 A1 | 6/2014 |
| WO | WO 2014/105275 A1 | 7/2014 |
| WO | WO 2015/116056 A1 | 8/2015 |
| WO | WO 2016/171848 A1 | 10/2016 |
| WO | WO 2017/027526 A1 | 2/2017 |

OTHER PUBLICATIONS

Immersion, "The Value of Haptics", San Jose, California, 2010, 12 pages.
Sulaiman et al., "User Haptic Experience and the Design of Drawing Interfaces", *Interacting with Computers*, http://doi.org/10.1016/j.intcom.2009.11.009, Dec. 5, 2009, 20 pages.
VladMaxSoft, "Make Your iPhone Ring Louder When Inside a Pocket or Bag with Ringing Pocket Tweak", https://www.reddit.com/r/jailbreak/comments/1zj6zx/release_make_your_iphone_ring_louder_when_inside/, Mar. 4, 2014, 8 pages.
Notice of Allowance, dated Jan. 31, 2018, received in U.S. Appl. No. 15/619,359, 8 pages.
Notice of Allowance, dated Oct. 2, 2017, received in U.S. Appl. No. 15/619,359, 9 pages.
Certificate of Grant, dated May 18, 2017, received in Australian Patent Application No. 2017100482, which corresponds with U.S. Appl. No. 15/619,359, 1 page.
Office Action, dated Jun. 27, 2017, received in Australian Patent Application No. 2017100482, which corresponds with U.S. Appl. No. 15/619,359, 7 pages.
Certificate of Examination, dated Oct. 27, 2017, received in Australian Patent Application No. 2017100482, which corresponds with U.S. Appl. No. 15/619,359, 1 page.
Office Action, dated Jan. 24, 2018, received in Danish Patent Application No. 201770369, which corresponds with U.S. Appl. No. 15/619,359, 6 pages.
Notice of Allowance, dated Dec. 14, 2016, received in U.S. Appl. No. 15/270,885, 13 pages.
Notice of Allowance, dated Apr. 10, 2017, received in U.S. Appl. No. 15/270,885, 5 pages.
Notice of Allowance, dated Jul. 21, 2017, received in U.S. Appl. No. 15/270,885, 10 pages.
Notice of Allowance, dated Nov. 22, 2017, received in U.S. Appl. No. 15/270,885, 5 pages.
Notice of Acceptance, dated Aug. 18, 2017, received in Australian Patent Application No. 2017216447, which corresponds with U.S. Appl. No. 15/270,885, 3 pages.
Grant, dated Dec. 21, 2017, received in Australian Application No. 2017216447, which corresponds with U.S. Appl. No. 15/270,885, 1 page.
Notice of Acceptance, dated Aug. 21, 2017, received in Australian Patent Application No. 2017216475, which corresponds with U.S. Appl. No. 15/270,885, 3 pages.
Grant, dated Dec. 21, 2017, received in Australian Application No. 2017216475, which corresponds with U.S. Appl. No. 15/270,885, 1 page.
Office Action, dated Jan. 5, 2017, received in Danish Patent Application No. 201670721, which corresponds with U.S. Appl. No. 15/270,885, 7 pages.
Office Action, dated Jul. 20, 2017, received in Danish Patent Application No. 201670721, which corresponds with U.S. Appl. No. 15/270,885, 2 pages.

(56) References Cited

OTHER PUBLICATIONS

Decision to Grant, dated Oct. 25, 2017, received in Danish Patent Application No. 201670721, which corresponds with U.S. Appl. No. 15/270,885, 2 pages.
Office action, dated Jan. 18, 2017, received in Danish Patent Application No. 201670726, which corresponds with U.S. Appl. No. 15/270,885, 7 pages.
Office Action, dated Apr. 5, 2017, received in Danish Patent Application No. 201670726, which corresponds with U.S. Appl. No. 15/270,885, 2 pages.
Notice of Allowance, dated Jul. 18, 2017, received in Danish Patent Application No. 201670726, which corresponds with U.S. Appl. No. 15/270,885, 2 pages.
Patent, dated Oct. 16, 2017, received in Danish Patent Application No. 201670726, which corresponds with U.S. Appl. No. 15/270,885, 2 pages.
Office Action, dated Aug. 25, 2017, received in European patent Application No. 17177160.3, which corresponds with U.S. Appl. No. 15/270,885, 3 pages.
Office Action, dated Jan. 24, 2018, received in European Patent Application No. 17177160.3, which corresponds with U.S. Appl. No. 15/270,885, 4 pages.
Office Action, dated Jan. 17, 2017, received in U.S. Appl. No. 15/271,073, 8 pages.
Notice of Allowance, dated May 2, 2017, received in U.S. Appl. No. 15/271,073, 5 pages.
Notice of Allowance, dated Aug. 21, 2017, received in Australian Application No. 2017213578, which corresponds with U.S. Appl. No. 15/271,073, 3 pages.
Grant, dated Dec. 21. 2017, received in Australian Application No. 2017213578, which corresponds with U.S. Appl. No. 15/271,073, 1 page.
Notice of Allowance, dated Sep. 7, 2017, received in Australian Application No. 2017216471, which corresponds with U.S. Appl. No. 15/271,073, 3 pages.
Grant, dated Dec. 21. 2017, received in Australian Application No. 2017216471, which corresponds with U.S. Appl. No. 15/271,073, 1 page.
Notice of Allowance, dated Aug. 24, 2017, received in Australian Application No. 2017216453, which corresponds with U.S. Appl. No. 15/271,073, 3 pages.
Grant, dated Dec. 21, 2017, received in Australian Application No. 2017216453, which corresponds with U.S. Appl. No. 15/271,073, 1 page.
Office Action, dated Sep. 8, 2017, received in Chinese Application No. 201710735308.4, which corresponds with U.S. Appl. No. 15/271,073, 4 pages.
Office Action, dated Jan. 20, 2017, received in Danish Patent Application No. 201670720, which corresponds with U.S. Appl. No. 15/271,073, 9 pages.
Office Action, dated Sep. 4, 2017, received in Danish Patent Application No. 201670720, which corresponds with U.S. Appl. No. 15/271,073, 4 pages.
Office Action, dated Apr. 5, 2017, received in Danish Patent Application No. 2016-70724, which corresponds with U.S. Appl. No. 15/271,073, 5 pages.
Office Action, dated Aug. 1, 2017, received in Danish Patent Application No. 2016-70724, which corresponds with U.S. Appl. No. 15/271,073, 5 pages.
Office Action, dated Feb. 14, 2018, received in Danish Patent Application No. 2016-70724, which corresponds with U.S. Appl. No. 15/271,073, 2 pages.
Office Action, dated Jan. 25, 2017, received in Danish Patent Application No. 201670725, which corresponds with U.S. Appl. No. 15/271,073, 6 pages.
Office Action, dated Apr. 5, 2017, received in Danish Patent Application No. 201670725, which corresponds with U.S. Appl. No. 15/271,073, 3 pages.
Office Action, dated Oct. 12, 2017, received in Danish Patent Application No. 201670725, which corresponds with U.S. Appl. No. 15/271,073, 3 pages.
Office Action, dated Feb. 10, 2017, received in U.S. Appl. No. 15/272,380, 18 pages.
Notice of Allowance, dated Dec. 6, 2017, received in U.S. Appl. No. 15/272,380, 11 pages.
Notice of Allowance, dated Mar. 8, 2018, received in U.S. Appl. No. 15/272,380, 11 pages.
Certificate of Grant, dated Aug. 23, 2017, received in Australian Patent Application No. 2017101092, which corresponds with U.S. Appl. No. 15/272,380, 1 page.
Office Action, dated Oct. 4, 2017, received in Australian Patent Application No. 2017101092, which correspond with U.S. Appl. No. 15/272,380, 8 pages.
Office Action, dated Feb. 23, 2017, received in Danish Patent Application No. 201670729, which corresponds with U.S. Appl. No. 15/272,380, 9 pages.
Office Action, dated Aug. 28, 2017, received in Danish Patent Application No. 201670729, which corresponds with U.S. Appl. No. 15/272,380, 3 pages.
Office Action, dated Jan. 24, 2017, received in Danish Patent Application No. 201670735, which corresponds with U.S. Appl. No. 15/272,380, 8 pages.
Office Action, dated Jul. 27, 2017, received in Danish Patent Application No. 201670735, which corresponds with U.S. Appl. No. 15/272,380, 3 pages.
Office Action, dated Dec. 7, 2017, received in Danish Patent Application No. 201670735, which corresponds with U.S. Appl. No. 15/272,380, 3 pages.
Office Action, dated Jan. 11, 2017, received in Danish Patent Application No. 201670736, which corresponds with U.S. Appl. No. 15/272,380, 11 pages.
Office Action, dated Aug. 30, 2017, received in Danish Patent Application No. 201670736, which corresponds with U.S. Appl. No. 15/272,380, 4 pages.
Office Action, dated Jan. 30, 2017, received in Danish Patent Application No. 201670737, which corresponds with U.S. Appl. No. 15/272,380, 9 pages.
Office Action, dated Aug. 31, 2017, received in Danish Patent Application No. 201670737, which corresponds with U.S. Appl. No. 15/272,380, 4 pages.
Notice of Allowance, dated Feb. 22, 2017, received in U.S. Appl. No. 15/271,534, 13 pages.
Office Action, dated Jan. 10, 2017, received in U.S. Appl. No. 15/271,653, 9 pages.
Office Action, dated Sep. 13, 2017, received in Chinese Patent Application No. 201710728497.2, which corresponds with U.S. Appl. No. 15/271,653, 3 pages.
Office Action, dated Jan. 27, 2017, received in U.S. Appl. No. 15/271,708, 8 pages.
Notice of Allowance, dated Apr. 5, 2017, received in U.S. Appl. No. 15/271,708, 5 pages.
Office Action, dated Nov. 22, 2017, received in Chinese Patent Application No. 201710736331.5, which corresponds with U.S. Appl. No. 15/271,108, 3 pages.
Office Action, dated Nov. 30, 2015, received in U.S. Appl. No. 14/835,708, 28 pages.
Final Office Action, dated May 20, 2016, received in U.S. Appl. No. 14/835,708, 7 pages.
Notice of Allowance, dated Aug. 29, 2016, received in U.S. Appl. No. 14/835,708, 9 pages.
Office Action, dated Oct. 30, 2017, received in Australian Patent Application No. 2015312344, which corresponds with U.S. Appl. No. 14/835,708, 2 pages.
Office Action, dated Dec. 26, 2017, received in Korean Patent Application No. 2017-7005874, which corresponds with U.S. Appl. No. 14/835,708, 11 pages.
Office Action, dated Aug. 1, 2016, received in Taiwanese Patent Application No. 104126890, which corresponds with U.S. Appl. No. 14/835,708, 17 pages.

(56) References Cited

OTHER PUBLICATIONS

Office Action, dated Dec. 20, 2016, received in Taiwanese Patent Application No. 104126890, which corresponds with U.S. Appl. No. 14/835,708, 5 pages.
Office Action, dated Dec. 28, 2016, received in Taiwanese Patent Application No. 104126890, which corresponds with U.S. Appl. No. 14/835,708, 3 pages.
Office action, dated Apr. 5, 2017, received in Taiwanese Patent Application No. 105139726, which corresponds with U.S. Appl. No. 14/835,708, 2 pages.
Notice of Allowance, dated Jul. 21, 2017, received in Taiwanese Patent Application No. 105139726, which corresponds with U.S. Appl. No. 14/835,708, 6 pages.
Patent, dated Nov. 1, 2017, received in Taiwanese Patent Application No. 105139726, which corresponds with U.S. Appl. No. 14/835,708, 5 pages.
Office Action, dated Feb. 12, 2016, received in U.S. Appl. No. 14/869,825, 15 pages.
Final Office Action, dated Jul. 8, 2016, received in U.S. Appl. No. 14/869,825, 20 pages.
Office Action, dated Dec. 27, 2016, received in U.S. Appl. No. 14/869,825, 27 pages.
Office Action, dated Feb. 12, 2016, received in U.S. Appl. No. 14/869,829, 20 pages.
Final Office Action, dated Aug. 8, 2016, received in U.S. Appl. No. 14/869,829, 28 pages.
Office Action, dated Mar. 7, 2017, received in U.S. Appl. No. 14/869,829, 24 pages.
Final Office Action, dated Jul. 24, 2017, received in U.S. Appl. No. 14/869,829, 30 pages.
Office Action, dated Feb. 18, 2016, received in U.S. Appl. No. 14/869,834, 17 pages.
Final Office Action, dated Aug. 8, 2016, received in U.S. Appl. No. 14/869,834, 22 pages.
Office Action, dated Mar. 7, 2017, received in U.S. Appl. No. 14/869,834, 20 pages.
Final Office Action, dated Jul. 25, 2017, received in U.S. Appl. No. 14/869,834, 18 pages.
Notice of Allowance, dated Nov. 7, 2017, received in U.S. Appl. No. 14/869,834, 9 pages.
Office Action, dated Feb. 17, 2016, received in U.S. Appl. No. 14/869,835, 15 pages.
Final Office Action, dated Aug. 4, 2016, received in U.S. Appl. No. 14/869,835, 21 pages.
Office Action, dated Jan. 6, 2017, received in U.S. Appl. No. 14/869,835, 17 pages.
Final Office Action, dated Jun. 28, 2017, received in U.S. Appl. No. 14/869,835, 24 pages.
Office Action, dated Nov. 30, 2017, received in U.S. Appl. No. 14/869,835, 8 pages.
Office Action, dated Dec. 30, 2015, received in U.S. Appl. No. 14/869,837, 35 pages.
Final Office Action, dated Jun. 30, 2016, received in U.S. Appl. No. 14/869,837, 37 pages.
Office Action, dated Jan. 17, 2017, received in U.S. Appl. No. 14/869,837, 27 pages.
Notice of Allowance, dated Jul. 31, 2017, received in U.S. Appl. No. 14/869,837, 27 pages.
Office Action, dated Aug. 31, 2017, received in Danish Patent Application No. 201770372, 10 pages.
Office Action, dated Mar. 7, 2018, received in U.S. Appl. No. 15/688,754, 9 pages.
International Search Report and Written Opinion, dated Nov. 29, 2017, received in International Patent Application No. PCT/US2017/037004, which corresponds with U.S. Appl. No. 15/619,359, 21 pages.
Extended European Search Report, dated Oct. 20, 2017, received in European Patent Application No. 17177493.8, 6 pages.

Invitation to Pay Additional Fees, dated Nov. 8, 2017, received in International Patent Application No. PCT/US2017/045152, which corresponds with U.S. Appl. No. 15/270,885, 17 pages.
International Search Report and Written Opinion, dated Jan. 18, 2018, received in International Patent Application No. PCT/US2017/045152, which corresponds with U.S. Appl. No. 15/270,885, 20 pages.
Extended European Search Report, dated Jan. 10, 2018, received in European Patent Application No. 17186196.6, which corresponds with U.S. Appl. No. 15/271,073, 8 pages.
Extended European Search Report, dated Jan. 9, 2018, received in European Patent Application No. 17186312.9, which corresponds with U.S. Appl. No. 15/271,073, 6 pages.
Extended European Search Report, dated Jan. 5, 2018, received in European Patent Application No. 17186313.7, which corresponds with U.S. Appl. No. 15/271,073, 9 pages.
International Search Report and Written Opinion, dated Jan. 16, 2018, received in International Patent Application No. PCT/US2017/045740, which corresponds with U.S. Appl. No. 15/271,073, 19 pages.
International Search Report and Written Opinion, dated Jan. 18, 2018, received in International Patent Application No. PCT/US2017/044851, which corresponds with U.S. Appl. No. 15/272,380, 17 pages.
International Search Report and Written Opinion, dated Mar. 15, 2016, received in International Patent Application No. PCT/US2015/041858, which corresponds with U.S. Appl. No. 14/835,708, 31 pages.
Office Action, dated May 16, 2018, received in Danish Patent Application No. 201670725, which corresponds with U.S. Appl. No. 15/271,073, 2 pages.
Certificate of Grant, dated Apr. 26, 2018, received in Australian Patent Application No. 2018100429, which corresponds with U.S. Appl. No. 15/272,380, 1 page.
Office Action, dated May 31, 2018, received in Australian Patent Application No. 2018100429, which corresponds with U.S. Appl. No. 15/272,380, 5 pages.
Office Action, dated Mar. 9, 2018, received in Danish Patent Application No. 01670729, which corresponds with U.S. Appl. No. 15/272,380, 2 pages.
Office Action, dated May 17, 2018, received in Danish Patent Application No. 01670729, which corresponds with U.S. Appl. No. 15/272,380, 2 pages.
Office Action, dated Mar. 16, 2018, received in Danish Patent Application No. 201670736, which corresponds with U.S. Appl. No. 15/272,380, 4 pages.
Notice of Acceptance, dated Apr. 5, 2018, received in Australian Patent Application No. 2015312344, which corresponds with U.S. Appl. No. 14/835,708, 5 pages.
Office Action, dated May 11, 2018, received in Japanese Patent Application No. 2017509011, which corresponds with U.S. Appl. No. 14/835,708, 8 pages.
Patent, dated Apr. 11, 2018, received in Taiwanese Patent Application No. 104126890, which corresponds with U.S. Appl. No. 14/835,708, 5 pages.
Examiner's Answer, dated Mar. 21, 2018, received in U.S. Appl. No. 14/869,829, 8 pages.
Notice of Allowance, dated May 29, 2018, received in U.S. Appl. No. 14/869,835, 12 pages.
Office Action, dated Apr. 17, 2018, received in Danish Patent Application No. 201770372, 5 pages.
Intention to Grant, dated Dec. 7, 2018, received in European Patent Application No. 17177160.3, which corresponds with U.S. Appl. No. 15/270,885, 7 pages.
Office Action, dated Oct. 5, 2018, received in Australian Patent Application No. 201761484, which corresponds with U.S. Appl. No. 15/271,073, 2 pages.
Office Action, dated Jan. 3, 2019, received in Chinese Application No. 201710735308.4, which corresponds with U.S. Appl. No. 15/271,073, 6 pages.
Intention to Grant, dated Nov. 21, 2018, received in Danish Patent Application No. 201670735, which corresponds with U.S. Appl. No. 15/272,380, 2 pages.

(56) References Cited

OTHER PUBLICATIONS

Office Action, dated Oct. 26, 2018, received in European Patent Application No. 18183341.9, which corresponds with U.S. Appl. No. 15/272,380, 7 pages.

Office Action, dated Jan. 14, 2019, received in European Patent Application No. 18191063.9, which corresponds with U.S. Appl. No. 15/275,083, 9 pages.

Office Action, dated Nov. 23, 2018, received in Chinese Patent Application No. 201710736303.3, which corresponds with U.S. Appl. No. 15/271,534, 7 pages.

Office Action, dated Dec. 29, 2018, received in Chinese Patent Application No. 201710728497.2, which corresponds with U.S. Appl. No. 15/271,653, 6 pages.

Office Action, dated Dec. 14, 2018, received in Japanese Patent Application No. 2017509011, which corresponds with U.S. Appl. No. 14/835,708, 8 pages.

Final Office Action, dated Nov. 8, 2018, received in Korean Patent Application No. 2017-7005874, which corresponds with U.S. Appl. No. 14/835,708, 3 pages.

Notice of Allowance, dated Dec. 20, 2018, received in U.S. Appl. No. 15/905,671, 9 pages.

International Preliminary Report on Patentability, dated Dec. 18, 2018, received in International Patent Application No. PCT/US2017/037004, which corresponds with U.S. Appl. No. 15/619,359, 12 pages.

European Search Report, dated Dec. 3, 2018, received in European Patent Application No. 18191063.9, which corresponds with U.S. Appl. No. 15/275,083, 4 pages.

Office Action, dated Jun. 15, 2018, received in Danish Patent Application No. 201670735, which corresponds with U.S. Appl. No. 15/272,380, 2 pages.

Notice of Allowance, dated Jul. 12, 2018, received in U.S. Appl. No. 15/275,083, 22 pages.

Office Action, dated Jul. 20, 2018, received in U.S. Appl. No. 15/905,671, 7 pages.

Office Action, dated Aug. 6, 2018, received in Danish Patent Application No. 201770369, which corresponds with U.S. Appl. No. 15/619,359, 5 pages.

Office Action, dated Aug. 14, 2018, received in Danish Patent Application No. 201670720, which corresponds with U.S. Appl. No. 15/271,073, 2 pages.

Certificate of Examination, dated Aug. 7, 2018, received in Australian Patent Application No. 2018100429, which corresponds with U.S. Appl. No. 15/272,380, 1 page.

Notice of Allowance, dated Oct. 2, 2018, received in Danish Patent Application No. 201670729, which corresponds with U.S. Appl. No. 15/272,380, 2 pages.

Office Action, dated Jul. 25, 2018, received in Danish Patent Application No. 201670737, which corresponds with U.S. Appl. No. 15/272,380, 5 pages.

Notice of Allowance, dated Aug. 27, 2018, received in U.S. Appl. No. 15/273,688, 27 pages.

Certificate of Grant, dated Aug. 2, 2018, received in Australian Patent Application No. 2015312344, which corresponds with U.S. Appl. No. 14/835,708, 1 page.

Final Office Action, dated Jul. 17, 2018, received in Korean Patent Application No. 2017-7005874, which corresponds with U.S. Appl. No. 14/835,708, 3 pages.

Notice of Allowance, dated Aug. 27, 2018, received in U.S. Appl. No. 15/688,754, 5 pages.

European Search Report, dated Sep. 27, 2018, received in European Patent Application No. 18183341.9, which corresponds with U.S. Appl. No. 15/271,073, 4 pages.

International Search Report and Written Opinion, dated Aug. 22, 2018, received in International Patent Application No. PCT/US2018032936, which corresponds with U.S. Appl. No. 15/972,040, 14 pages.

Office Action, dated Mar. 22, 2019, received in Australian Patent Application No. 2017251751, which corresponds with U.S. Appl. No. 15/270,885, 3 pages.

Office Action, dated Feb. 2, 2019, received in Chinese Patent Application No. 2017107348777, which corresponds with U.S. Appl. No. 15/270,885, 10 pages.

Intention to Grant, dated Feb. 1, 2019, received in European Patent Application No. 17177493.8, which corresponds with U.S. Appl. No. 15/270,885, 4 pages.

Notice of Allowance, dated Feb. 13, 2019, received in Danish Patent Application No. 2016-70724, which corresponds with U.S. Appl. No. 15/271,073, 2 pages.

Office Action, dated Apr. 2, 2019, received in Chinese Patent Application No. 2017800042913, which corresponds with U.S. Appl. No. 15/272,380, 5 pages.

Patent, dated Mar. 13, 2019, received in Danish Patent Application No. 201670735, which corresponds with U.S. Appl. No. 15/272,380, 3 pages.

Office Action, dated Mar. 5, 2019, received in Chinese Patent Application No. 201710736331.5, which corresponds with U.S. Appl. No. 15/271,108, 6 pages.

Office Action, dated Mar. 21, 2019, received in Korean Patent Application No. 2019-7000444, which corresponds with U.S. Appl. No. 14/869,870, 3 pages.

Office Action, dated Feb. 12, 2019, received in U.S Appl. No. 15/823,436, 7 pages.

Office Action, dated Feb. 13, 2019, received in U.S. Appl. No. 16/240,684, 9 pages.

Notice of Allowance, dated Mar. 19, 2019, received in U.S. Appl. No. 16/240,684, 5 pages.

Intention to Grant, dated May 2, 2019, received in Danish Patent Application No. 201770369, which corresponds with U.S. Appl. No. 15/619,359, 2 pages.

Decision to Grant, dated Apr. 18, 2019, received in European Patent Application No. 17177493.8, which corresponds with U.S. Appl. No. 15/270,885, 4 pages.

Notice of Allowance, dated Apr. 23, 2019, received in Japanese Patent Application No. 2018550359, which corresponds with U.S. Appl. No. 15/275,083, 4 pages.

Notification to Grant, dated Apr. 10, 2019, received in Chinese Patent Application No. 201710736303,3, which corresponds with U.S. Appl. No. 15/271,534, 6 pages.

Office Action, dated Apr. 18, 2019, received in Chinese Patent Application No. 201580044092.6, which corresponds with U.S. Appl. No. 14/835,708, 5 pages.

\* cited by examiner

A method, performed at an electronic device with a display, a touch sensitive surface, and one or more tactile output generators:

600

602 Receive a plurality of requests to generate a plurality of tactile outputs using the one or more tactile output generators, wherein the plurality of tactile outputs include two or more overlapping tactile outputs  (A)

604 In response to receiving the plurality of requests, generate and output, via the one or more tactile output generators, combined tactile outputs

606 Determine whether the plurality of tactile outputs exceeds a threshold number of tactile outputs that is permitted to be mixed together for concurrent output via the one or more tactile output generators Yes No

608 Mix the plurality of tactile outputs together into a first combined tactile output, and include the first combined tactile output in the combined tactile outputs  (C)

610 Output, via the one or more tactile output generators, the combined tactile outputs, including the first combined tactile output  (D)

612 Mix a subset of the plurality of tactile outputs together into a second combined tactile output that excludes at least one of the plurality of tactile outputs, and include the second combined tactile output in the combined tactile outputs

614 Output, via the one or more tactile output generators, the combined tactile outputs, including the second combined tactile output (B)

602 Receive a plurality of requests to generate a plurality of tactile outputs using the one or more tactile output generators, wherein the plurality of tactile outputs include two or more overlapping tactile outputs (A)

620 One or more of the tactile outputs of the plurality of tactile outputs are part of synchronized tactile and audio outputs that include both an audio output and a corresponding tactile output that are synchronized to occur with a particular temporal alignment

622 The plurality of tactile outputs includes a tactile output generated in response to a user input directed toward a control element in a displayed user interface

624 The plurality of tactile outputs includes a tactile output generated in response to a user input directed toward a hardware control

626 The plurality of tactile outputs includes a tactile output generated in response to the occurrence of a predefined condition

628 Receiving the plurality of requests includes:
 receiving a first set of one or more inputs corresponding to user interface elements displayed on the display, wherein the first set of one or more inputs corresponds to a first set of one or more tactile outputs; and
 receiving a second set of one or more inputs corresponding to one or more hardware elements, wherein the second set of one or more inputs corresponds to the second set of one or more tactile outputs,
 wherein the plurality of tactile outputs includes the first set of one or more tactile outputs and the second set of one or more tactile outputs

630 Receiving the plurality of requests includes:
 detecting a triggering condition for a first set of one or more tactile outputs with a first priority; and
 detecting a triggering condition for a second set of one or more tactile outputs with a second priority

Figure 6B

604 In response to receiving the plurality of requests, generate and output, via the one or more tactile output generators, combined tactile outputs (B)

632 Generating the combined tactile outputs includes,
    in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs:
    in accordance with a determination that the first priority is higher than the second priority, reducing a scale of at least a portion of the second set of one or more tactile outputs that overlaps with the first set of one or more tactile outputs;
    in accordance with a determination that the second priority is higher than the first priority, reducing a scale of at least a portion of the first set of one or more tactile outputs that overlaps with the second set of one or more tactile outputs; and
    generating the combined tactile outputs by combining at least the first set of one or more tactile outputs, including any portion thereof with reduced scale, and the second set of one or more tactile outputs, including any portion thereof with reduced scale 634 Generating the combined tactile outputs includes,
    in accordance with a determination that the first set of tactile outputs and the second set of one or more tactile outputs do not overlap, including in the combined tactile outputs the first set of one or more tactile outputs and the second set of one or more tactile outputs; and
    in accordance with a determination that the first set of one or more tactile outputs and the second set of one or more tactile outputs overlap, including in the combined tactile outputs a modified tactile output sequence that is modified so as to emphasize the second set of one or more tactile outputs relative to the first set of one or more tactile outputs

Figure 6C

608 Mix the plurality of tactile outputs together into a first combined tactile output, and include the first combined tactile output in the combined tactile outputs (C)

636 The combined tactile outputs include of the first combined tactile output a first portion and a second portion; and
    in accordance with a determination that the second portion of the combined tactile outputs meets output limiting criteria for the one or more tactile output generators:
        reduce a scale of the combined tactile outputs during at least the first portion of the combined tactile outputs immediately preceding the second portion of the combined tactile outputs

610 Output, via the one or more tactile output generators, the combined tactile outputs, including the first combined tactile output (D)

638 Output, via the one or more tactile output generators, a tactile output sequence based on the combined tactile outputs that includes the first portion of the combined tactile outputs with reduced scale

640 After reducing the scale of the combined tactile outputs during the first portion, continue to output, via the one or more tactile output generators, the combined tactile outputs with the reduced scale during the second portion

642 After reducing the scale of the combined tactile outputs during the first portion, apply a low pass filter to the combined tactile outputs so as to remove or reduce frequency components, if any, of the combined tactile outputs that are above a predefined cutoff frequency

643 Gradually increase the scale of the combined tactile outputs during at least a third portion of the combined tactile outputs

644 In accordance with a determination that the second portion of the combined tactile outputs does not meet output limiting criteria for the one or more tactile output generators, output, via the one or more tactile output generators, the tactile output sequence without reducing the scale of the combined tactile outputs during at least the first portion of the combined tactile outputs

Figure 6D

660 Mix the additional tactile output with the plurality of tactile outputs, excluding the second portion of the respective tactile output, together into a fourth combined tactile output, and including the fourth combined tactile output in the combined tactile outputs

670 The second portion of the respective tactile output is selected, from the plurality of tactile outputs, to be excluded from the plurality of tactile outputs based on an age of an input that triggered the respective tactile output

672 Play an audio output that is synchronized with the respective tactile output and is triggered by a same condition that triggered the respective tactile output 674 Continue to play the audio output that is synchronized with the respective tactile output without regard to whether or not the second portion of the tactile output is excluded from the combined tactile outputs that are output via the one or more tactile output generators

Figure 6F

A method, performed at an electronic device with a display, a touch sensitive
700 ⟶ surface, and one or more tactile output generators:

702 Receive a first set of one or more inputs corresponding to user interface elements displayed on the display, wherein the first set of one or more inputs corresponds to a first set of one or more tactile outputs

704 Receive a second set of one or more inputs corresponding to the one or more hardware elements, wherein the second set of one or more inputs corresponds to a second set of one or more tactile outputs > 706 The second set of one or more inputs corresponds to a click gesture, or a portion of a click gesture, performed using a respective hardware element

708 In response to the second set of one or more inputs:

710 Determine whether the first set of tactile outputs and the second set of one or more tactile outputs overlap ↓ No

712 Output, with the set of one or more tactile output generators, a tactile output sequence that includes the first set of one or more tactile outputs and the second set of one or more tactile outputs

714 Output, with the one or more tactile output generators, a modified tactile output sequence that is modified so as to emphasize the second set of one or more tactile outputs relative to the first set of one or more tactile outputs (A)

714 Output, with the one or more tactile output generators, a modified tactile output sequence that is modified so as to emphasize the second set of one or more tactile outputs relative to the first set of one or more tactile outputs (A)

716 Modify the tactile output sequence so as to emphasize the second set of tactile outputs relative to the first set of tactile outputs by performing one or more of: increasing an amplitude of the second set of tactile outputs and decreasing an amplitude of the first set of tactile outputs

718 The modified tactile output sequence includes a first portion during which output of the first set of tactile outputs is gradually reduced from a first output level to a second output level

720 The modified tactile output sequence includes a second portion of reduced tactile output

722 A duration of the second portion is selected based on a magnitude of the first portion

724 The modified tactile output sequence includes a third portion that is subsequent to the second portion and includes the second set of tactile outputs, and a duration of the third portion is longer than a duration of the second portion of reduced tactile output

726 The modified tactile output sequence includes
a third portion that includes the second set of tactile outputs; and
a fourth portion during which the first set of tactile outputs is output using an output level that is gradually increased from a third output level to a fourth output level, wherein the fourth portion is subsequent to the third portion

728 The modified tactile output sequence includes
a third portion that includes the second set of tactile outputs; and
a fifth portion of reduced tactile output, wherein the fifth portion is subsequent to the third portion (E)

Figure 7B

714 Output, with the one or more tactile output generators, a modified tactile output sequence that is modified so as to emphasize the second set of one or more tactile outputs relative to the first set of one or more tactile outputs

730 While emphasizing the second set of one or more tactile outputs over the first set of one or more tactile outputs, continue to process the first set of one or more inputs, including mixing together tactile outputs for the first set of one or more inputs 732 outputting the modified tactile sequence includes reducing a scale of at least a portion of the first set of one or more tactile outputs that overlaps with the second set of one or more tactile outputs 734 In accordance with a determination that a first portion of the combined tactile outputs meets output limiting criteria for the one or more tactile output generators 736 Reduce a scale of the combined tactile outputs during at least a second portion of the combined tactile outputs immediately preceding the first portion of the combined tactile outputs 738 Output, with the set of one or more tactile output generators, a tactile output sequence based on the combined tactile outputs that includes the second portion of the combined tactile outputs with reduced scale

Figure 7C

A method, performed at an electronic device with a display, a touch sensitive surface, and one or more tactile output generators:

800

802 Detect a triggering condition for a first set of one or more tactile outputs with a first priority (A)

804 Detect a triggering condition for a second set of one or more tactile outputs with a second priority (B)

(E)

808 In response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs:

810 Priority Comparison

Second Priority > First Priority

First Priority > Second Priority

First Priority = Second Priority

812 Reduce a scale of at least a portion of the second set of one or more tactile outputs that overlaps with the first set of one or more tactile outputs (C)

814 Reduce a scale of at least a portion of the first set of one or more tactile outputs that overlaps with the second set of one or more tactile outputs (D)

816 Combine the first set of one or more tactile outputs with the second set of one or more tactile outputs without reducing a scale of the first set of one or more tactile outputs relative to the scale of the second set of one or more tactile outputs (F) (G) (H)

Figure 8A

|First Priority >
|Second Priority

812 Reduce a scale of at least a portion of the second set of one or more tactile outputs that overlaps with the first set of one or more tactile outputs (C)

| 840 In conjunction with reducing the scale of the second set of one or more tactile outputs with the second priority, output the first set of one or more tactile outputs with the first priority

|Second Priority >
|First Priority

814 Reduce a scale of at least a portion of the first set of one or more tactile outputs that overlaps with the second set of one or more tactile outputs (D)

| 842 In conjunction with reducing the scale of the first set of one or more tactile outputs with the first priority, output the second set of one or more tactile outputs with the second priority (F)

| 850 Generate combined tactile outputs by combining at least the first set of one or more tactile outputs, including any portion thereof with reduced scale, and the second set of one or more tactile outputs, including any portion thereof with reduced scale

| 852 Output, with the set of one or more tactile output generators, a tactile output sequence based on the combined tactile outputs

| | 854 The tactile output sequence includes a first portion during which output of the first set of tactile outputs is gradually reduced from a first output level to a second output level

Figure 8C

DEVICES, METHODS, AND GRAPHICAL USER INTERFACES FOR HAPTIC MIXING

RELATED APPLICATION

This application is a continuation of U.S. application Ser. No. 15/270,885, filed Sep. 20, 2016, now U.S. Pat. No. 9,864,432 B1, which claims priority to U.S. Provisional Application Ser. No. 62/384,113, filed Sep. 6, 2016, which are incorporated by reference herein in their entirety.

TECHNICAL FIELD

This relates generally to electronic devices with touch-sensitive surfaces and tactile output generators, including but not limited to electronic devices that display a user interface and combine multiple tactile outputs corresponding to different events or trigger conditions to produce a combined tactile output.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

The provision of tactile outputs in conjunction with detecting touch inputs and other functions of an electronic device can be used to facilitate the user's interactions with the device. However, physical limitations of tactile output generators, and limits on the ability of users to feel and understand overlapping tactile outputs, make the use of multiple sources of tactile outputs challenging with respect to providing useful information to the user.

SUMMARY

Accordingly, there is a need for electronic devices with faster, more efficient methods and interfaces for mixing and prioritizing tactile outputs corresponding to multiple requests to generate tactile outputs, or multiple user inputs corresponding to tactile outputs (e.g., corresponding to user interface elements displayed on a display, and corresponding to hardware elements), or multiple triggering conditions for tactile outputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and a set of one or more tactile output generators. The method includes: receiving a plurality of requests to generate a plurality of tactile outputs using the one or more tactile output generators, wherein the plurality of tactile outputs include two or more overlapping tactile outputs. The method further includes, in response to receiving the plurality of requests, generating and outputting, via the one or more tactile output generators, combined tactile outputs. The generating and outputting includes: in accordance with a determination that the plurality of tactile outputs does not exceed a threshold number of tactile outputs that is permitted to be mixed together for concurrent output via the one or more tactile output generators, mixing the plurality of tactile outputs together into a first combined tactile output, and including the first combined tactile output in the combined tactile outputs; and outputting, via the one or more tactile output generators, the combined tactile outputs, including the first combined tactile output. The generating and outputting further includes: in accordance with a determination that the plurality of tactile outputs exceeds the threshold number of tactile outputs that is permitted to be mixed together for concurrent output via the one or more tactile output generators, mixing a subset of the plurality of tactile outputs together into a second combined tactile output that excludes at least one of the plurality of tactile outputs, and including the second combined tactile output in the combined tactile outputs; and outputting, via the one or more tactile output generators, the combined tactile outputs, including the second combined tactile output.

In accordance with some embodiments, a method is performed at an electronic device with a display, a touch-sensitive surface, and a set of one or more tactile output generators. The method includes: receiving a first set of one or more inputs corresponding to user interface elements displayed on the display, wherein the first set of one or more inputs corresponds to a first set of one or more tactile outputs, and receiving a second set of one or more inputs corresponding to the one or more hardware elements, wherein the second set of one or more inputs corresponds to a second set of one or more tactile outputs. The method further includes, in response to the second set of one or more inputs, in accordance with a determination that the first set of tactile outputs and the second set of one or more tactile outputs do not overlap, outputting, with the set of one or more tactile output generators, a tactile output sequence that includes the first set of one or more tactile outputs and the second set of one or more tactile outputs. The method further includes, in accordance with a determination that the first set of one or more tactile outputs and the second set of one or more tactile outputs overlap, outputting, with the set of one or more tactile output generators, a modified tactile output sequence that is modified so as to emphasize the second set of one or more tactile outputs relative to the first set of one or more tactile outputs.

In accordance with some embodiments, a method is performed at an electronic device with a display, a touch-sensitive surface, and a set of one or more tactile output generators. The method includes: detecting a triggering condition for a first set of one or more tactile outputs with a first priority and detecting a triggering condition for a second set of one or more tactile outputs with a second priority. The method further includes, in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs: (a) in accordance with a determination that the first priority is higher than the second priority, reducing a scale of at least a portion of the second set of one or more tactile outputs that overlaps with the first set of one or more tactile outputs; and (b) in accordance with a determination that the second priority is higher than the first priority, reducing a scale of at least a portion of the first set of one or more tactile outputs that overlaps with the second set of one or more tactile outputs.

In accordance with some embodiments, an electronic device includes a display unit configured to display one or more user interfaces, a touch-sensitive surface unit to receive touch inputs, one or more tactile output generator units to generate tactile outputs; and a processing unit coupled with the display unit, the touch-sensitive surface unit, and the one or more tactile output generator units. The processing unit is configured to: receive a plurality of requests to generate a plurality of tactile outputs using the one or more tactile output generator units, wherein the plurality of tactile outputs include two or more overlapping tactile outputs; and in response to receiving the plurality of requests, generate and output, via the one or more tactile output generator units, combined tactile outputs. The generating and outputting includes, in accordance with a determination that the plurality of tactile outputs does not exceed a threshold number of tactile outputs that is permitted to be mixed together for concurrent output via one or more tactile output generator units, mixing the plurality of tactile outputs together into a first combined tactile output, including the first combined tactile output in the combined tactile outputs, and outputting, via the one or more tactile output generator units, the combined tactile outputs, including the first combined tactile output. The generating and outputting also includes, in accordance with a determination that the plurality of tactile outputs exceeds the threshold number of tactile outputs that is permitted to be mixed together for concurrent output via the one or more tactile output generator units, mixing a subset of the plurality of tactile outputs together into a second combined tactile output that excludes at least one of the plurality of tactile outputs, including the second combined tactile output in the combined tactile outputs, and outputting, via the one or more tactile output generator units, the combined tactile outputs, including the second combined tactile output.

In accordance with some embodiments, an electronic device includes a display unit configured to display one or more user interfaces, a touch-sensitive surface unit to receive touch inputs, one or more tactile output generator units to generate tactile outputs; and a processing unit coupled with the display unit, the touch-sensitive surface unit, and the one or more tactile output generator units. The processing unit is configured to: receive a first set of one or more inputs corresponding to user interface elements displayed on the display, wherein the first set of one or more inputs corresponds to a first set of one or more tactile outputs, and receive a second set of one or more inputs corresponding to the one or more hardware elements, wherein the second set of one or more inputs corresponds to a second set of one or more tactile outputs. The processing unit is further configured to respond to the second set of one or more inputs, in accordance with a determination that the first set of tactile outputs and the second set of one or more tactile outputs do not overlap, by outputting, with the set of one or more tactile output generators, a tactile output sequence that includes the first set of one or more tactile outputs and the second set of one or more tactile outputs. The processing unit is also configured to respond to the second set of one or more inputs, in accordance with a determination that the first set of one or more tactile outputs and the second set of one or more tactile outputs overlap, by outputting, with the set of one or more tactile output generators, a modified tactile output sequence that is modified so as to emphasize the second set of one or more tactile outputs relative to the first set of one or more tactile outputs.

In accordance with some embodiments, an electronic device includes a display unit configured to display one or more user interfaces, a touch-sensitive surface unit to receive touch inputs, one or more tactile output generator units to generate tactile outputs; and a processing unit coupled with the display unit, the touch-sensitive surface unit, and the one or more tactile output generator units. The processing unit is configured to: detect a triggering condition for a first set of one or more tactile outputs with a first priority, and detect a triggering condition for a second set of one or more tactile outputs with a second priority. The processing unit is further configured to respond to detecting the triggering condition for the first set of one or more tactile outputs and the triggering condition for the second set of one or more tactile outputs, in accordance with a determination that the first set of one or more tactile outputs are scheduled to at least partially overlap with the second set of one or more tactile outputs, by: in accordance with a determination that the first priority is higher than the second priority, reduce a scale of at least a portion of the second set of one or more tactile outputs that overlaps with the first set of one or more tactile outputs; and in accordance with a determination that the second priority is higher than the first priority, reduce a scale of at least a portion of the first set of one or more tactile outputs that overlaps with the second set of one or more tactile outputs.

In accordance with some embodiments, an electronic device includes a display, a touch-sensitive surface, a set of one or more tactile output generators, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and a set of one or more tactile output generators, cause the device to perform or cause performance of the operations of any of the methods described herein. In accordance with some embodiments, a graphical user interface on an electronic device with a display, a touch-sensitive surface, a set of one or more tactile output generators, a memory, and one or more processors to execute one or more programs stored in the memory includes one or more of the elements displayed in any of the methods described herein, which are updated in response to inputs, in accordance with any of the methods described herein.

In accordance with some embodiments, an electronic device includes: a display, a touch-sensitive surface, and a set of one or more tactile output generators; and means for performing or causing performance of the operations of any of the methods described herein. In accordance with some embodiments, an information processing apparatus, for use in an electronic device with a display, a touch-sensitive surface, and a set of one or more tactile output generators, includes means for performing or causing performance of the operations of any of the methods described herein.

Thus, electronic devices with displays, touch-sensitive surfaces and a set of one or more tactile output generators are provided with faster, more efficient methods and interfaces for providing, combining and outputting tactile outputs, thereby increasing the effectiveness, efficiency, and user satisfaction with such devices. Such methods and interfaces may complement or replace conventional methods for providing notifications, and providing feedback in response to user inputs other trigger conditions.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams illustrating a method of applying limits to mixing tactile outputs into combined tactile outputs in accordance with some embodiments.

FIGS. 7A-7D are flow diagrams illustrating a method of prioritizing some tactile outputs over other tactile outputs while mixing tactile outputs into combined tactile outputs in accordance with some embodiments.

FIGS. 8A-8D are flow diagrams illustrating a method of prioritizing and scaling tactile outputs while mixing tactile outputs into combined tactile outputs in accordance with some embodiments.

DESCRIPTION OF EMBODIMENTS

In electronic devices that display graphical user interfaces, enabling applications to provide tactile outputs can be challenging due to limitations on the number of tactile outputs that can be generated concurrently, physical limitations on the tactile outputs that can be generated by the electronic device's one or more tactile output generators, and limitations on the ability of users to feel and understand multiple tactile outputs that either overlap or follow each other in quick succession. To enable robust tactile output generation, while addressing the aforementioned physical and user limitations, a number of methodologies are employed. Examples of such techniques include limiting the number of tactile outputs that are combined at any one time, and/or reducing scale and then ending one or more "oldest" tactile outputs when the number of tactile outputs scheduled to be generated that would overlap surpasses a threshold. In another example, the combined tactile outputs are analyzed, and reduced in scale, if an amplitude limit would be exceeded. In another example, tactile outputs are assigned priorities, for example based on their sources, and overlapping tactile outputs are mixed in accordance with those priorities, including reducing the scale of one or more lower priority tactile outputs. In another example, when tactile outputs are mixed and combined, a second set of tactile outputs are emphasized relative to a first set of tactile outputs (e.g., based on the sources or triggering conditions of those tactile outputs).

Figure 3:
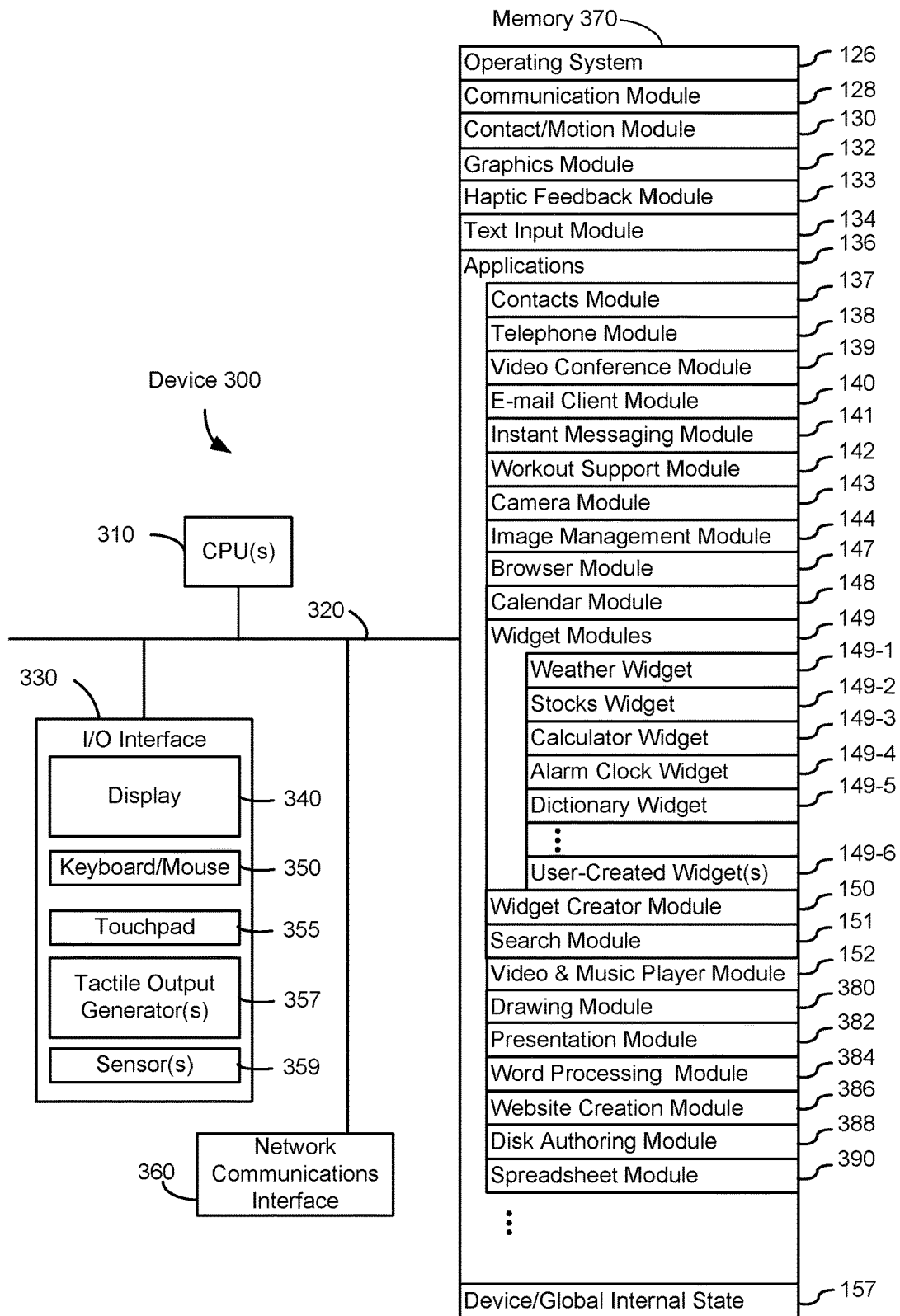
FIG. 3 is a block diagram of an example multifunction device with a display and a touch-sensitive surface in accordance with some embodiments.
Figure 4A:
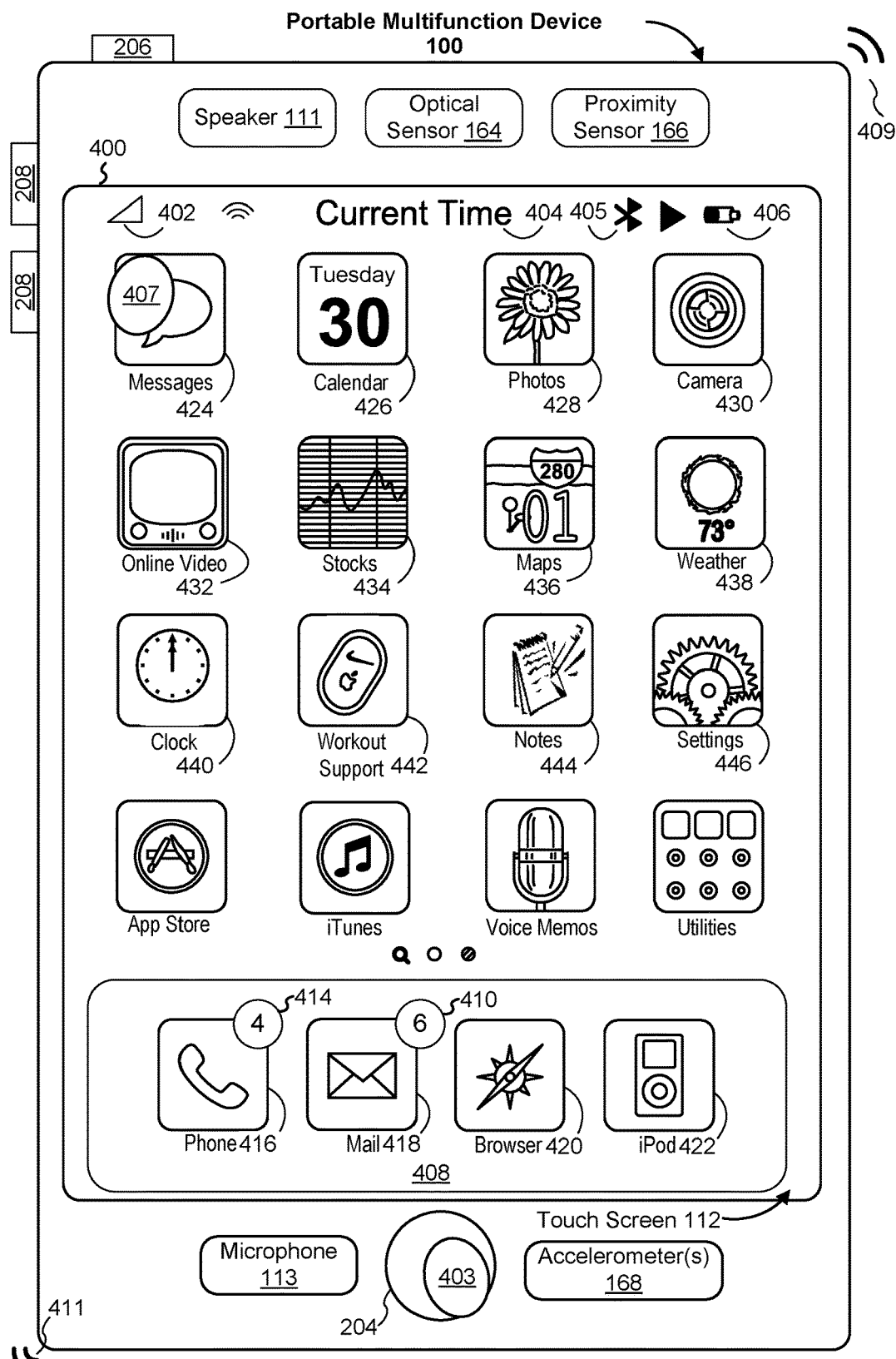
FIG. 4A illustrates an example user interface for a menu of applications on a portable multifunction device in accordance with some embodiments.
Figure 4B:
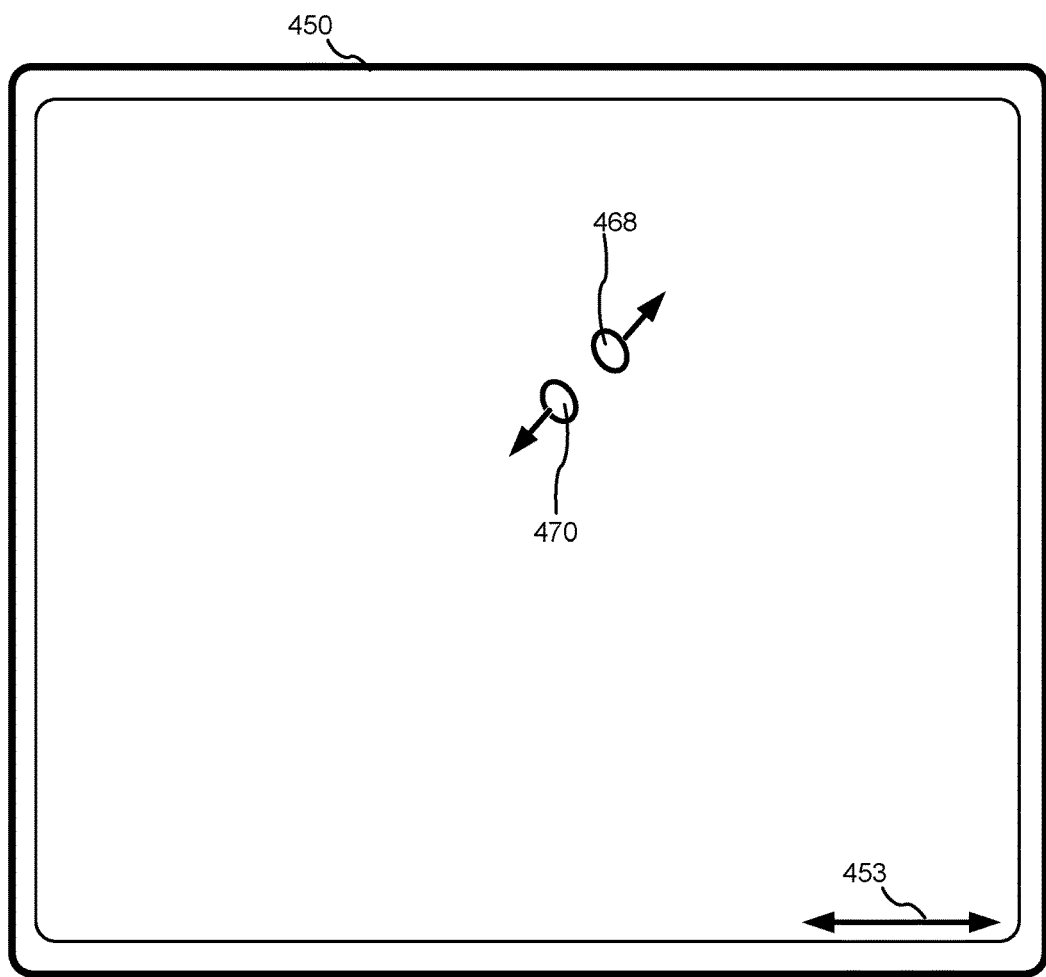
FIG. 4B illustrates an example user interface for a multifunction device with a touch-sensitive surface that is separate from the display in accordance with some embodiments.
Figure 4B:
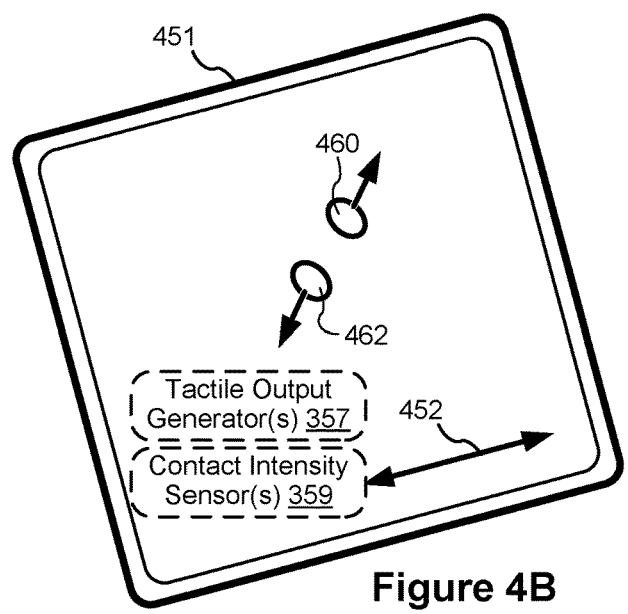
Figure 4C:
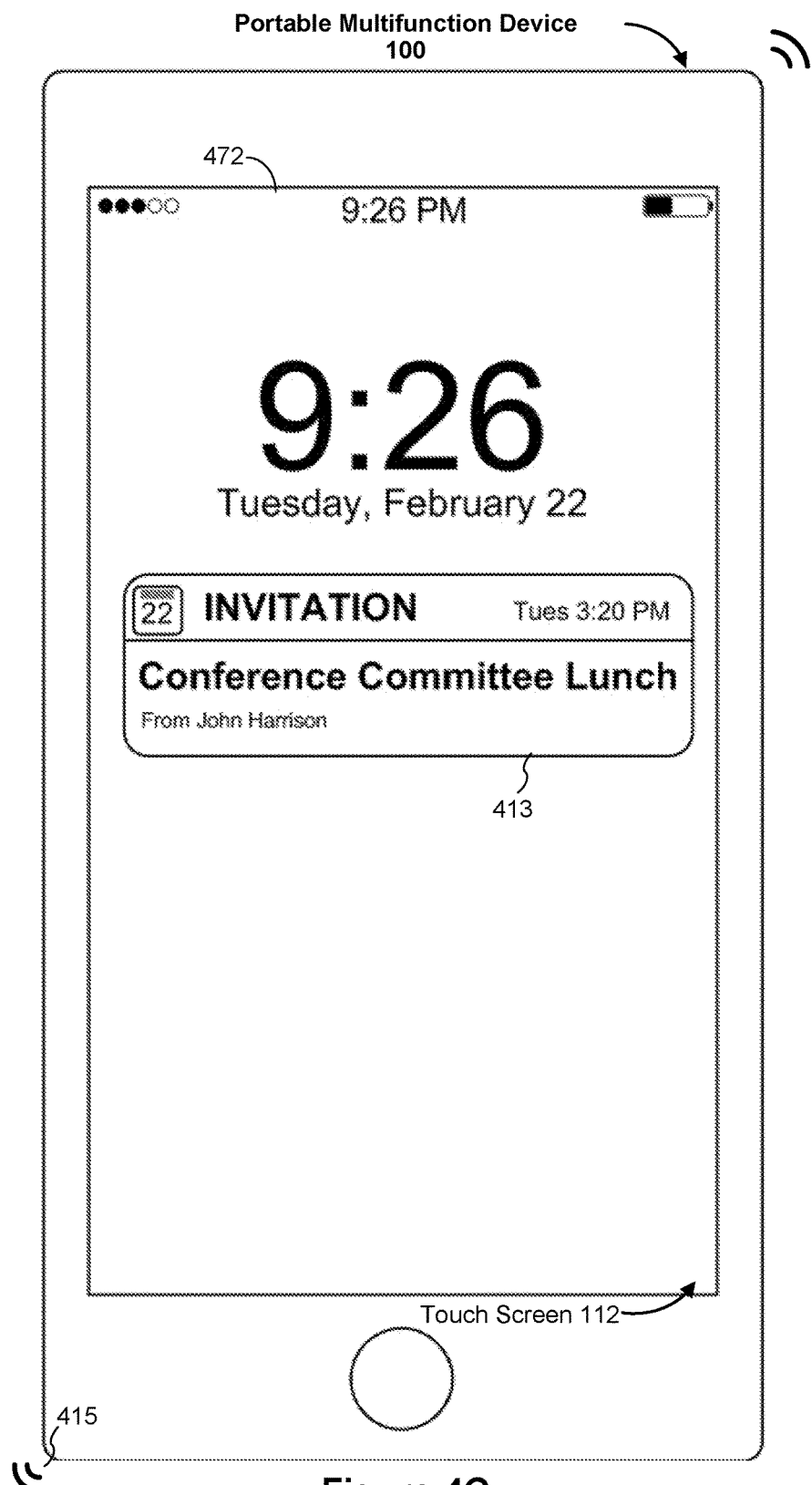
FIG. 4C illustrates an electronic device displaying a graphical user interface and providing a corresponding tactile output, in accordance with some embodiments.

Below descriptions of example devices are provided with reference to FIGS. 1A-1B, 2, and 3. FIGS. 4A-4C illustrate example user interfaces, including user interfaces displayed while tactile outputs are generated, and FIGS. 5A-5L illustrate tactile outputs, combinations of tactile outputs and audio outputs, produced while executing various applications and generating and mixing tactile outputs to produce combined tactile outputs. FIGS. 6A-6F illustrate a flow diagram of a method of combining tactile outputs corresponding to triggering conditions or inputs from multiple sources, and applying limits to the number of tactile outputs combined, or to the magnitude and/or frequency components of the combined tactile outputs. FIGS. 7A-7D illustrate a flow diagram of a method of prioritizing tactile outputs corresponding to inputs on hardware elements over other tactile outputs. FIGS. 8A-8D illustrate a flow diagram of a method of mixing of tactile outputs in accordance with priorities of those tactile outputs. The user interfaces in FIGS. 4A-4C and the tactile outputs and audio outputs in FIGS. 5A-5J are used to illustrate the processes in FIGS. 6A-6F. The user interfaces in FIGS. 4A-4C and the tactile outputs and audio outputs in FIGS. 5H, 5I and 5K are used to illustrate the processes in FIGS. 7A-7D. The user interfaces in FIGS. 4A-4C and the tactile outputs and audio outputs in FIGS. 5A, 5H-5J and 5L are used to illustrate the processes in FIGS. 8A-8D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
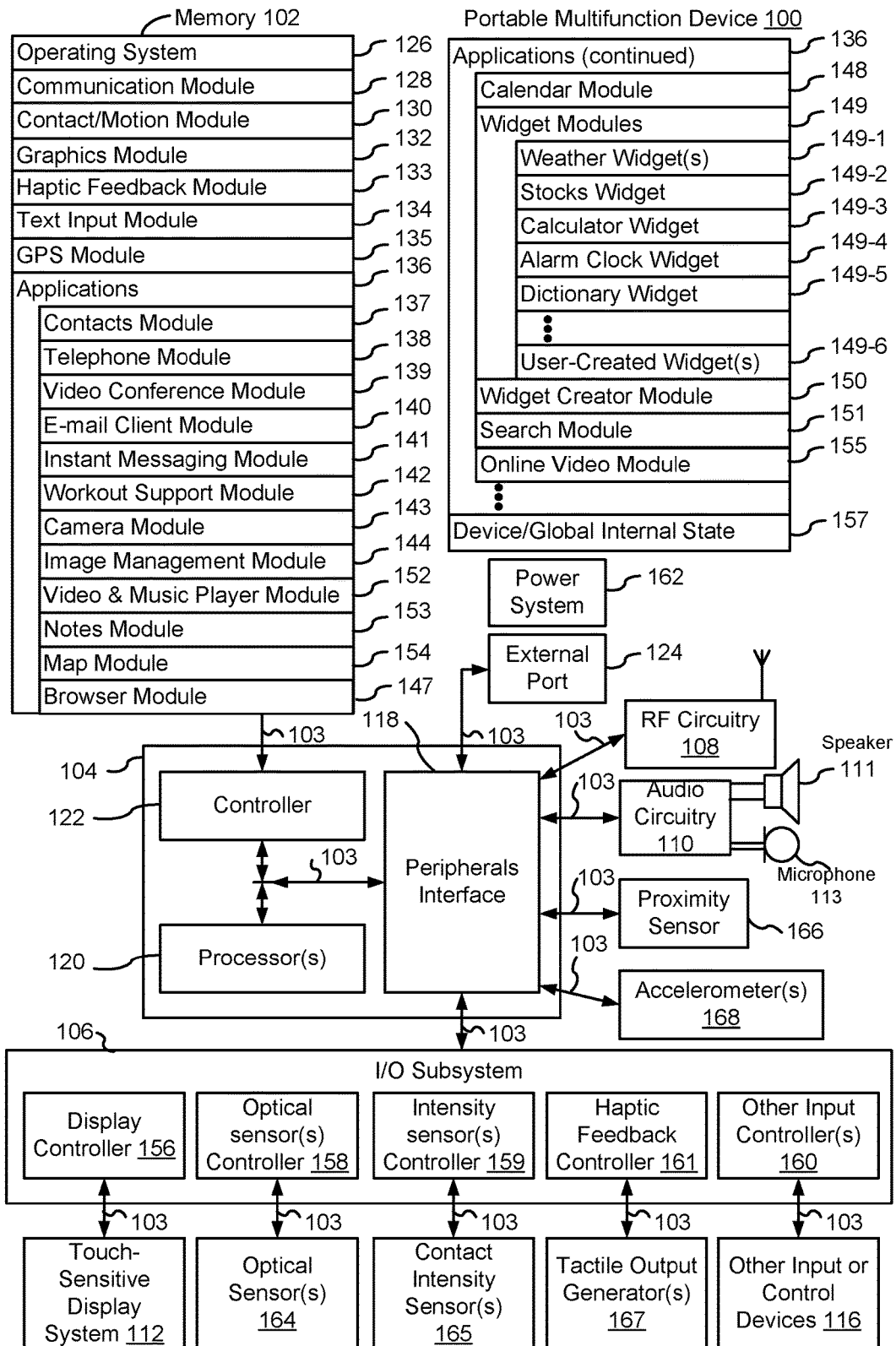
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4D:
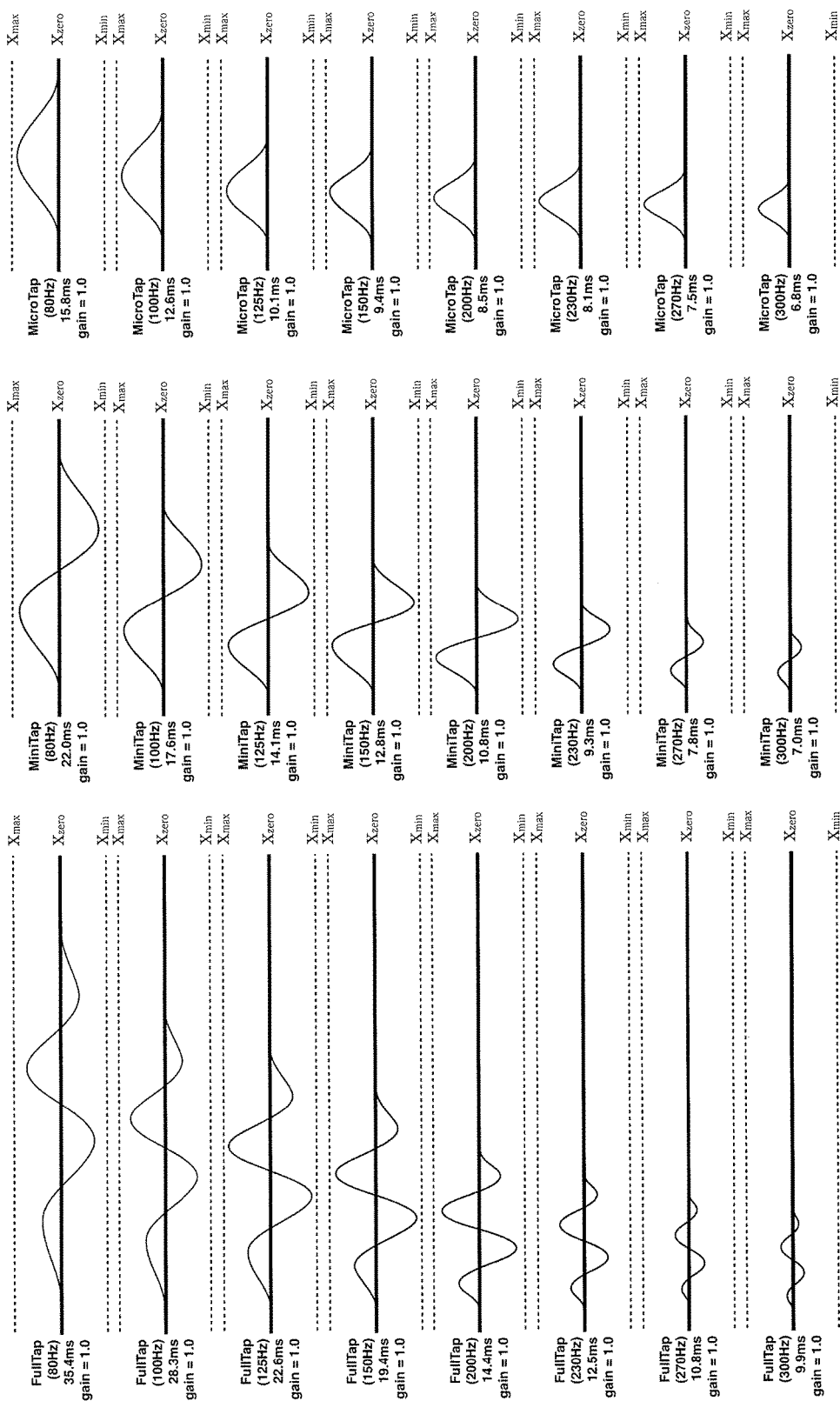
FIGS. 4D-4E illustrate a set of sample tactile output patterns in accordance with some embodiments.
Figure 4E:
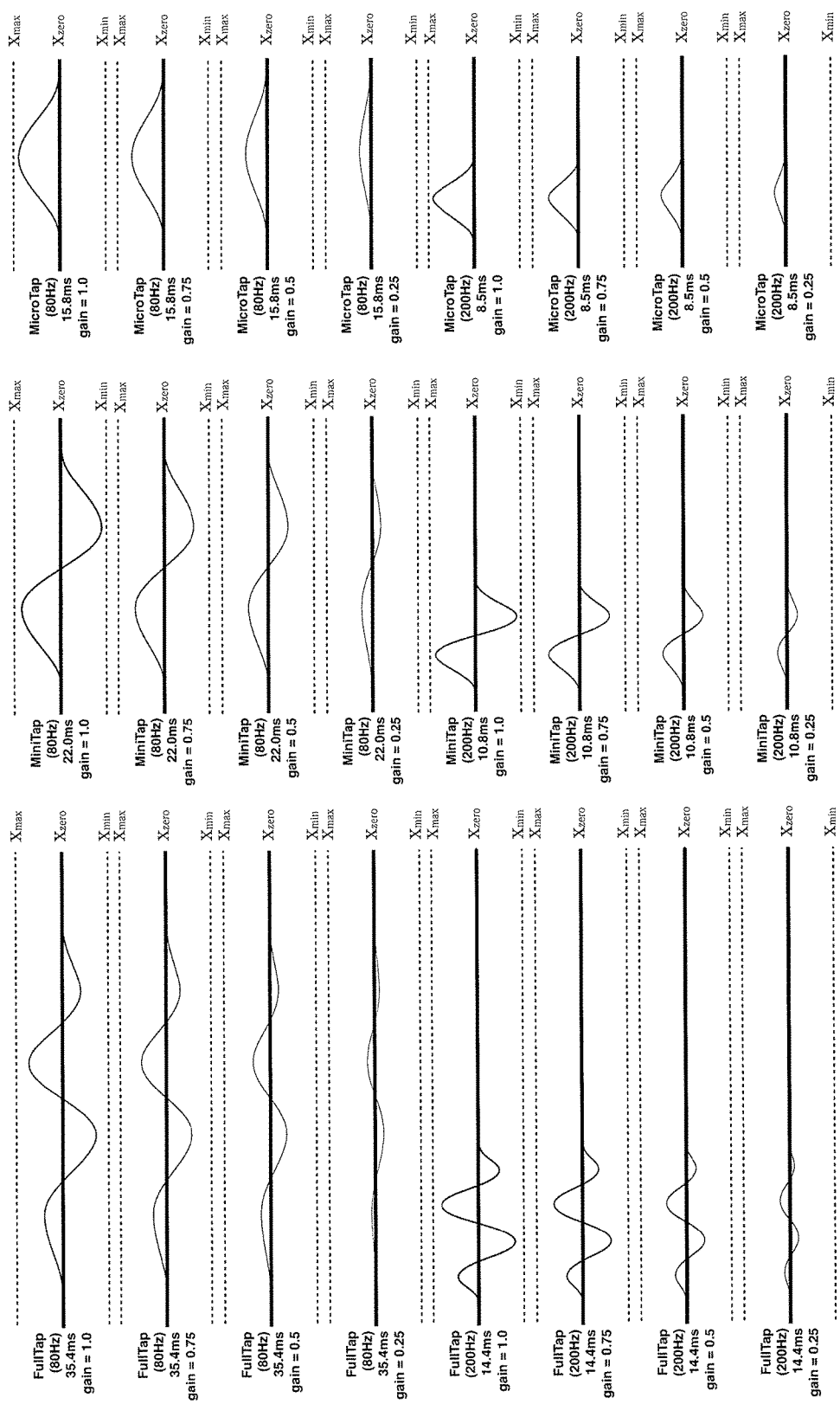

FIG. 4D provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4E, which are each shown with variants having a gain of 1.0, 0.75, 0.5, and 0.25. As shown in FIG. 4E, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 hz, 100 Hz, 125 Hz, and 200 Hz).

In FIG. 4D, each column shows tactile output patterns that have a particular waveform. The waveform of a tactile output pattern represents the pattern of physical displacements relative to a neutral position (e.g., xzero) versus time that a moveable mass goes through to generate a tactile output with that tactile output pattern. For example, a first set of tactile output patterns shown in the left column in FIG. 4D (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4D (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4D (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4D-4E include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4D-4E describes movement of a mass in 1 dimension; however similar principles would also apply to movement of a moveable mass in two or three dimensions.

As shown in FIG. 4D, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4D, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4D). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4D, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4D for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 provides examples of particular haptic feedback behaviors, configurations, and examples of their use.

TABLE 1

| Behavior Configuration | Feedback Configuration | Examples |
|---|---|---|
| User Interface Haptics | | |
| Retarget Default | MicroTap High (270 Hz) Gain: 0.4 Minimum Interval: 0.05 | Drag calendar event across day boundary Retarget in orb quick action menu Sliding over origin point in a scrubber Reaching 0 degrees when cropping/straightening Rearranging a list when items snap together |
| Retarget Strong | MicroTap High (270 Hz) Gain: 0.5 Minimum Interval: 0.05 | Retarget in A-Z scrubber |
| Retarget Picker | MicroTap High (270 Hz) Gain: 0.4 Minimum Interval: 0.05 | Spinning a wheel in the wheels of time user interface |
| Impact Default | MicroTap Medium (150 Hz) | Changing scrubbing speed when adjusting a slider Creating a new calendar event by tapping and holding |

TABLE 1-continued

| Behavior Configuration | Feedback Configuration | Examples |
|---|---|---|
| | Gain max: 0.8<br>Gain min: 0.0 | Activating a toggle switch (changing the switch from on to off or off to on)<br>Reaching a predefined orientation on a compass (e.g., every 45 degrees from North)<br>Reaching a level state (e.g., 0 degrees tilt in any axis for 0.5 seconds)<br>Dropping a pin in a map<br>Sending or receiving a message with an emphasis animation (e.g., "slam" effect)<br>Sending or receiving an acknowledgment of a message<br>Snapping a ruler to different orientations (e.g., every 45 degrees)<br>Crossing over a suggested photo while scrubbing through a burst of photos<br>Crossing over a detent in a scrubber (e.g., text size, haptic strength, display brightness, display color temperature)<br>Transaction failure notification (ApplePay Failure) |
| Impact Light | MicroTap<br>Medium<br>(150 Hz)<br>Gain max: 0.6<br>Gain min: 0.0 | Picking up an existing item (e.g., a calendar event, a favorite in web browser)<br>Moving a time selector over a minor division of time (e.g., 15 min) in sleep alarm |
| Impact Strong | MicroTap<br>Medium<br>(150 Hz)<br>Gain max: 1.0<br>Gain min: 0.0 | Moving a time selector over a major division of time (e.g., 1 hour) in sleep alarm |
| Edge Scrubber | MicroTap<br>Medium<br>(150 Hz)<br>Gain max: 0.6<br>Gain min: 0.3 | Dragging a brightness scrubber to an edge of the scrubber<br>Dragging a volume scrubber to an edge of the scrubber |
| Edge Zoom | MicroTap<br>High (270 Hz)<br>Gain: 0.6 | Reaching maximum zoom level when zooming into a photo<br>Re-centering a map |
| Drag Default | MicroTap<br>High (270 Hz)<br>Gain Pickup: 1.0<br>Gain Drop: 0.6 | Pickup and drop an event in calendar |
| Drag Snapping | MicroTap<br>High (270 Hz)<br>Gain Pickup: 1.0<br>Gain Drop: 0.6<br>Gain Snap: 1.0 | Rearrange lists in weather, contacts, music, etc. |
| States Swipe Action | Swipe in:<br>MiniTap High (270 Hz)<br>Gain: 1.0<br>Swipe out:<br>MicroTap<br>High (270 Hz)<br>Gain: 0.55 | Swipe to delete a mail message or conversation<br>Swipe to mark a mail message as read/unread in mail<br>Swipe to delete a table row (e.g., a document in a document creation/viewing application, a note in a notes application, a location in a weather application, a podcast in a podcast application, a song in a playlist in a music application, a voice memo in a voice recording application<br>Swipe to delete a message while displaying a pressure-triggered preview<br>Swipe to mark a message as read/unread while displaying a pressure-triggered preview<br>Swipe to delete a news article<br>Swipe to favorite/love a news article |
| Button Default | MicroTap<br>High (270 Hz)<br>Gain: 0.9 | Reply to message/conversation<br>Adding a bookmark in an electronic book reader application<br>Activating a virtual assistant<br>Starting to record a voice memo<br>Stopping recording a voice memo |
| Button Destructive | MiniTap Low (100 Hz)<br>Feedback Intensity: 0.8 | Delete message/conversation |
| Event Success | FullTap<br>Medium<br>(200 Hz)<br>Gain: 0.7 | Confirmation that a payment has been made<br>Alert that authentication is needed to make a payment (e.g., biometric authentication or passcode authentication) |

TABLE 1-continued

| Behavior Configuration | Feedback Configuration | Examples |
|---|---|---|
| | MiniTap High (270 Hz) Gain: 1.0 | Adding a payment account to an electronic wallet application |
| Event Error | MiniTap High (270 Hz) Gain: 0.85 Gain: 0.75 FullTap Medium (200 Hz) Gain: 0.65 FullTap Low (150 Hz) Gain: 0.75 | Failure to process a payment transaction Failure to authenticate a fingerprint detected on a fingerprint sensor Incorrect passcode/password entered in a passcode/password entry UI |
| Event Warning | FullTap High (300 Hz) Gain: 0.9 FullTap Custom (270 Hz) Gain: 0.9 | Shake to undo |
| | | Force Press |
| States Preview | MicroTap Custom (200 Hz) Gain: 1.0 | Orb - Peek/Preview (e.g., peek at a mail message) |
| States Preview | FullTap Custom (150 Hz) Gain: 1.0 | Orb - Pop/Commit (e.g., pop into full mail message) |
| States Preview | MicroTap Custom (200 Hz) Gain: 1.0 | Orb - Unavailable (e.g., press hard on an app icon that doesn't have any associated quick actions) |
| | | System Haptics |
| Device Locked | MicroTap Medium (150 Hz) Gain: 1.0 MiniTap Medium (150 Hz) Gain: 1.0 | Press power button once to lock device |
| Vibe on Attach | Vibe at 150 Hz that gradually increases or decreases in amplitude | Attach device to power source |
| Ringtones & Alerts | Custom tactile output using one or more of: Vibe 150 Hz MicroTap 150 Hz MiniTap 150 Hz FullTap 150 Hz | Receive phone call or text message |
| | | Solid-State Home Button |
| 1 ("Tick") | MiniTap 230 Hz Gain: 1.0 | Press home button with click option 1 selected |
| 2 ("Tak") | MiniTap 270 Hz Gain: 1.0 | Press home button with click option 2 selected |
| 3 ("Tock") | MiniTap 300 Hz Gain: 1.0 | Press home button with click option 3 selected |

The examples shown above in Table 1 are intended to illustrate a range of circumstances in which tactile outputs can be generated for different inputs and events. Table 1 should not be taken as a requirement that a device respond to each of the listed inputs or events with the indicated tactile output. Rather, Table 1 is intended to illustrate how tactile outputs vary and/or are similar for different inputs and/or events (e.g., based on the tactile output pattern, frequency, gain, etc.). For example Table 1 shows how an "event success" tactile output varies from an "event failure" tactile output and how a retarget tactile output differs from an impact tactile output.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;

e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
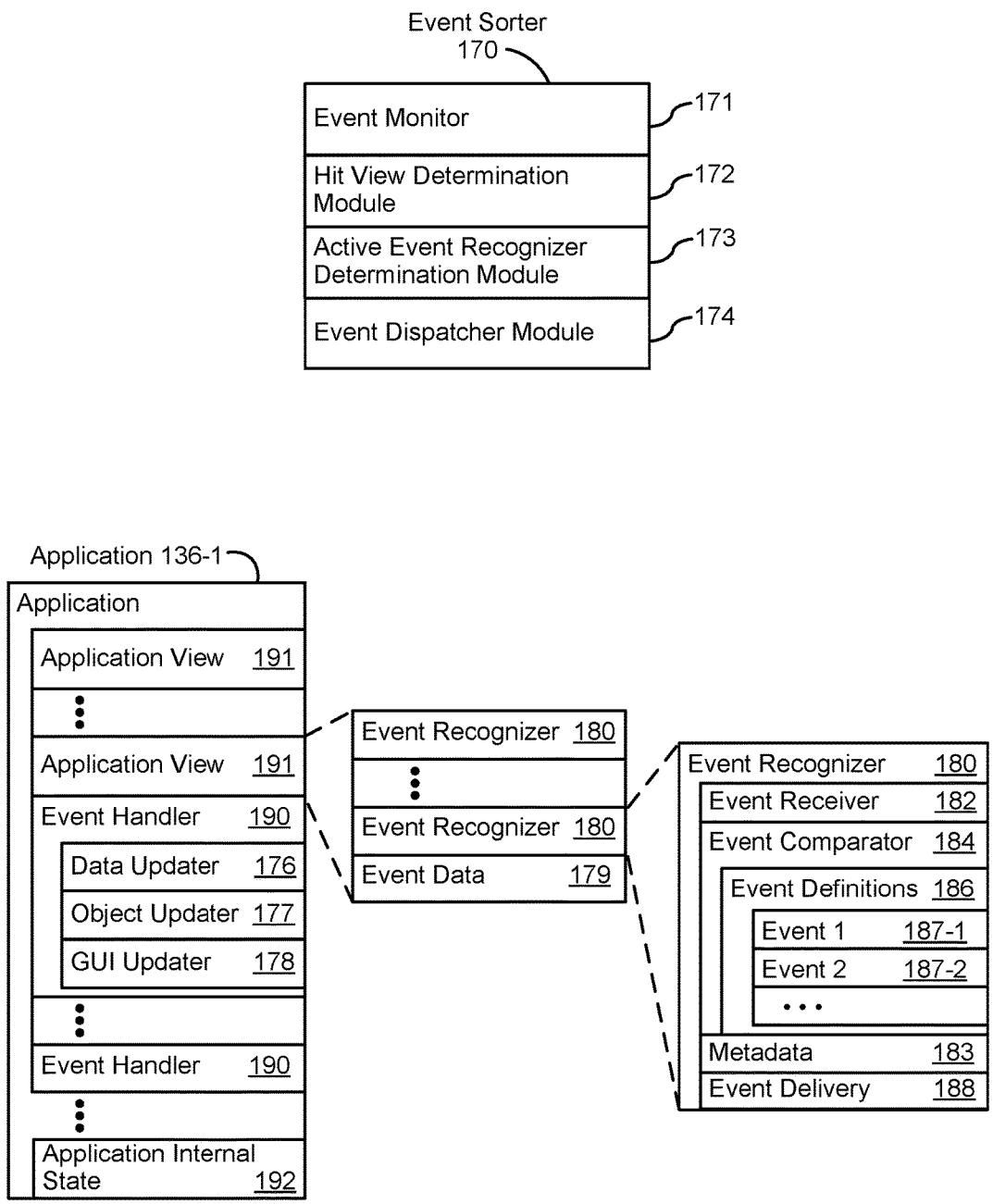
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
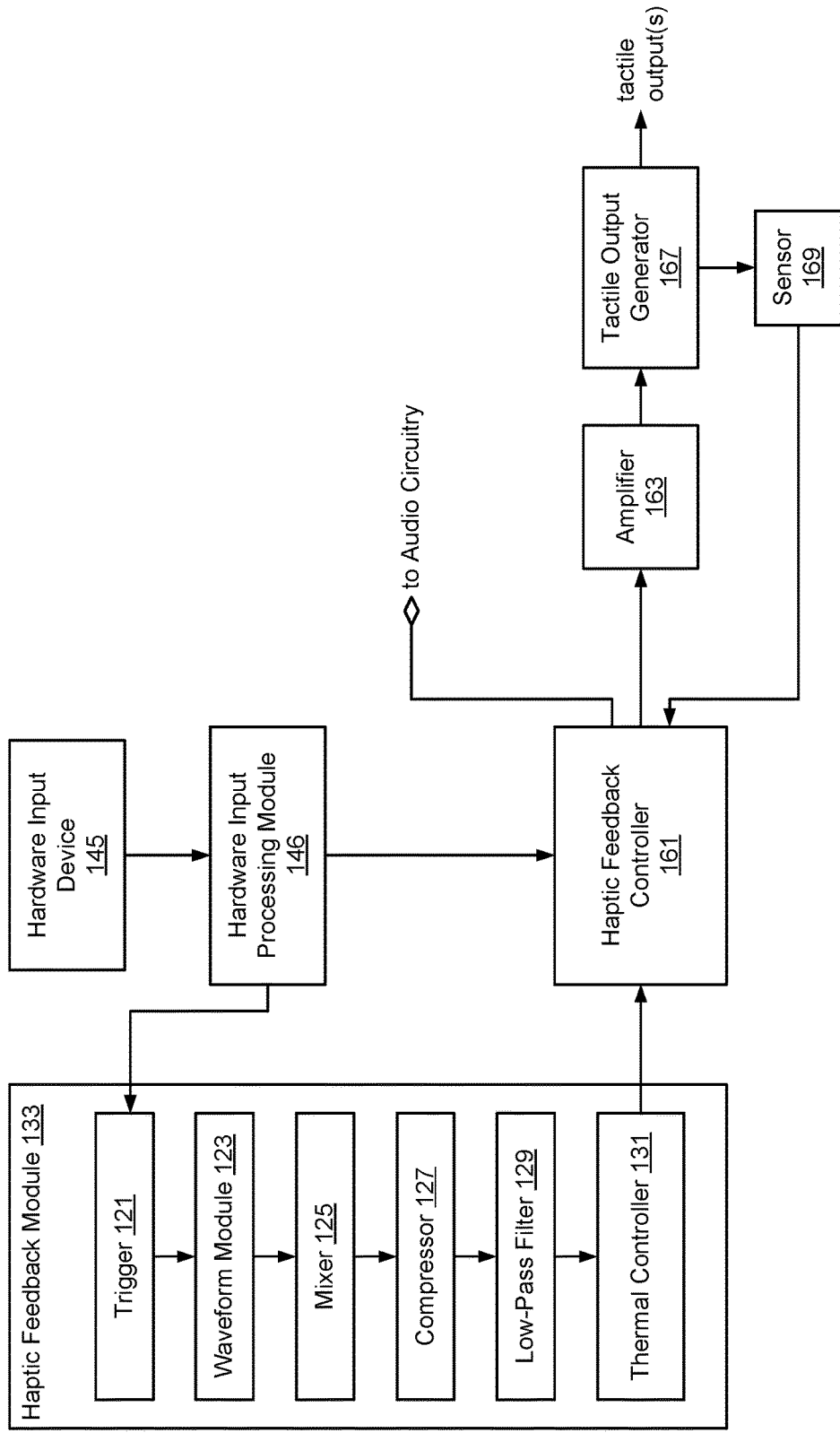
FIG. 1C is a block diagram of a haptic engine in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4D-4E).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button (e.g., a home button with a mechanical actuator). In some embodiments, hardware input device 145 consists of an intensity-sensitive home button (e.g., a home button with a mechanical actuator), and not touch-sensitive display system 112 (FIG. 1A), keyboard/mouse 350 (FIG. 3), or touchpad 355 (FIG. 3). In some embodiments, in response to inputs from hardware input device 145, hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
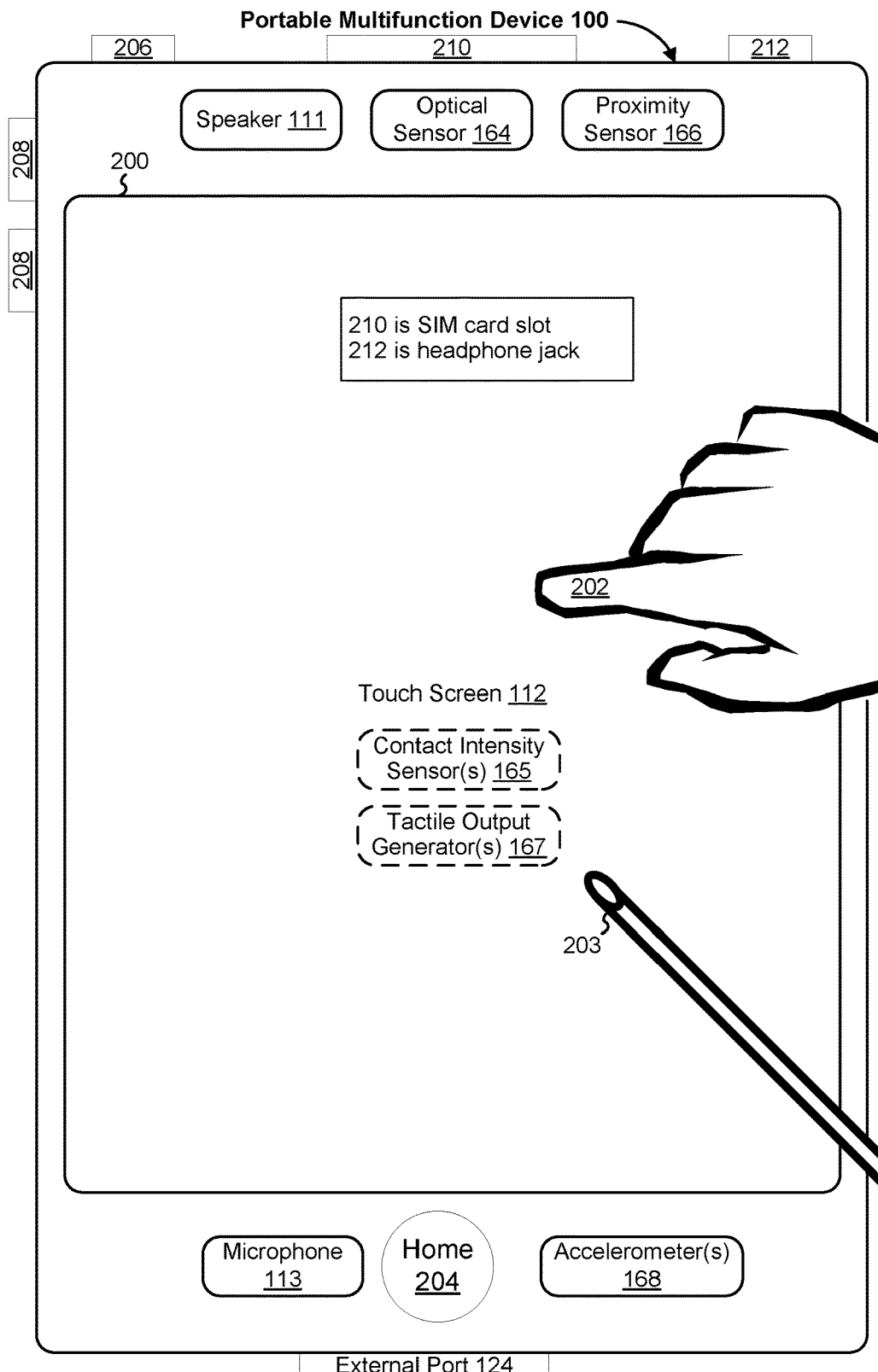
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4A also shows an input 403, such as a finger or stylus contact on home button 204. A finger or stylus contact is sometimes herein called a touch input. In some embodiments, home button 204 is separate from the display 112 and, optionally, includes a set of one or more intensity sensors that are separate from intensity sensors used to detect the intensity of inputs on the display. In some embodiments, home button 204 is a virtual home button that is displayed on the display (e.g., with a set of one or more intensity sensors that are separate from intensity sensors used to detect the intensity of inputs on the display or, optionally, using intensity sensors integrated into the display to determine an intensity of an input with the virtual home button).

In some embodiments, or in some circumstances, input 403 on home button 204 causes tactile output 409 to be generated. For example, a respective tactile output 409 may be generated in response to a single click, double click, long press, or other input or input gesture on home button 204. Similarly, FIG. 4A also shows another input 407, such as a finger or stylus contact on application icon 424. In some embodiments, or in some circumstances, input 407 on application icon 204 causes a respective tactile output 411 to be generated. For example, respective tactile output 411 may be generated in response to a single click, double click, long press, or other input or input gesture on application icon 424. Furthermore, in some embodiments, tactile output 409 may have higher priority than tactile output 411, for example because tactile output 409 corresponds to an input on a hardware element (e.g., home button 204), and tactile output 411 corresponds to an input on a user interface element (e.g., an application icon) displayed on the electronic device's display 112.

FIG. 4B illustrates an example user interface on a device (e.g., device 300, FIG. 3) with a touch-sensitive surface 451

(e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

FIG. 4C illustrates an example user interface 472 on a device 100 (e.g., device 300, FIG. 3). In this example, user interface 472 includes a notification 413 (e.g., an invitation to attend an event) produced in response to an electronic message received by device 100. Notification 413 is asynchronous with respect to any action by the user of device 100, as it is not triggered by a user input on a touch-sensitive surface or hardware element. In some embodiments, device 100 generates a tactile output 415 in response to, or in conjunction with, displaying notification 413. Furthermore, in some embodiments, tactile output 415 has a lower priority than tactile outputs generated in response to a user input on a hardware element, and lower priority than tactile outputs generated in response to a user input on a graphical user interface element displayed on a display of the electronic device.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

FIGS. 5A-5L illustrate examples of tactile outputs, combinations of tactile outputs, and corresponding audio outputs, in accordance with some embodiments. It is noted that examples of tactile outputs are discussed above with reference to FIGS. 4D-4E, and such examples are applicable to the tactile outputs discussed herein with respect to FIGS. 5A-5L and methods 600, 700 and 800. The tactile outputs and audio outputs shown in FIGS. 5A-5L are used to illustrate the processes described below, including the processes in FIGS. 6A-6F, 7A-7D, and 8A-8D.

For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
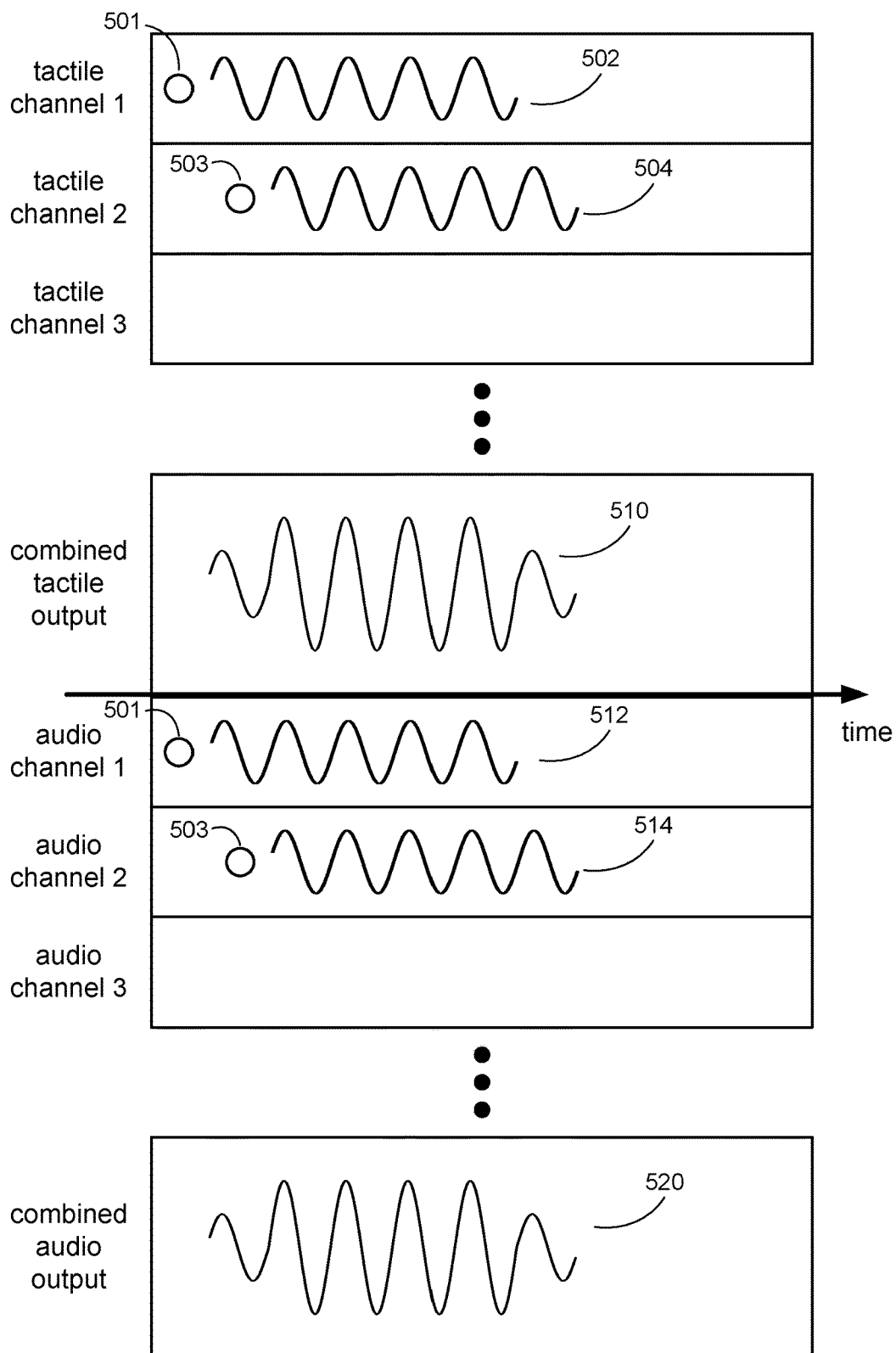
FIGS. 5A-5L illustrates tactile outputs, combinations of tactile outputs, and optionally, corresponding audio outputs, in accordance with some embodiments.

FIG. 5A illustrates a first tactile output 502 on a first tactile channel (tactile channel 1) and a second tactile output 504 on a second tactile channel, and a combined tactile output 510 (sometimes herein called "combined tactile outputs") resulting from combining the first and second tactile outputs. First tactile output 502 corresponds to a first request to generate a tactile output, or a first input (e.g., an input corresponding to a user interface element displayed on the display of an electronic device), or first triggering condition (e.g., a triggering condition for a first set of one or more tactile outputs with a first priority), represented by indicator 501. Similarly, second tactile output 504 corresponds to a second request to generate a tactile output, or second input (e.g., an input corresponding to the one or more hardware elements of an electronic device), or second triggering condition (e.g., a triggering condition for a second set of one or more tactile outputs with a second priority), represented by indicator 503. Optionally, additional tactile outputs (not shown in FIG. 5A, but see FIG. 5C) in additional tactile channels are combined with the first and second tactile outputs 502, 504, to produce combined tactile output 510.

In some embodiments, or in some circumstances, combining two or more tactile outputs is accomplished by mixing the two or more tactile outputs, optionally with additional processing performed to condition one or more portions of one or more of the tactile outputs and/or to condition one or more portions of the combined tactile output 510. However, in the example in FIG. 5A, no such additional processing has been performed. For example, in the example in FIG. 5A, no additional processing is needed because the number of tactile outputs to be combined does not exceed a predefined limit, and because the amplitude of the combined tactile output does not exceed a predefined amplitude limit.

Optionally, at the same time, or during an overlapping time, as the tactile outputs 502 and 504 are generated and combined, one or more audio output signals are generated and combined. In the example shown in FIG. 5A, a first audio output 512 corresponds to the first request, first input or first triggering condition represented by indicator 501, and a second audio output 514 corresponds to the second request, second input or second first triggering condition represented by indicator 503. In other words, the same requests, inputs or triggering conditions 501 and 503 that corresponding to tactile outputs 502 and 504, respectively, also correspond to audio outputs 512 and 514, respectively. As shown, the first and second audio outputs 512 and 514 are combined to produce combined audio output 520 that is played (e.g., to produce an audible signal) during a time period that is the same as, or overlaps with, the time period during which combined tactile output are output, for example, using one or more tactile output generators.

In some embodiments, one or more of the tactile outputs 502, 504 are part of synchronized tactile and audio outputs such as one or more of 502/512, and 504/514, that include both an audio output and a corresponding tactile output that are synchronized to occur with a particular temporal alignment.

To simply the description of FIGS. 5B-5L, the descriptions provided above regarding the correspondence between request, inputs or triggering conditions, such as those indicated by indicators 501 and 503, and tactile outputs, such as tactile outputs 502 and 504, and optionally audio outputs, such as audio outputs 512 and 514, will not be repeated. Similarly, the fact that a respective combined tactile output 510 is output using one or more tactile output generators, and that a respective combined audio output 520 is played to produce an audible signal, will not be repeated unless further comment or explanation is provided.

Figure 5B:
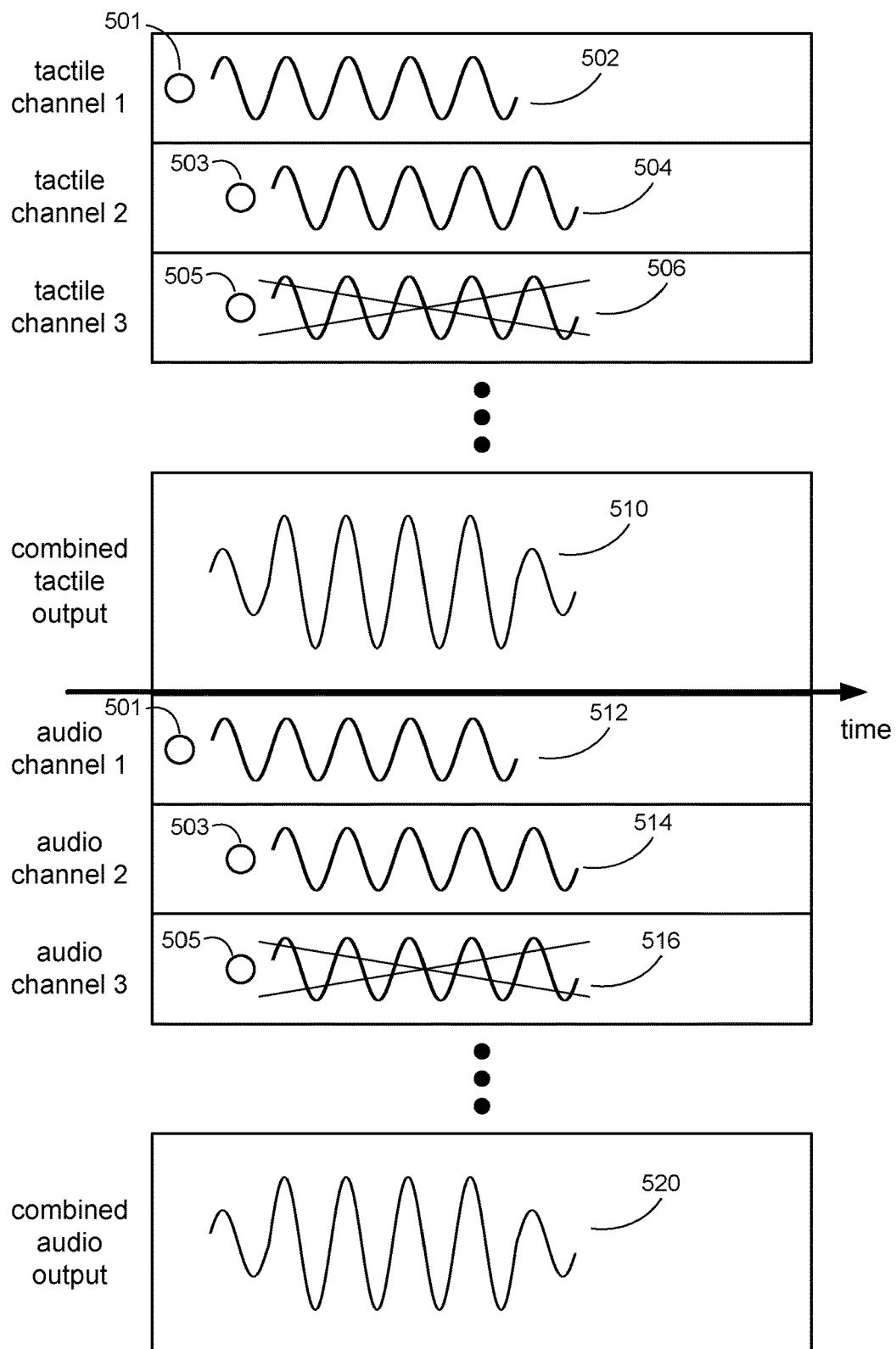

FIG. 5B is similar to FIG. 5A, except that in the example shown in FIG. 5B, in addition to the first and second tactile outputs 502, 504, a third tactile output 506 corresponds to a third request to generate a tactile output, third input (e.g., an input corresponding to a user interface element displayed on the display of an electronic device), or third triggering condition (e.g., a triggering condition for a third set of one or more tactile outputs with a third priority), represented by indicator 505.

In this example, the number of tactile outputs exceeds the threshold number of tactile outputs that are permitted to be mixed together for concurrent output via the one or more tactile output generators. As a result, a subset of the tactile outputs is combined or mixed together, excluding at least one of the tactile outputs, to produce combined tactile output 510. Without limitation, examples of the threshold number of tactile outputs that are permitted to be mixed together for concurrent output via the one or more tactile output generators are two, three and four.

Similarly, in some embodiments, the number of audio outputs can exceed a threshold number of audio outputs that are permitted to be combined together for concurrent output via one or more speakers. As a result, a subset of the audio outputs are combined, or mixed together, excluding at least one of the audio outputs, to produce the combined audio output 520. Without limitation, examples of the threshold number of audio outputs that are permitted to be mixed together for concurrent output via the one or more tactile output generators are two, three, four, five, six, seven and eight. In some embodiments, or in some situations, audio outputs are combined, without exclusion of any of the plurality of audio outputs that have been requested or triggered, while tactile outputs are combined with exclusion of one or more of the plurality of tactile outputs that have been requested or triggered.

In some embodiments, one or more of the tactile outputs 502, 504, 506 are part of synchronized tactile and audio outputs such as one or more of 502/512, 504/514, and 506/516, that include both an audio output and a corresponding tactile output that are synchronized to occur with a particular temporal alignment.

Figure 5C:
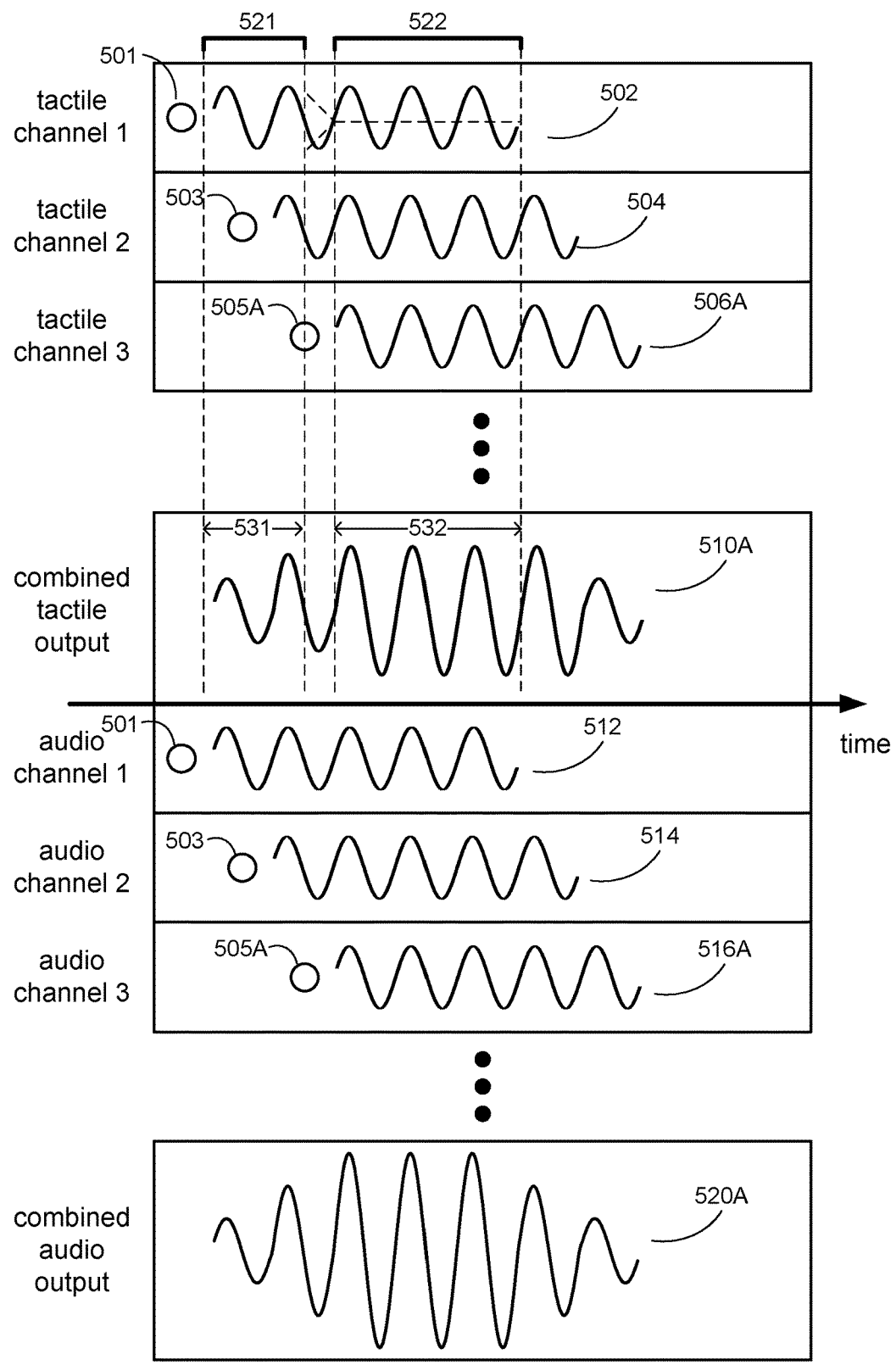

FIG. 5C is similar to FIG. 5B, except that in the example shown in FIG. 5C, third tactile output 506A and corresponding third request, third input or third triggering condition indicated by indicator 505A occurs later than the corresponding items in FIG. 5B, so that third tactile output 506A only partially overlaps with first tactile output 502. In this example, third tactile output 506 does not overlap with a first portion 521 of first tactile output 502. Further, in this example, first portion 521 of first tactile output 502 is output, as part of a first portion 531 of combined tactile output 510A.

In this example, third tactile output 506 overlaps with a second, later portion 522 of first tactile output 502. If the combination of third tactile output 506 with the first and second tactile outputs 502, 504, does not exceed the threshold number of tactile outputs that is permitted to be mixed together for concurrent output via the one or more tactile output generators, third tactile output 506 is mixed with the first and second tactile outputs 502, 504 to generate the second portion 532 of combined tactile output 510A, without excluding the second portion of first tactile output 502. On the other hand, if the combination of third tactile output 506 with the first and second tactile outputs 502, 504, exceeds the threshold number of tactile outputs that is permitted to be mixed together for concurrent output via the one or more tactile output generators, third tactile output 506 is mixed with the first and second tactile outputs 502, 504, but the second portion of first tactile output 502 is excluded while generating the second portion 532 of the combined tactile output 510A.

In this example, third audio output 516A partially overlaps with first and second audio outputs 512 and 514. As noted above, in some embodiments, as in this example, first audio output 512 is synchronized with first tactile output 502 and is triggered by a same condition that triggered first tactile output 502. Furthermore, in some embodiments, a combined audio output 520A is generated by combining the first, second and third audio outputs 512, 514 and 516, without regard to whether or not the second portion 522 of first tactile output 502 is excluded from the combined tactile output 510.

Figure 5D:
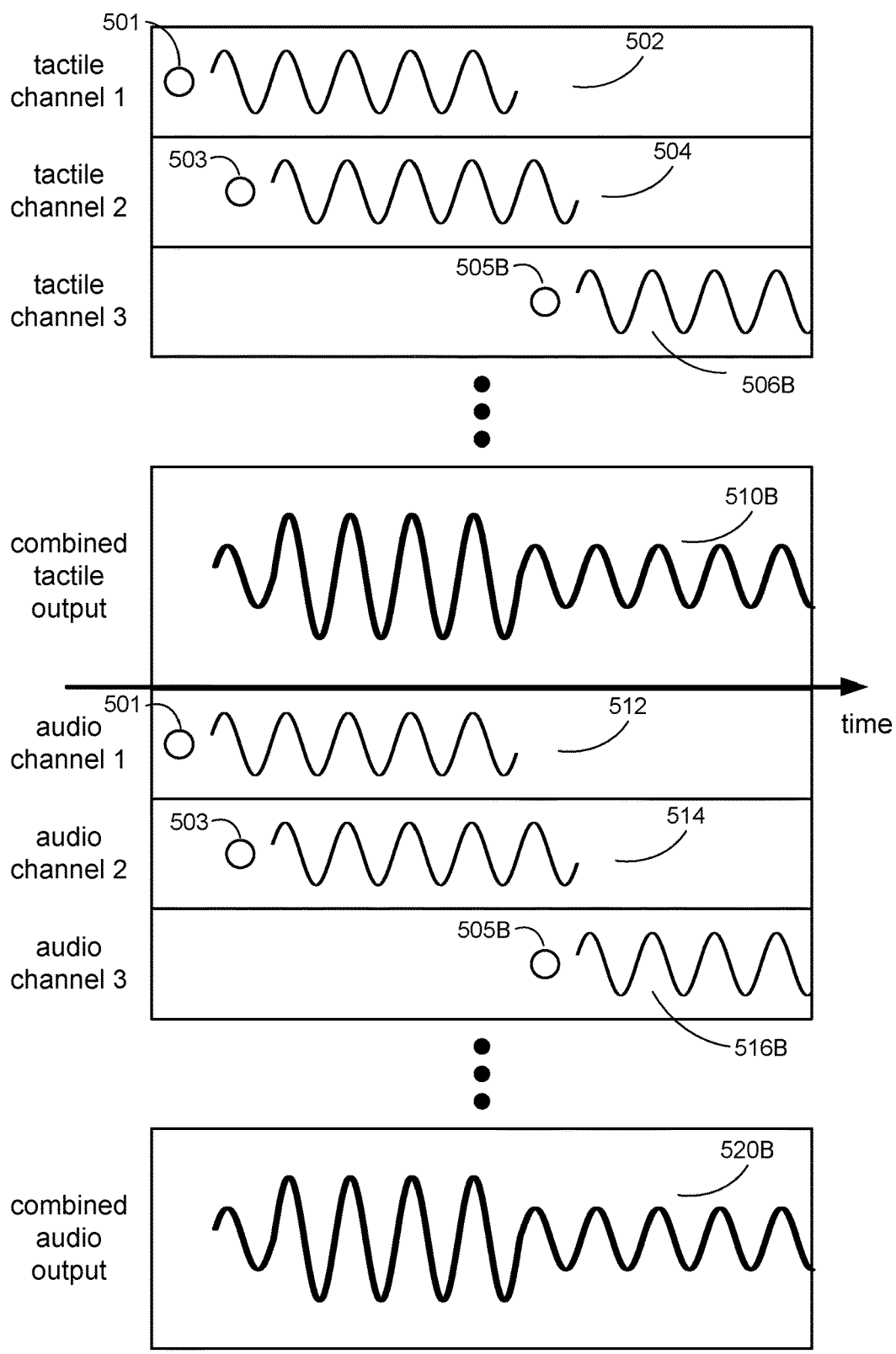

FIG. 5D illustrates an example in which first and second tactile outputs 502 and 504 and corresponding first and second audio outputs 512 and 514 are the same as shown in FIGS. 5A, 5B and 5C, but in this example, the additional (third) tactile output 506B does not overlap with first and second tactile outputs 502 and 504, and the additional (third) audio output 516B does not overlap with first and second audio outputs 512 and 514. Additional/third tactile output 506B and third audio output 516B correspond to additional/third request or input or triggering condition indicated by indicator 505B.

In the example shown in FIG. 5D, since additional/third tactile output 506B does not overlap with first and second tactile outputs 502 and 504, the number of overlapping or concurrent tactile outputs does not exceed the threshold number of tactile outputs that is permitted to be mixed together for concurrent output via the one or more tactile output generators. As a result, as shown in FIG. 5D, the combined tactile output 510B is produced by mixing the additional/third tactile output with the plurality (e.g., first and second) of earlier tactile outputs 502, 504, without excluding or reducing the scale of any of the tactile outputs being mixed.

Figure 5E:
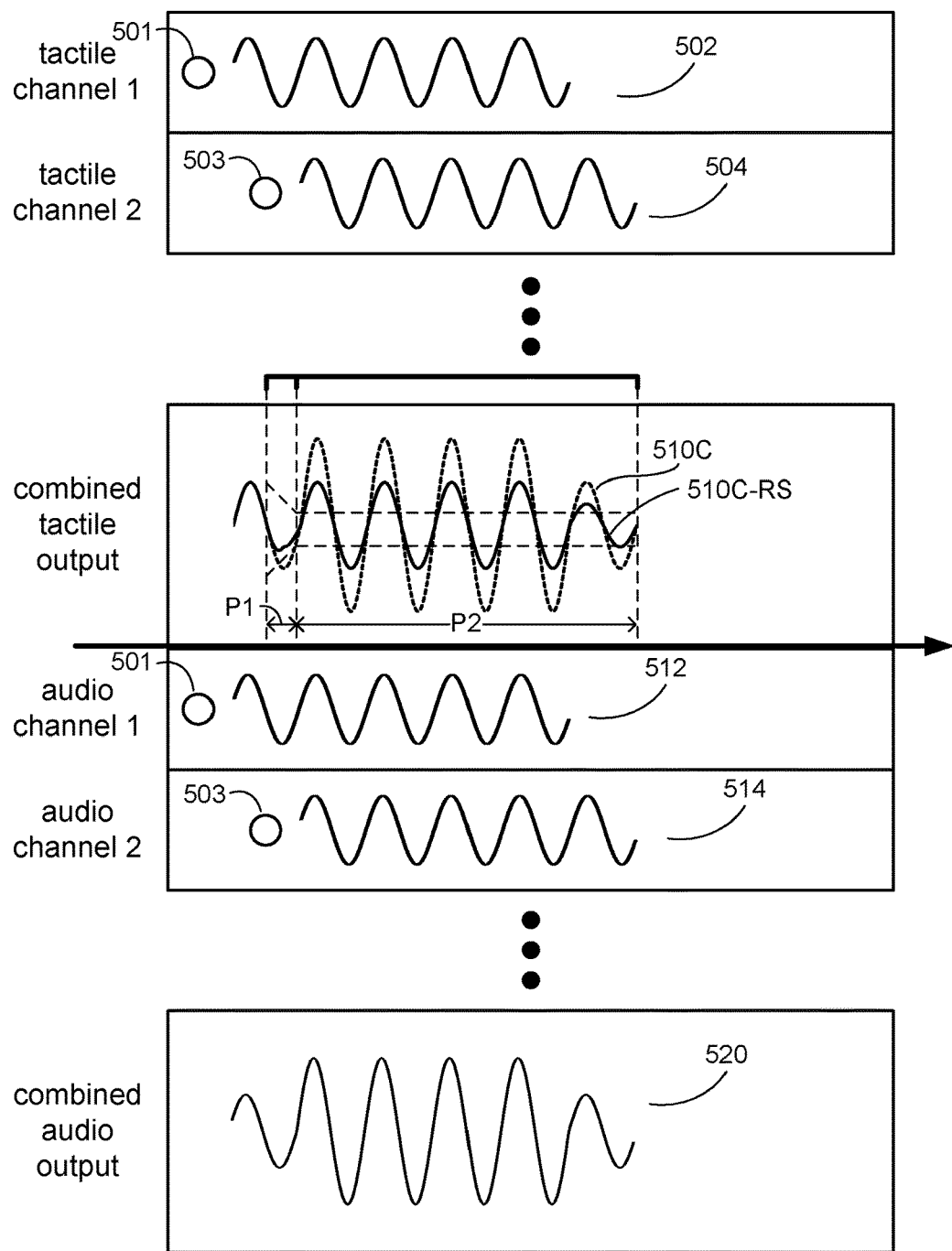

FIG. 5E illustrates a first tactile output 502 on a first tactile channel (tactile channel 1) and a second tactile output 504 on a second tactile channel, which are mixed to produce a combined tactile output 510C. In FIG. 5E, combined tactile output 510C is represented by a dashed line, while a modified version 510C-RS, the generation of which is described in more detail below, is represented by a solid line. Combined tactile output 510C includes a first portion P1 and a second portion P2. In this example, look ahead amplitude limiting is applied to combined tactile output 510C to ensure that the resulting combined tactile output 510C-RS (sometimes herein called combined tactile outputs) meets output limiting criteria for the one or more tactile output generators. More specifically, in accordance with a determination that the second portion P2 of the combined tactile output 510C (e.g., an amplitude of the second portion of the combined tactile output 510C) meets output limiting criteria for the one or more tactile output generators (e.g., by exceeding output limits for the one or more tactile output generators), a scale of the combined tactile output 510C is reduced during at least the first portion P1 of the combined tactile output 510C immediately preceding the second portion P2 of the combined tactile output 510C.

It is noted that the output limiting criteria for the one or more tactile output generators may correspond to physical limitations of the one or more tactile output generators. In some embodiments, ensuring compliance with the output limiting criteria for the one or more tactile output generators prevents damage to the one or more tactile output generators when the outputting of tactile output signals. Optionally, such damage includes accelerated wearing of the one or more tactile output generators, which would reduce the functional lifetime of the one or more tactile output generators.

In some embodiments, after reducing the scale of the combined tactile output during the first portion P1, the device continues to output, via the one or more tactile output generators, the combined tactile output 510C-RS with the reduced scale during the second portion P2. As a result, the amplitude of reduced second portion satisfies a predefined limit.

Furthermore, in some embodiments, as indicated in FIG. 5E, the reduced scale of combined tactile output 510C may vary. For example, in the first portion P1 of combined tactile output 510, the scale of combined tactile output 510C-RS may be smoothly reduced from an initial scale (e.g., 1.0) to a respective reduced scale (e.g., 0.6) such that the respective reduced scale is sufficient to ensure that the second portion of combined tactile output 510C-RS meets the output limiting criteria for the one or more tactile output generators. Then, in the second portion P2 of combined tactile output 510C-RS, the scale of combined tactile output 510C-RS is maintained at the respective reduced scale attained at the end of the first portion P1.

The resulting combined tactile output is a modified combined tactile output 510C-RS. It is noted that, at any instant in time while the scale of combined tactile output 510C-RS is being reduced, the amplitude of combined tactile output 510C-RS may be increasing or decreasing. This may be represented mathematically as:

$$\text{output}_{RS}(t) = \text{scale}(t) * \text{output}(t)$$

where $\text{output}_{RS}(t)$ is the resulting combined tactile output 510C-RS, and both the reduced scale, scale(t), and the combined tactile output 510C, output(t), can dynamically change over time. A tactile output sequence based on the modified combined tactile output 510-RS, including the first portion of the combined tactile output 510C-RS with reduced scale is output via the one or more tactile generators.

In the example shown in FIG. 5E, the processing of audio outputs 512 and 514, to produced combined audio output 520, is the same as in the example shown in FIG. 5A. In other words, while portions of combined tactile output 510C are reduced in scale to meet output limiting criteria for the one or more tactile output generators, audio outputs 512, 514 are combined without reduction in this example. From another viewpoint, or alternatively, while portions of combined tactile output 510C are reduced in scale to meet output limiting criteria for the one or more tactile output generators, audio outputs 512, 514 are combined independently of how tactile outputs 502, 504 are combined.

Figure 5F:
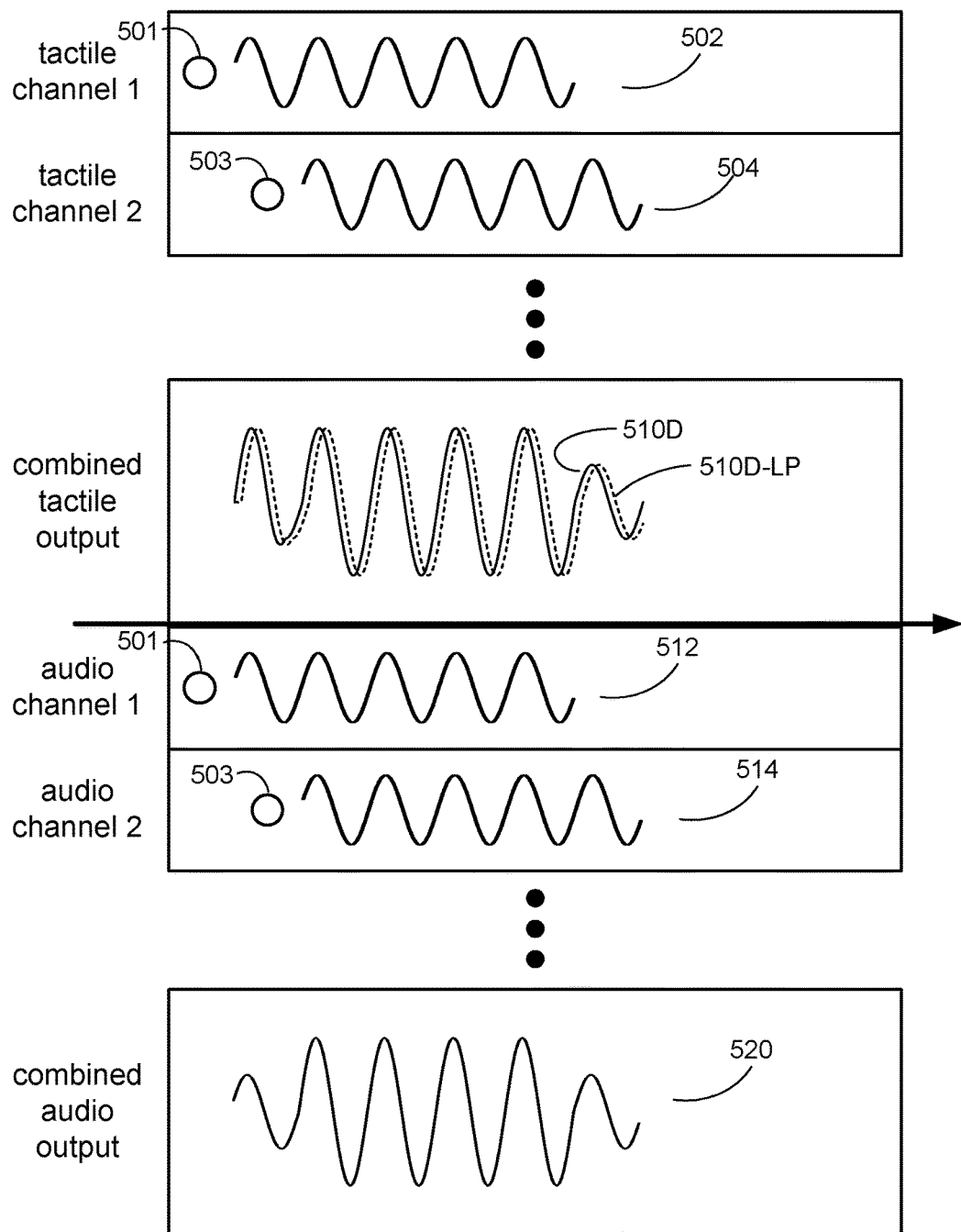

FIG. 5F illustrates an example in which at least a portion of a combined tactile output 510D, produced by mixing a plurality of tactile outputs such as tactile outputs 502 and 504, is low pass filtered so as to remove or reduce frequency components, if any, of the combined tactile output that are above a predefined cutoff frequency. Combined tactile output 510D is shown with a solid line in FIG. 5F, while the low pass filtered combined tactile output 510D-LP is shown with a dashed line.

In some embodiments, the entire combined tactile output 510D is low pass filtered, to ensure that the combined tactile output sent to the one or more tactile output generators does not include frequency components above the predefined cutoff frequency. In some other embodiments, portions of combined tactile output 510D produced by mixing two or more tactile outputs are low pass filtered, while at least some other portions, corresponding to tactile outputs or portions of tactile outputs not combined with other tactile outputs, are not low pass filtered.

In some embodiments, the low pass filter that is applied to combined tactile output 510D has a cutoff frequency that is set based on physical constraints on hardware of the device (e.g., for a device with a smaller tactile output generator that is capable of achieving higher frequencies, the low pass filter optionally has a higher cutoff frequency, while for a device with a larger tactile output generator that is not capable of achieving higher frequencies, the low pass filter optionally has a lower cutoff frequency). By setting the cutoff frequency of the low pass filter based on the capabilities of the device, applications, operating system modules, or UI elements or other elements of such applications and modules, can request the generation of tactile outputs without regard to the physical constraints of the hardware of the device, and the low pass filter will ensure that the tactile output generator of the device does not receive instructions to generate tactile outputs that it is not capable of generating, or is not capable of generating reliably or effectively.

Figure 5G:
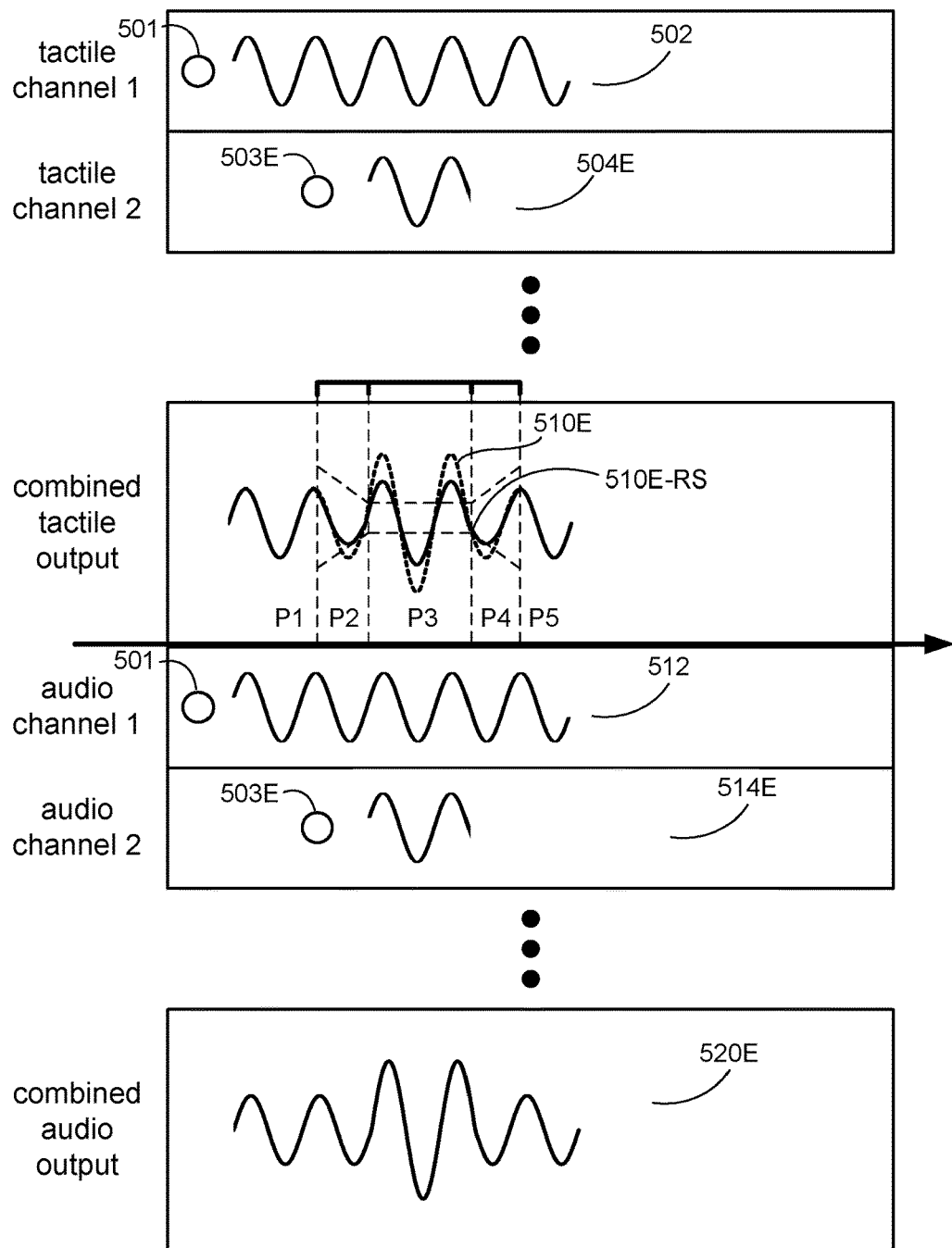
Figure 5H:
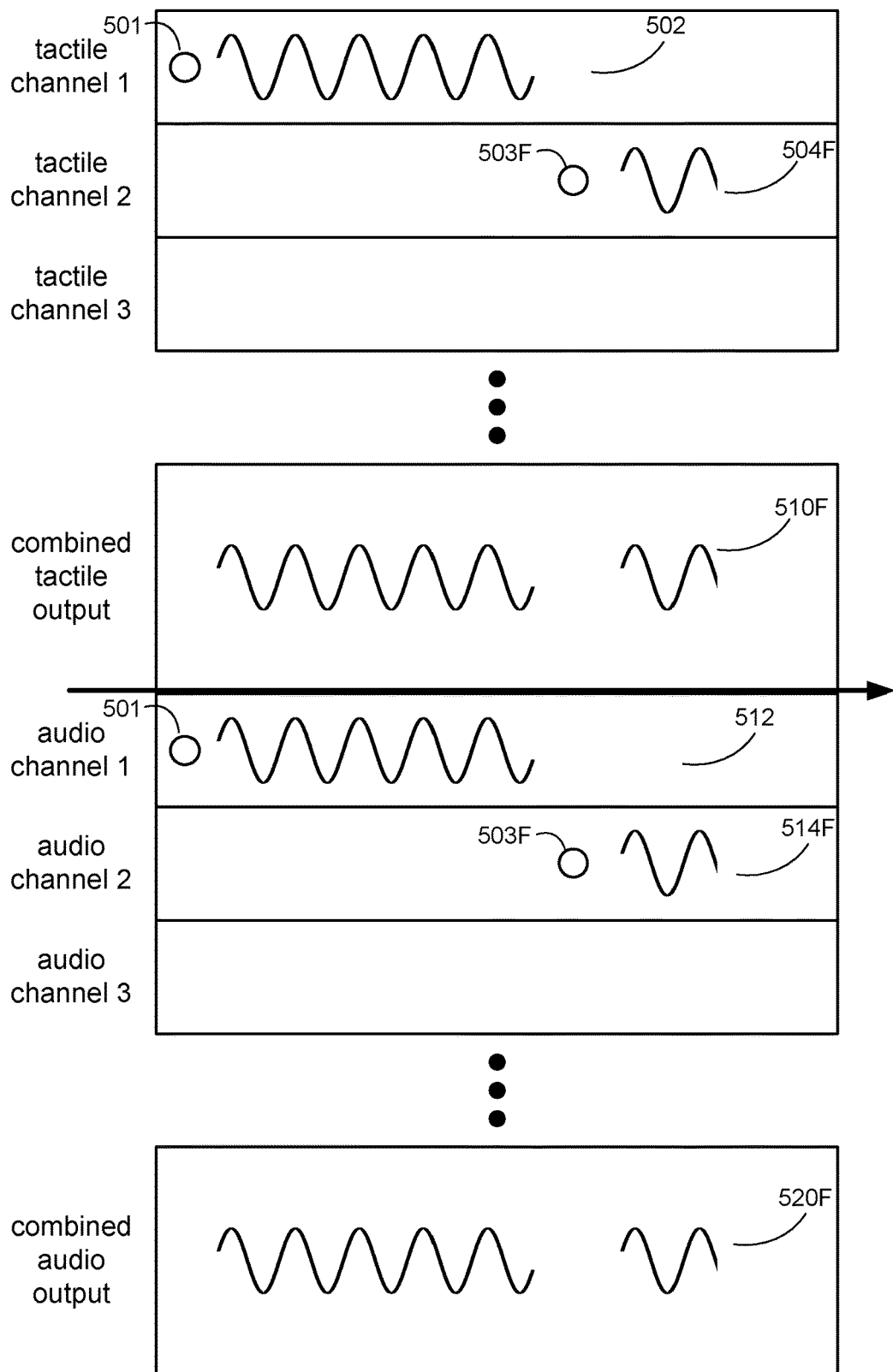
Figure 5I:
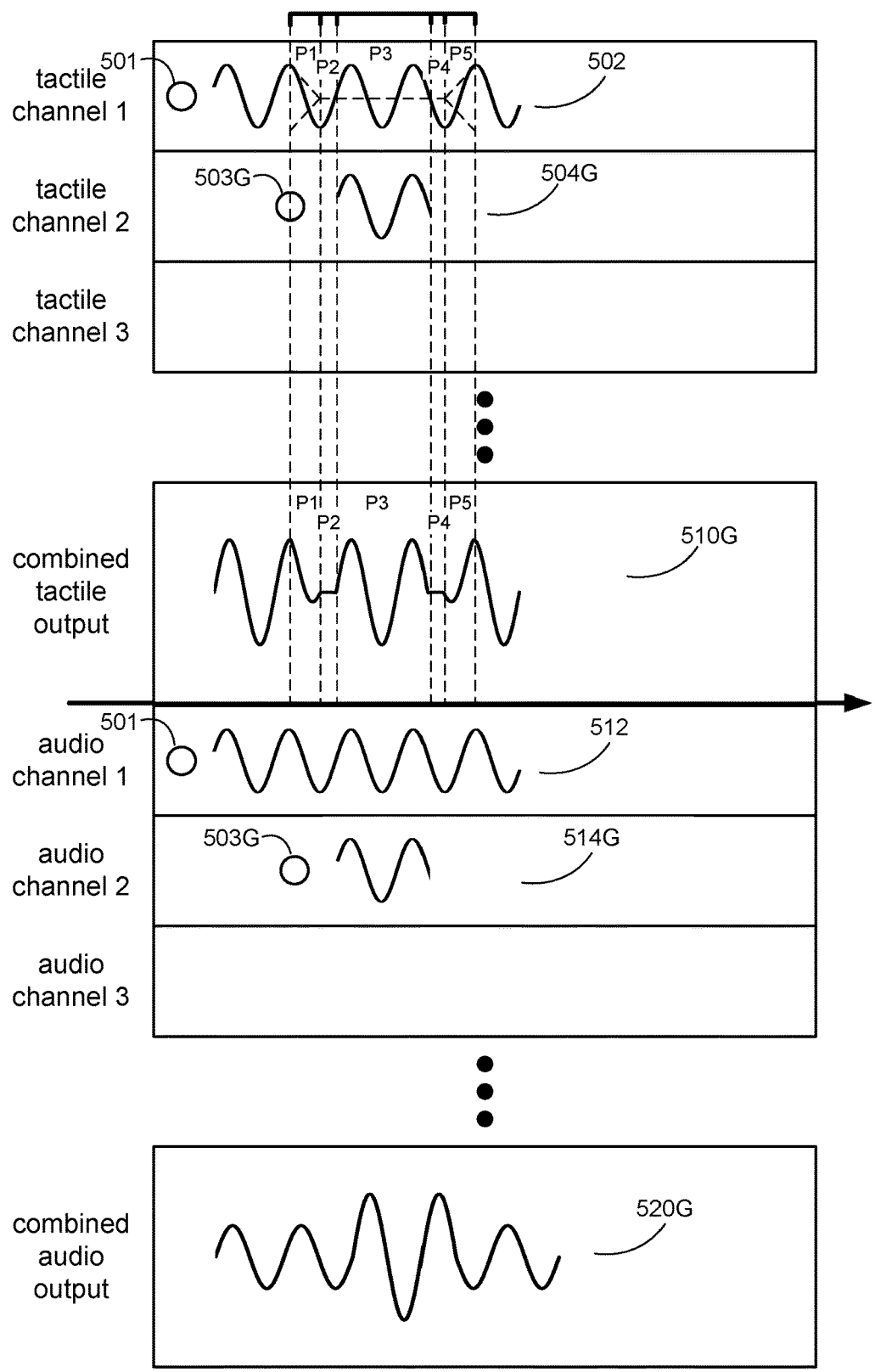

FIG. 5G illustrates an example in which a first tactile output 502 and a second tactile output 504E are mixed to produce a combined tactile output 510E, shown with a dashed line in FIG. 5G. A modified version of the combined tactile output 510E-RS, the generation of which is described in more detail below, is represented by a solid line. Combined tactile output 510E includes first through fifth successive portions P1, P2, P3, P4 and P5, as shown in FIG. 5G. In this example, look ahead amplitude limiting is applied to combined tactile outputs 510E to ensure that the resulting combined tactile outputs 510E-RS meets output limiting criteria for the one or more tactile output generators. More specifically, in accordance with a determination that the third portion P3 of the combined tactile output 510E (e.g., an amplitude of the portion P3 of the combined tactile output 510E) meets output limiting criteria for the one or more tactile output generators (e.g., by exceeding output limits for the one or more tactile output generators), a scale of the combined tactile output 510E is reduced during at least the second portion P2 of the combined tactile output 510E immediately preceding the third portion P3 of the combined tactile output 510E.

In some embodiments, after reducing the scale of the combined tactile output during the second portion P2, the device continues to output, via the one or more tactile output generators, the combined tactile output with the reduced scale during the third portion P3. As a result, the amplitude of the third portion P3 satisfies a predefined limit. In addition, after reducing the scale of the second portion P2 and third portion P3, the electronic device gradually increases the scale of the combined tactile output 510E-RS during at least a fourth portion P4 of the combined tactile output that follows the third portion P3, as shown in FIG. 5G.

In this example, the first and fifth portions P1 and P5 of combined tactile output 510E are not reduced in scale. Further, in some discussions of this example, portions P1 and P5 can be ignored, and as a result, portions P2, P3 and P4 are sometimes called the first, second and third portions of the combined tactile output, respectively.

In the example shown in FIG. 5G, the processing of audio outputs 512 and 514E, to produce combined audio output 520E, is the same as in the example shown in FIG. 5A. In other words, while portions of combined tactile output 510E are reduced in scale to meet output limiting criteria for the one or more tactile output generators, audio outputs 512, 514E are combined without reduction. Alternatively, while portions of combined tactile output 510G are reduced in scale to meet output limiting criteria for the one or more tactile output generators, audio outputs 512, 514E are combined independently of how tactile outputs 502, 504E are combined.

Figure 5J:
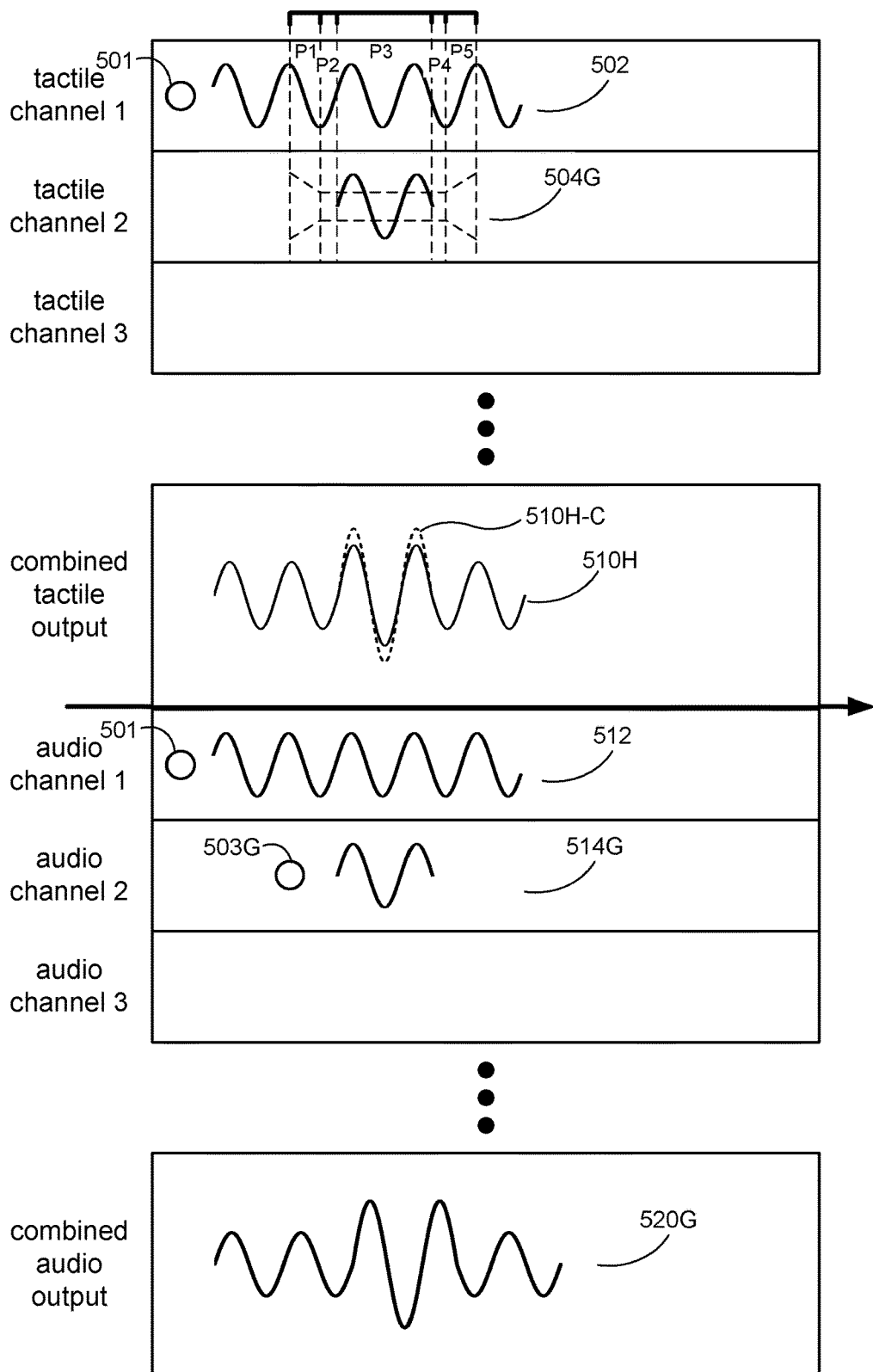
Figure 5K:
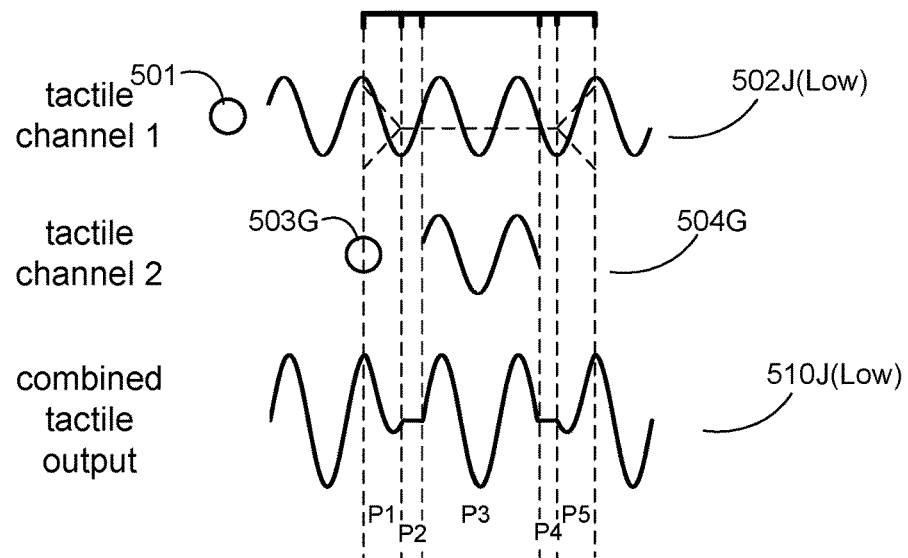
Figure 5K:
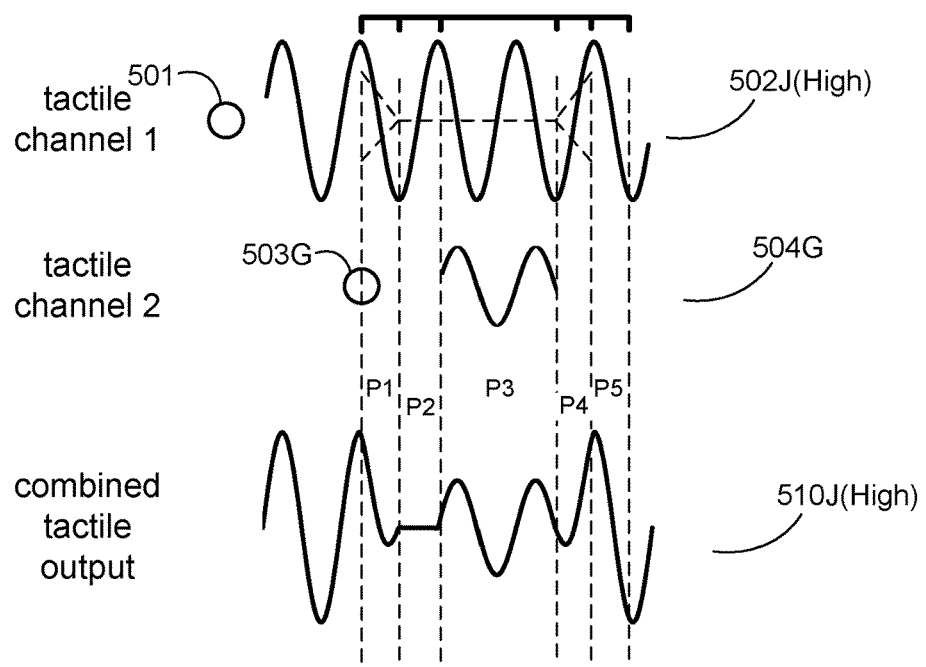
Figure 5L:
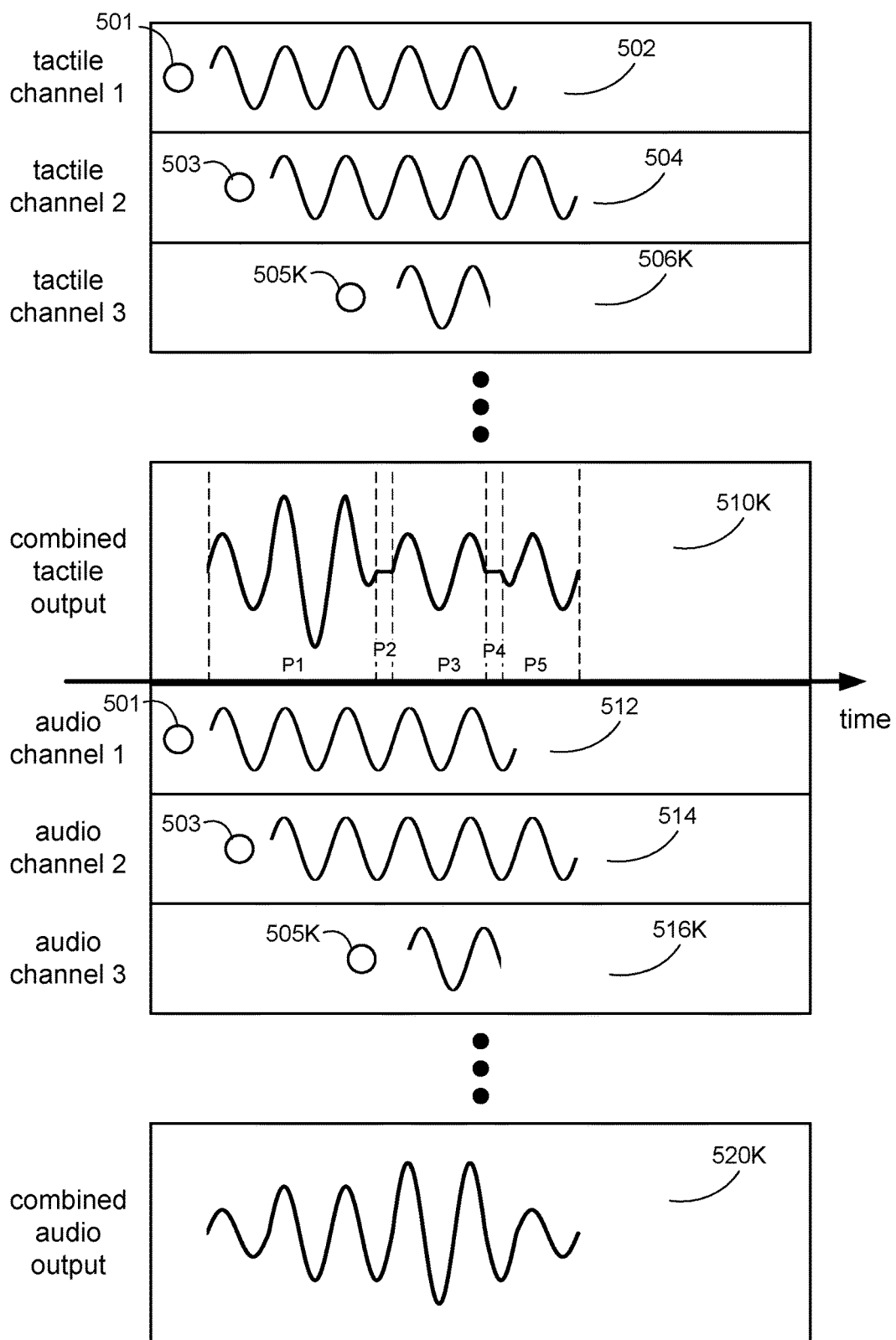
Figure 6E:
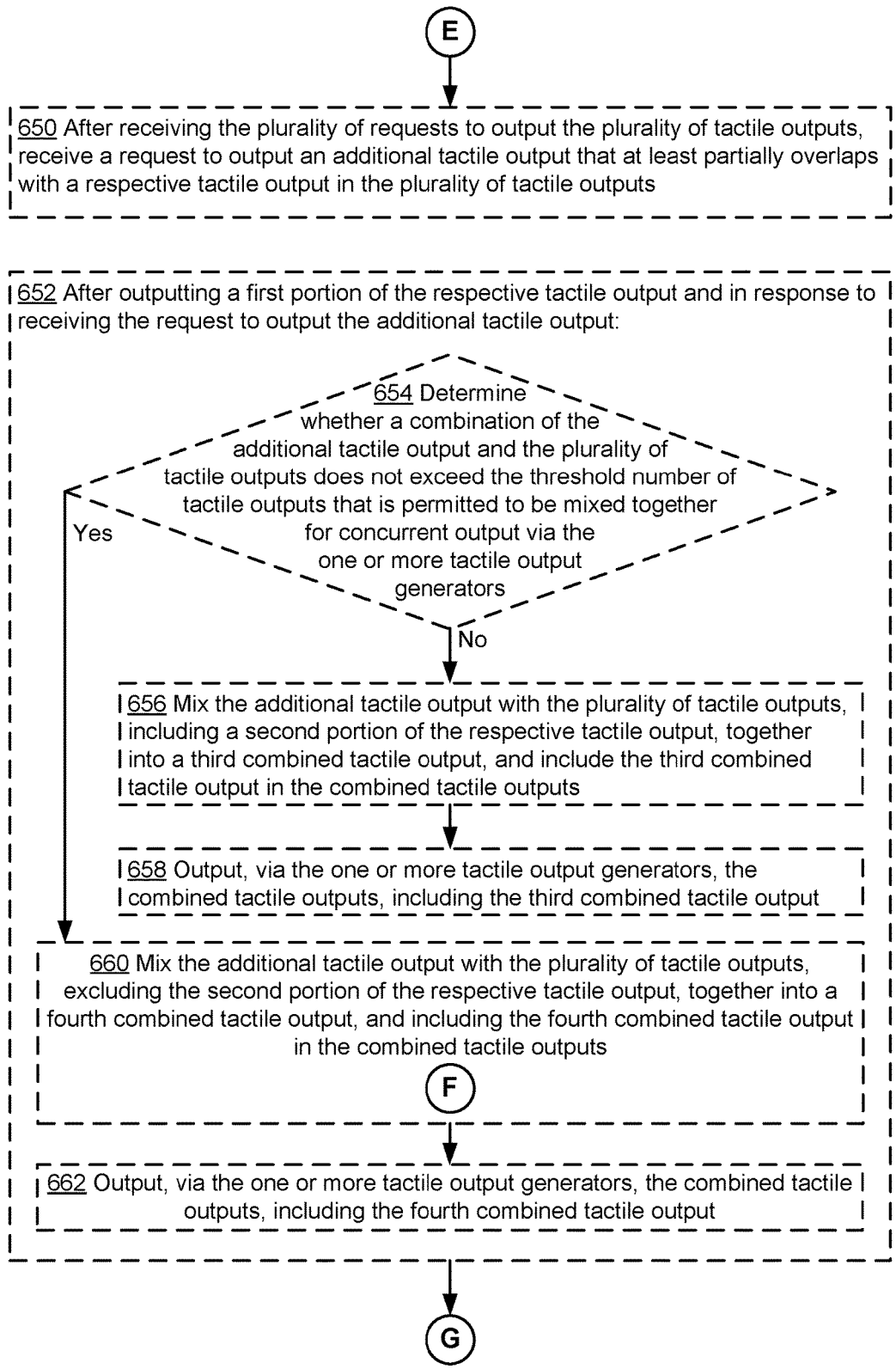
Figure 7D:
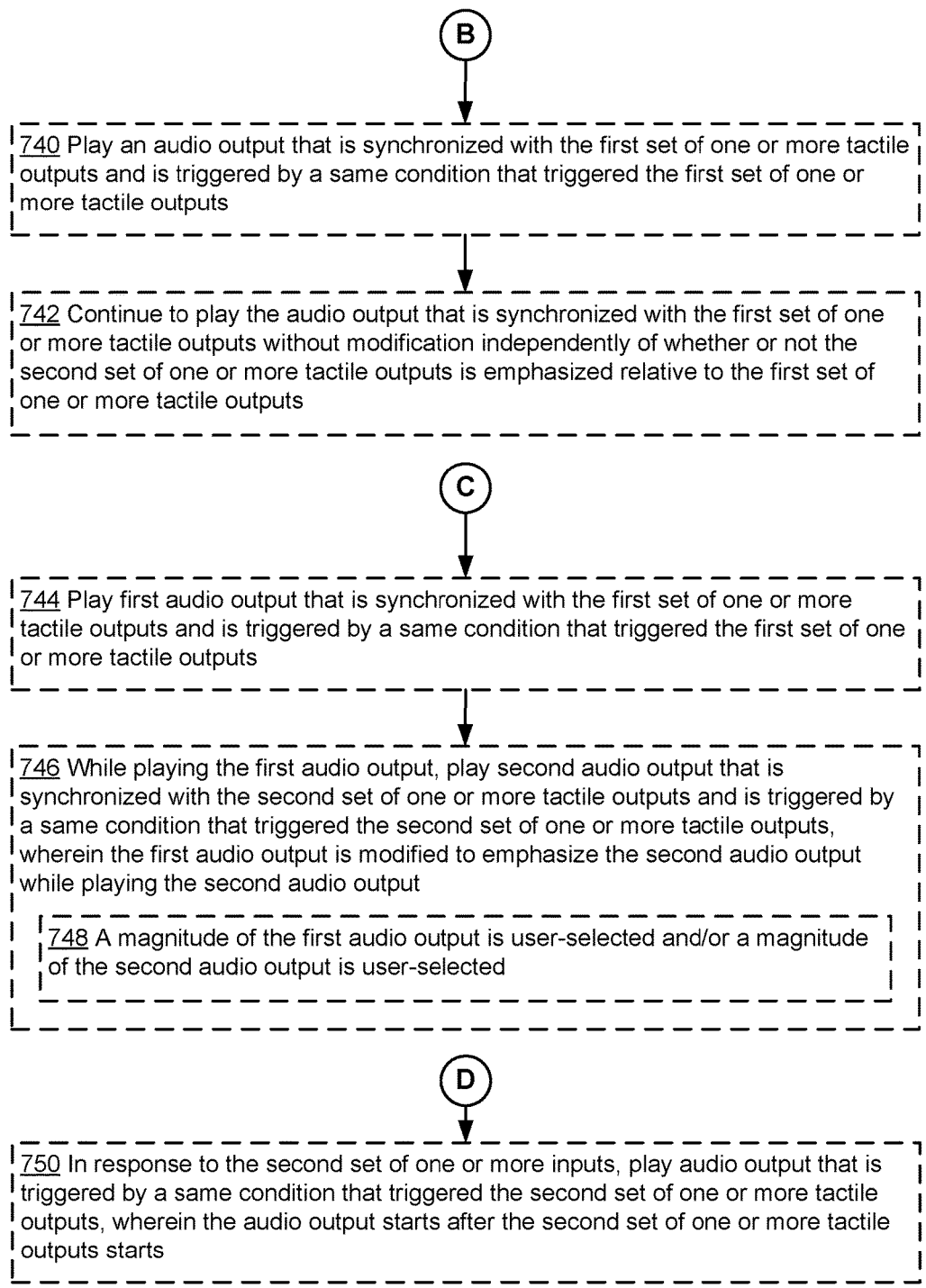
Figure 8B:
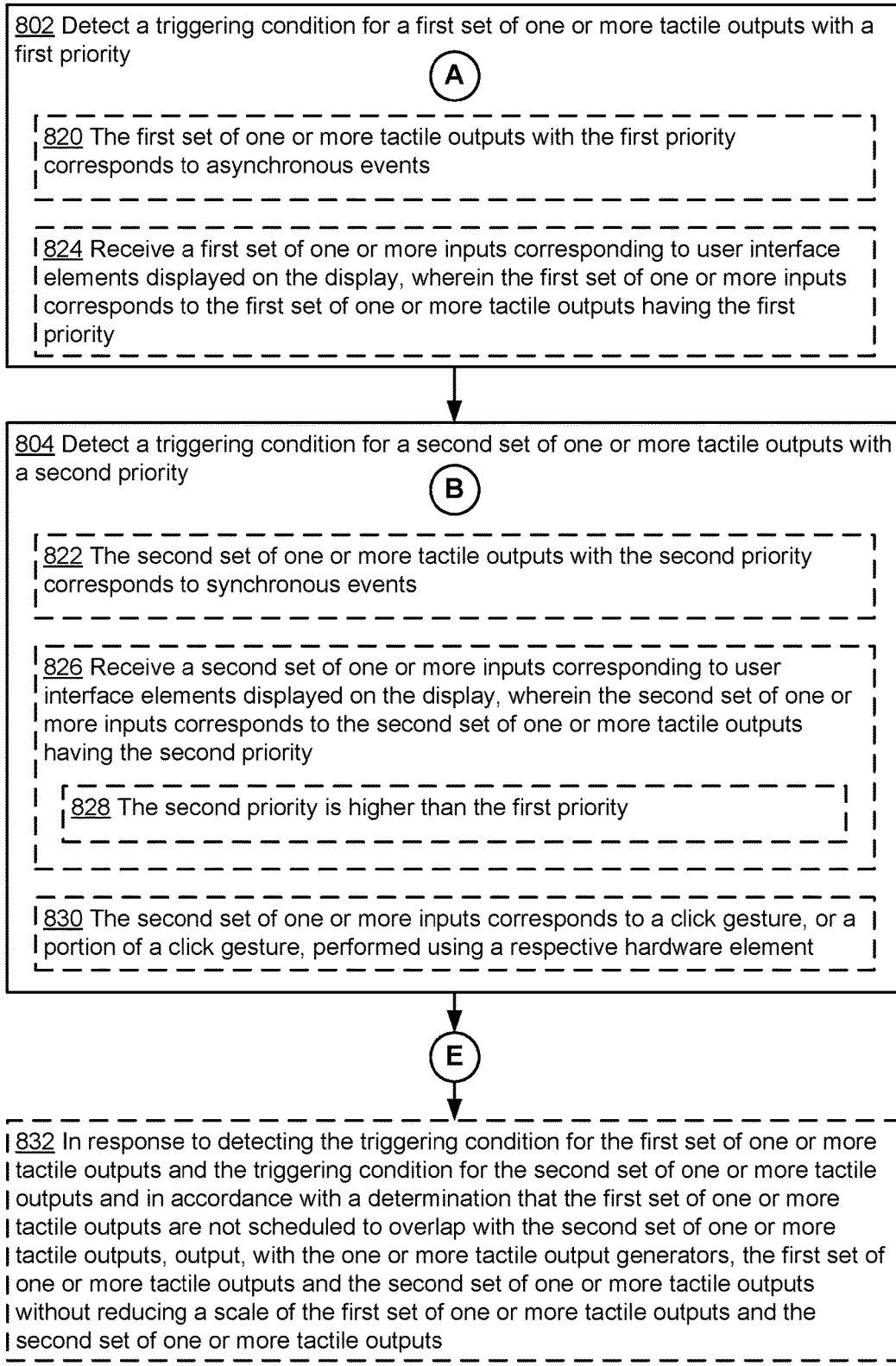
Figure 8D:
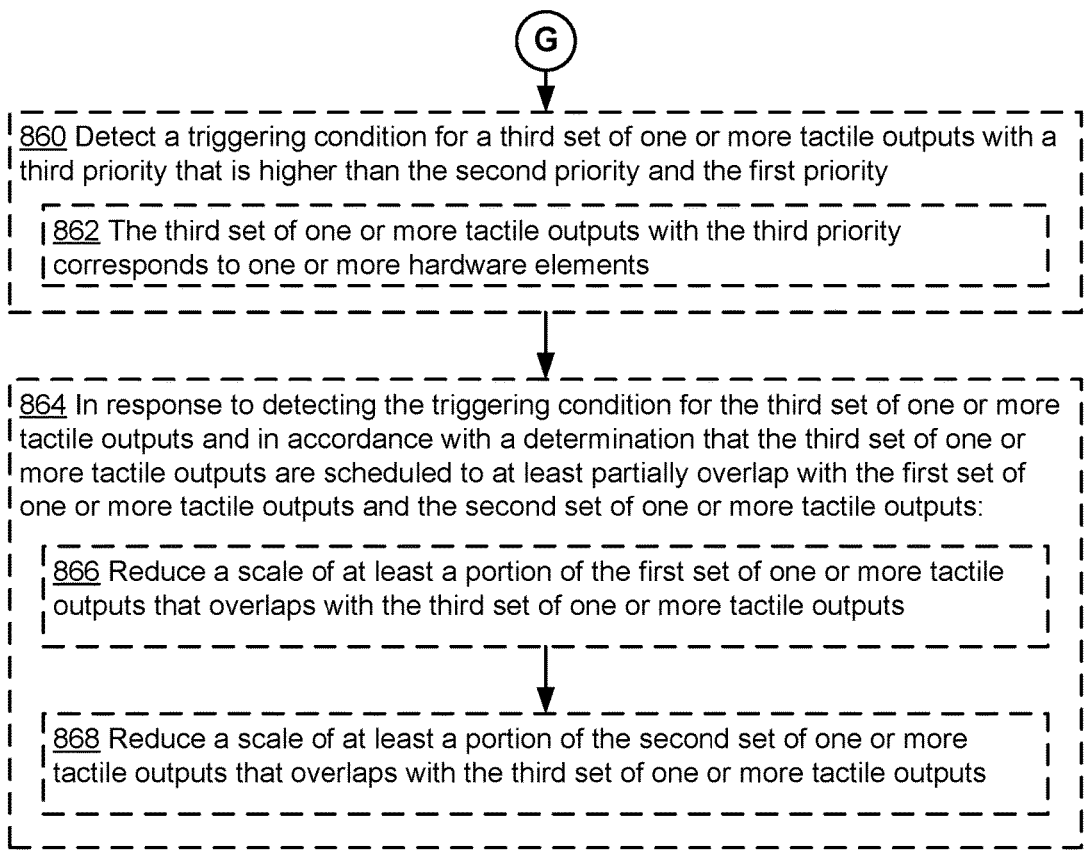
Figure 8D:
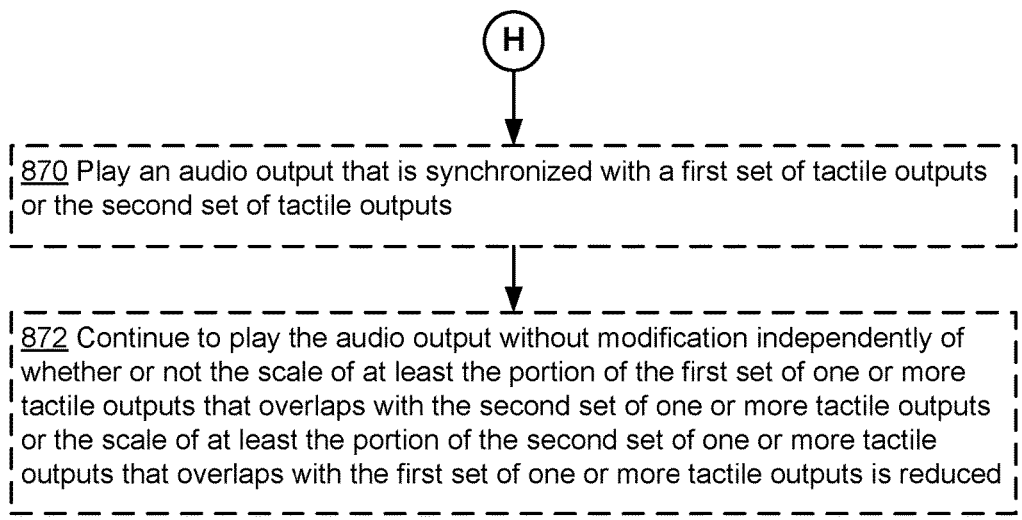

FIG. 5H illustrates an example in which a first tactile output 502 and a second tactile output 504F, which does not overlap with first tactile output 502, are mixed to produce a combined tactile output 510F. Similarly, first and second audio outputs 512 and 514F, which do not overlap, are combined to produce a combined audio output 520F. FIGS. 5J and 5L, discussed in more detail below, show examples in which overlapping tactile outputs are mixed to produce combined tactile outputs 510H and 510K.

FIG. 5I illustrates an example in which a first tactile output 502 and a second tactile output 504G, which overlaps with first tactile output 502, are mixed to produce a combined tactile output 510G, also herein called a modified tactile output sequence, in which one of the tactile outputs 502 or 504G (e.g., tactile output 504G) is emphasized relative to the other one of the tactile outputs (e.g., tactile output 502). In addition, in this example, first and second audio outputs 512 and 514F, which overlap, are combined to produce a combined audio output 520G.

In this example, first tactile output 502 is produced in response to detecting a first triggering condition, indicated by indicator 501, and first tactile output has a first priority. Similarly, second tactile output 504G is produced in response to detecting a second triggering condition, indicated by indicator 503G, and second tactile output 504G has a second priority.

In accordance with a determination that the second priority is higher than the first priority, a scale of at least a portion (e.g., portion P3, or P2-P4) of first tactile output 502 that overlaps with second tactile output 504G is reduced (e.g., relative to a scale of another one of the tactile outputs, such as the tactile output 504G with the second priority). Optionally, the scale of adjacent portions, such as portions P1-P2 and P4-P5, of the first tactile output are also reduced, for example by smoothly reducing the scale in a first such portion P1 from an initial scale (e.g., the scale used prior to portion P1) to the reduced scale used in portions P2-P4, and then smoothly increasing the scale in a last such portion P5, from the reduced scale back to the initial scale. In the example shown in Figure 5I, the reduced scale used in portions P2-P4 is zero, meaning that the first tactile output 502 is replaced with tactile silence for purposes of combining tactile outputs 502 and 504G in portions P2-P4, but in other examples the reduced scale may be higher than zero, but less than the initial scale. The combined tactile output 510G is generated by combining at least the first tactile output 502, including any portion thereof with reduced scale, and the second tactile output 504G, including any portion thereof with reduced scale (although, in this example, second tactile output 504G does not have any portion with reduced scale).

FIG. 5J illustrates an example in which a first tactile output 502 and a second tactile output 504G, which overlaps with first tactile output 502, are mixed to produce a combined tactile output 510H, also herein called a modified tactile output sequence, in which one of the tactile outputs 502 or 504G (e.g., tactile output 502) is emphasized relative to the other one of the tactile outputs (e.g., tactile output 504G). First and second audio outputs 512 and 514F, which overlap, are combined to produce a combined audio output 520H. In this FIG. 5J, an unscaled combination 510H-C of first and second tactile outputs 502 and 504G is shown with a dashed line, while the scaled combination 510H is shown with a solid line.

In this example, first tactile output 502 is produced in response to detecting a first triggering condition, indicated by indicator 501, and first tactile output has a first priority. Similarly, second tactile output 504G is produced in response to detecting a second triggering condition, indicated by indicator 503G, and second tactile output 504G has a second priority.

In accordance with a determination that the first priority is higher than the second priority, a scale of at least a portion (e.g., portion P3, or P2-P4) of second tactile output 504G that overlaps with first tactile output 502 is reduced (e.g., relative to a scale of another one of the tactile outputs, such as the tactile output 502 with the first priority). Optionally, the scale of adjacent portions, if any, such as portions P1 and P5 (if such portions existed), of the second tactile output are also reduced, for example by smoothly reducing the scale in a first such portion P1 (if any) from an initial scale (e.g., the scale used prior to portion P1) to the reduced scale used in portions P2-P4, and then smoothly increasing the scale in a last such portion P5 (if any), from the reduced scale back to the initial scale. The combined tactile output 510H is generated by combining at least the first tactile output 502, including any portion thereof with reduced scale (although, in this example, first tactile output 502 does not have any portion with reduced scale), and the second tactile output 504G, including any portion thereof with reduced scale.

FIG. 5K illustrates an example, relevant to the example shown in either FIG. 5I or 5J, in which the duration of a second portion P2 of the combined tactile output 510G (FIG. 5I) or 510H (FIG. 5J), is selected based on a magnitude (e.g., amplitude) of the first portion P1 of the combined tactile output, sometimes herein called the modified tactile output sequence. Making the duration of the second portion P2 adjustable, based on the magnitude of the immediately prior portion of the modified tactile output sequence, helps ensure that the user is able to detect the following portion (P3) of the modified tactile output sequence as a distinct tactile output or distinct event. In the top half of FIG. 5K, first tactile output 502J (Low), which is combined with second tactile output 504G to produce combined tactile output 510J (Low), has a low magnitude, while in the lower half of FIG. 5K, first tactile output 502J (High), which is combined with second tactile output 504G to produce combined tactile output 510J (High), has a high magnitude.

As shown in the examples in FIG. 5K, if the first portion P1 the combined tactile output 510J (Low) or 510J (High) has a low magnitude (see top half of FIG. 5K), the duration of the second portion P2 of the combined tactile output 510J (Low), also herein called the modified tactile output sequence, is relatively short (e.g., the duration is set to a predefined minimum duration, such as 5 milliseconds (5 ms)). On the other hand, if the first portion P1 has a high magnitude, as shown in a bottom half of FIG. 5K, the duration of the second portion P2 of the combined tactile output 510J (High) is relatively long (e.g., 7 to 8 ms, which is longer than the predefined minimum duration).

In some embodiments, the first portion of a tactile output has a low magnitude if the magnitude of the tactile output is less than a first threshold, and the first portion of a tactile output has a high magnitude if the magnitude of the tactile output is greater than the first threshold. In some embodiments, other predefined criteria are used to categorize the magnitude of the first portion of the tactile output. In some embodiments, a mapping function or scaling function (e.g., a continuous, linear function, or a stepwise monotonic function) is used to map the magnitude of the first portion of the tactile output to a duration, or scaling factor for the duration, of second portion of the tactile output.

Optionally, in some embodiments, the modified tactile output sequence has a first portion (e.g., portion P1 of combined tactile outputs 510J (High), FIG. 5K) during which the first set of tactile outputs (e.g., tactile output 502) is output using an output level that is gradually decreased from a first output level to a second output level, and a fourth portion (e.g., portion P4 of combined tactile outputs 510J (High), FIG. 5K) during which the first set of tactile outputs (e.g., tactile output 502) is output using an output level that is gradually increased from a third output level (e.g., the same as the second output level) to a fourth output level (e.g., the same as the first output level), wherein the fourth portion (e.g., P4, FIG. 5K) is subsequent to the third portion (e.g., P3, FIG. 5K). In some embodiments (see combined tactile output 510J (Low) in top half of FIG. 5K), the third portion is followed immediately by a fourth portion of tactile silence, which in turn is followed immediately by a fifth portion during which the first set of tactile outputs (e.g., tactile output 502) is output using an output level that is gradually increased from a third output level (e.g., the same as the second output level) to a fourth output level (e.g., the same as the first output level).

FIG. 5L illustrates an example in which a third triggering condition, indicated by indicator 505K, for a third tactile output 506K, is detected. The third tactile output 506K has a third priority that is higher than the second priority (of second tactile output 504) and the first priority (of first tactile output 502). For example, the third trigger condition and third tactile output correspond to one or more hardware elements, such as home button 204 (shown in FIGS. 4A and 4C) or other physical button or simulated physical button.

In response to detecting the third triggering condition 505K, and in accordance with a determination that the third tactile output 506K is scheduled to at least partially overlap with the first tactile output 502 and the second tactile output 504, the electronic device reduces a scale of at least a portion of the first tactile output 502 that overlaps with the third tactile output 506K, and also reduces a scale of at least a portion of the second tactile output 504 that overlaps with the third tactile output 506K. In the example shown in FIG. 5L, the three tactile outputs 502, 504 and 506K overlap during a time period corresponding to portion P3 of combined tactile output 510K, and the scale of the first and second tactile outputs is reduced to zero during that time period. As a result, the combined tactile output 510K includes only the third tactile output 506K during portion P3. In this example, during portions P1 and P5 of combined tactile output 510K, the first and second tactile outputs 502 and 504 are mixed, at full scale (without reduced scale), resulting in a combined tactile output with relatively high magnitude during portions P1 and P5.

In addition, in the example shown in FIG. 5L, during portions P2 and P4 of the combined tactile output 506K immediately before and after portion P3 of combined tactile output 506K, the magnitude of combined tactile output 506K is set to zero or the scale of combined tactile output 506K is substantially reduced (e.g., by more than 50%), thereby making portion P3 of combined tactile output 506K more easily observed as a separate tactile output by a user of the electronic device.

In the example shown in FIG. 5L, first, second and third audio signals 512, 514 and 516K are synchronized with the first, second and third tactile outputs 502, 504 and 506K, respectively. In this example, audio signals 512, 514 and 516K are combined, without scaling, to produce combined audio output 520K. As shown, a middle portion of combined audio output 520K, corresponding to the portion in which all three audio signals 512, 514 and 516K overlap, has a larger magnitude than the portions immediately preceding and following the middle portion, as those portions have fewer overlapping audio signals (two overlapping audio signals, instead of three). However, it is noted that due to destructive interference and varying tactile output amplitude, the overlap of a larger number of waveforms doesn't necessarily result in a larger amplitude for the combined tactile outputs.

FIGS. 6A-6F are flow diagrams illustrating a method 600 of combining tactile outputs corresponding to triggering conditions or inputs from multiple sources, and applying limits to the number of tactile outputs combined, or to the magnitude and/or frequency components of the combined tactile outputs, in accordance with some embodiments. Corresponding examples of tactile outputs, combined tactile outputs, and audio outputs are shown in FIGS. 5A-5J. The method 600 is performed at an electronic device (e.g., device 300, FIG. 3, or portable multifunction device 100, FIG. 1A) with a display, a touch-sensitive surface, and a set of one or more tactile output generators. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides improved tactile feedback, and in some cases synchronized tactile and audio feedback, by applying limits to the number tactile outputs that are combined, and/or to the magnitude and/or frequency components of combined tactile outputs, produced by mixing or otherwise combining a plurality of tactile outputs and output using one or more tactile output generators, in accordance with limiting criteria of the one or more tactile output generators. Method 600 enables multiple applications to provide tactile outputs, without the applications having to take into account limits on the number of tactile outputs that can be combined, or limits on the amplitude or magnitude or frequency components of the combined tactile outputs, while ensuring that higher priority tactile outputs are output, or emphasized relative to lower priority tactile outputs. The method reduces the number, extent, and/or nature of the inputs from a user when interacting with the device or applications running on the device, thereby creating a more efficient human-machine interface. From the perspective of the user of the device, method 600 enables the user to receive multiple tactile outputs, with prioritization to ensure that higher priority tactile outputs are not excluded, or are emphasized relative to lower priority tactile outputs, and enables the user to make inputs with more confidence, faster and more efficiently, thereby resulting in fewer incorrect inputs by the user, which enhances the operability of the device. For battery-operated electronic devices, this conserves power and increases the time between battery charges.

It is noted that tactile feedback also provides valuable information to the user for touch screen user interfaces where the user's finger is obscuring corresponding visual feedback.

The device receives (602) a plurality of requests to generate a plurality of tactile outputs using the device's one or more tactile output generators. The plurality of tactile outputs includes two or more overlapping tactile outputs. For example, as shown in FIGS. 5A and 5B, first and second requests, corresponding to indicators 501 and 503, respectively, are received from first and second applications, or from an application and from the device's operating system. A first tactile output 502, corresponding to the first request and a second tactile output 504, corresponding to the second request, at least partially overlap.

Method 600 includes, in response to receiving the plurality of requests, generating and outputting (604), via the one or more tactile output generators, combined tactile outputs, for example combined tactile outputs 510 shown in FIGS. 5A and 5B. Other examples of combined tactile outputs are shown in FIGS. 5C-5L. How the combined tactile outputs are generated depends, at least in part, on whether the plurality of tactile outputs exceeds a threshold number of tactile outputs that is permitted to be mixed together for concurrent output via the one or more tactile output generators, and thus the device determines (606) whether the plurality of tactile outputs exceeds a threshold number of tactile outputs that is permitted to be mixed together for concurrent output via the one or more tactile output generators.

In accordance with a determination that the plurality of tactile outputs does not exceed a threshold number of tactile outputs that is permitted to be mixed together for concurrent output via the one or more tactile output generators (606-No), the generating and outputting (604) includes mixing (606) the plurality of tactile outputs together into a first combined tactile output, including the first combined tactile output in the combined tactile outputs (e.g., combined tactile outputs 510, FIG. 5A), and outputting (608), via the one or more tactile output generators, the combined tactile outputs, including the first combined tactile output. For example, FIG. 5A shows a plurality of tactile outputs (e.g., two tactile outputs 502, 504) that does not exceed a threshold number (e.g., two) of tactile outputs that is permitted to be mixed together for concurrent output via the one or more tactile output generators. In this example, the plurality of tactile outputs is mixed together into a first combined tactile output that is included in combined tactile outputs 510.

In accordance with a determination that the plurality of tactile outputs exceeds the threshold number of tactile outputs that is permitted to be mixed together for concurrent output via the one or more tactile output generators (606-Yes), the generating and outputting includes mixing (612) a subset of the plurality of tactile outputs together into a second combined tactile output that excludes at least one of the plurality of tactile outputs, including the second combined tactile output in the combined tactile outputs, and outputting (614), via the one or more tactile output generators, the combined tactile outputs, including the second combined tactile output. By mixing tactile outputs in this way, and preventing an excess number of overlapping tactile outputs from being mixed into combined tactile outputs, improved tactile feedback is provided to the user, enhancing the operability of the device. An example of mixing tactile outputs in the manner just described is provided in FIG. 5B, which shows a plurality of tactile outputs (e.g., three tactile outputs 502, 504, 506) exceeds a threshold number (e.g., two) of tactile outputs that is permitted to be mixed together for concurrent output via the one or more tactile output generators. In this example, when the plurality of tactile outputs are mixed together into a second combined tactile output that is included in combined tactile outputs 510, the third tactile output 506 is excluded and thus not included in combined tactile outputs 510.

In some embodiments, one or more of the tactile outputs of the plurality of tactile outputs are part of synchronized tactile and audio outputs that include both an audio output and a corresponding tactile output that are synchronized to occur with a particular temporal alignment (620). For example, in FIG. 5A, audio output 512 is synchronized with tactile output 502, and audio output 514 is synchronized with tactile output 504. Providing synchronized tactile and audio outputs, while preventing an excess In some embodiments, the plurality of tactile outputs includes (622) a tactile output (e.g., tactile output 502, FIG. 5A) generated in response to a user input directed toward a control element in a displayed user interface (e.g., user input 407 on application icon 424, FIG. 4A). In some embodiments, different control elements are assigned to different tactile output channels (e.g., see tactile channels 1, 2 and 3 in FIGS. 5A and 5B), such that a first control element requests the generation of tactile outputs via a first tactile output channel that is assigned to the first control element (e.g., a user input on the first control element causes a corresponding application or operating system module to generate a first request for a first tactile output) and a second control element requests the generation of tactile outputs via a second tactile output channel that is assigned to the second control element and is different from the first tactile output channel (e.g., a user input on the second control element causes another application or operating system module to generate a second request for a second tactile output using a different tactile output channel than the tactile output channel used for the first request).

In some embodiments, the plurality of tactile outputs includes (624) a tactile output generated in response to a user input directed toward a hardware control. Examples of hardware controls include a touch or intensity-sensitive control, a mechanical input device such as a mechanical switch or dial, and a solid state home button. Further discussion regarding producing tactile outputs in response to input on, or directed toward, a hardware control is provided herein with reference to method 700 and FIGS. 7A-7D.

In some embodiments, the plurality of tactile outputs includes (626) a tactile output generated in response to the occurrence of a predefined condition (e.g., an incoming phone call, incoming text message, a scheduled alarm, or other alert received from a source external to the device or from a source, such as application or operating system module, internal to the device).

In some embodiments, receiving the plurality of requests includes (628): receiving a first set of one or more inputs corresponding to user interface elements displayed on the display and receiving a second set of one or more inputs corresponding to one or more hardware elements. The first set of one or more inputs corresponds to a first set of one or more tactile outputs and the second set of one or more inputs corresponds to the second set of one or more tactile outputs. Furthermore, the plurality of tactile outputs includes the first set of one or more tactile outputs and the second set of one or more tactile outputs. For example, in FIG. 5A, one of the inputs, represented by indicator 501, optionally corresponds to user interface elements displayed on the display, and another of the inputs, represented by indicator 503, corresponds to one or more hardware elements. Producing tactile outputs in response to input on, or directed toward, a hardware control is further discussed herein with reference to method 700 and FIGS. 7A-7D.

In some embodiments, receiving the plurality of requests includes (630) detecting a triggering condition for a first set of one or more tactile outputs with a first priority and detecting a triggering condition for a second set of one or more tactile outputs with a second priority. For example, the triggering condition for the first set of one or more tactile outputs with a first priority may be a touch input, on a user interface element (e.g., application icon 424, FIG. 4A) displayed on touch-sensitive display, which satisfies a first intensity threshold, and the triggering condition for a second set of one or more tactile outputs with a second priority may be a touch input, on a hardware element (e.g., home button 204, FIG. 4A), which satisfies a second intensity threshold, distinct from the first intensity threshold.

Furthermore, in some such embodiments, generating combined tactile outputs includes (632), in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs: in accordance with a determination that the first priority is higher than the second priority (e.g., as in the example shown in FIG. 5J, discussed above), reducing a scale of at least a portion of the second set of one or more tactile outputs that overlaps with the first set of one or more tactile outputs (e.g., relative to a scale of the first set of one or more tactile outputs); and in accordance with a determination that the second priority is higher than the first priority (e.g., as in the example shown in FIG. 5I, discussed above), reducing a scale of at least a portion of the first set of one or more tactile outputs that overlaps with the second set of one or more tactile outputs (e.g., relative to a scale of the second set of one or more tactile outputs). In this way, by reducing the scale of at least a portion of the one or more tactile outputs with lower priority while mixing the tactile outputs to generate combined tactile outputs, method 600 provides improved tactile feedback to the user of the electronic device, which enhances the operability of the device. In such embodiments, method 600 includes generating the combined tactile outputs by combining at least the first set of one or more tactile outputs, including any portion thereof with reduced scale, and the second set of one or more tactile outputs, including any portion thereof with reduced scale. FIGS. 5I and 5J, as discussed above, show examples of combining tactile outputs with different priorities. Combining tactile outputs with different priorities is further discussed herein with reference to method 800 and FIG. 8A-8D.

In some embodiments, mixing the plurality of tactile outputs into a combined tactile output includes (634): in accordance with a determination that the first set of tactile outputs and the second set of one or more tactile outputs do not overlap (e.g., as shown in the example in FIG. 5H), including in the combined tactile outputs the first set of one or more tactile outputs and the second set of one or more tactile outputs (e.g., the combined tactile output 510F, FIG. 5H, includes the first set of tactile outputs, such as tactile output 502, and the second set of tactile outputs, such as tactile output 504F), played in sequence. Further, in accordance with a determination that the first set of one or more tactile outputs and the second set of one or more tactile outputs overlap (e.g., as shown in the example in FIG. 5I), including in the combined tactile outputs a modified tactile output sequence that is modified so as to emphasize the second set of one or more tactile outputs relative to the first set of one or more tactile outputs (e.g., the modified tactile output sequence 510G, FIG. 5I, emphasizes second tactile output 504G relative to first tactile output 502). Producing a modified tactile output sequence is further discussed herein with reference to method 700 and FIGS. 7A-7D.

In some embodiments, a respective combined tactile output of the first combined tactile output (see discussion above regarding mix operations 608) and the second combined tactile output (see discussion above regarding mix operations 612) includes (636) a first portion and a second portion (e.g., see first portion P1 and second portion P2 in FIG. 5E, or portions P2 and P3 in FIG. 5G). Method 600 further includes, in accordance with a determination that the second portion of the combined tactile outputs (e.g., the amplitude of portion P2 of combined tactile outputs 510C, FIG. 5E, or the amplitude of portion P3 of combined tactile outputs 510E, FIG. 5G) meet output limiting criteria for the one or more tactile output generators (e.g., by exceeding output limits for the one or more tactile output generators): reducing (636) a scale of the combined tactile outputs during at least the first portion of the combined tactile output immediately preceding the second portion of the combined tactile outputs; and outputting (638), via the one or more tactile output generators, a tactile output sequence (e.g., combined tactile outputs 510C-RS, FIG. 5E, or combined tactile outputs 510E-RS, FIG. 5G) based on the combined tactile outputs that includes the first portion of the combined tactile output with reduced scale. Optionally, the tactile output sequence that is output (638), via the one or more tactile output generators, includes the second portion of the combined tactile outputs with reduced scale, as discussed below with reference to operation 640. Furthermore, it is noted that at any instant in time while the scale of the combined tactile outputs is being reduced, the instantaneous amplitude of the combined tactile outputs may be increasing or decreasing. Further discussion of the application of output limiting criteria for the one or more tactile output generators to tactile outputs is provided above with reference to FIG. 5E, and also FIG. 5G. By reducing the scale of at least a portion of the combined tactile outputs so as to comply with output limiting criteria for the one or more tactile output generators, method 600 enables multiple applications, modules, or user interface elements to provide tactile outputs that are combined when they overlap, while still complying with output limiting criteria that correspond to physical limitations or capabilities of the one or more tactile output generators of the device. This, in turn, provides improved tactile feedback to the user of the electronic device, which enhances the operability of the device.

In some embodiments, after reducing the scale of the combined tactile outputs during the first portion (see discussion of operation 636, above), method 600 includes continuing to output (640), via the one or more tactile output generators, the combined tactile outputs with the reduced scale during the second portion. As result, the amplitude of the scale-reduced second portion satisfies a predefined limit, corresponding to the aforementioned output limiting criteria for the one or more tactile output generators. FIG. 5E shows an example in which a reduced scale is applied during a second portion, P2, of combined tactile output 510C, after reducing the scale of the combined tactile outputs during a first portion, P1.

Optionally, after reducing the scale of the first portion of the combined tactile outputs, method 600 includes applying (642) a low pass filter to the combined tactile outputs so as to remove or reduce frequency components, if any, of the combined tactile outputs that are above a predefined cutoff frequency. By reducing the scale of at least a portion of the combined tactile outputs so as to comply with output limiting criteria for the one or more tactile output generators, and applying a low pass filter to the combined tactile outputs, method 600 enables multiple applications, modules, or user interface elements to provide tactile outputs that are combined when they overlap, while still complying with output limiting criteria that correspond to physical limitations or capabilities of the one or more tactile output generators of the device. This, in turn, provides improved tactile feedback to the user of the electronic device, which enhances the operability of the device.

FIG. 5F shows an example of applying a low pass filter to combined tactile outputs 510D, so as to produce low pass filtered combined tactile outputs 510D-LP. In some embodiments, the low pass filter has a cutoff frequency that is set based on physical constraints on hardware of the device. For example, for a device with a smaller tactile output generator that is capable of achieving higher frequencies, the low pass filter optionally has a higher cutoff frequency, while for a device with a larger tactile output generator that is not capable of achieving higher frequencies, the low pass filter optionally has a lower cutoff frequency. By setting the cutoff frequency of the low pass filter based on the capabilities of the device, applications, operating system modules, or UI elements or other elements of such applications and modules, can request the generation of tactile outputs without regard to the physical constraints of the hardware of the device, and the low pass filter will ensure that the one or more tactile output generators of the device do not receive instructions to generate tactile outputs that it or they are not capable of generating, or are capable of generating reliably and effectively.

Further, in some embodiments, after outputting (638), via the one or more tactile output generators, the second portion of the combined tactile outputs at reduced scale, method 600 includes gradually increasing (643) the scale of the combined tactile outputs during at least a third portion of the combined tactile outputs. For example, as shown in FIG. 5G, after reducing the scale of combined tactile outputs 510E during portion P3, the scale of portion P4 of combined tactile outputs 510E is gradually increased. The resulting modified tactile output sequence is labeled 510E-RS in FIG. 5G.

In some embodiments, method 600 includes, in accordance with a determination that the second portion of the combined tactile outputs does not meet output limiting criteria for the one or more tactile output generators (e.g., that the amplitude of the combined tactile outputs does not exceed a predefined limit), outputting (644), via the one or more tactile output generators, the tactile output sequence without reducing the scale of the combined tactile outputs during at least the first portion of the combined tactile outputs. FIGS. 5A, 5C and 5D show examples in which the amplitude of the combined tactile outputs is not reduced, because the combined tactile outputs do not exceed a predefined limit of the one or more tactile generators (or more generally, because the combined tactile outputs meet the limiting criteria for the one or more tactile output generators).

In some embodiments, after receiving (602, FIG. 6A) the plurality of requests to output the plurality of tactile outputs, method 600 includes receiving 650 (FIG. 6E) a request to output an additional tactile output (e.g., third tactile output 506A, FIG. 5C) that at least partially overlaps with a respective tactile output (e.g., first tactile output 502, FIG. 5C) in the plurality of tactile outputs (e.g., tactile outputs 502 and 504, FIG. 5C). For example, the oldest tactile output in the plurality of tactile outputs partially overlaps with the additional tactile output. An example is shown in FIG. 5C, in which third tactile output 506A corresponds to the additional tactile output and the respective tactile output corresponds to first tactile output 502. By allowing an electronic device to receive and process at least three or more requests for tactile outputs, corresponding to tactile outputs scheduled to overlap at least in part, method 600 enables multiple applications, modules, or user interface elements to provide tactile outputs that are combined when they overlap. This, in turn, provides improved tactile feedback to the user of the electronic device, which enhances the operability of the device. In such embodiments, or in such circumstances, a determination is made as to whether a combination of the additional tactile output and the plurality of tactile outputs exceed the threshold number of tactile outputs that is permitted to be mixed together for concurrent output via the one or more tactile output generators (654).

After outputting (652) a first portion of the respective tactile output, and in response to receiving the request to output the additional tactile output, in accordance with a determination that a combination of the additional tactile output and the plurality of tactile outputs does not exceed the threshold number of tactile outputs that is permitted to be mixed together for concurrent output via the one or more tactile output generators (654-No), method 600 includes mixing (656) the additional tactile output with the plurality of tactile outputs (e.g., tactile outputs 502 and 504), including a second portion of the respective tactile output (e.g., portion 522, FIG. 5C, of first tactile output 502), together into a third combined tactile output (e.g., combined tactile output 510A, FIG. 5C), and including the third combined tactile output in the combined tactile outputs (as shown in the example in FIG. 5C), and outputting (658), via the one or more tactile output generators, the combined tactile outputs, including the third combined tactile output. Referring to FIG. 5C, in this scenario, tactile outputs 502 and 504 are both mixed with the additional/third tactile output 506A to generate combined tactile outputs 510A. By allowing an electronic device to mix three or more tactile outputs that are scheduled to overlap at least in part, without excluding any of those tactile outputs when the number of tactile outputs does not exceed the threshold number of tactile outputs that is permitted to be mixed together for concurrent output via the one or more tactile output generators, method 600 enables multiple applications, modules, or user interface elements to provide tactile outputs that are combined when they overlap. This, in turn, provides improved tactile feedback to the user of the electronic device, which enhances the operability of the device.

On the other hand, after outputting (652) a first portion of the respective tactile output, and in response to receiving the request to output the additional tactile output, in accordance with a determination that the combination of the additional tactile output and the plurality of tactile outputs exceeds the threshold number of tactile outputs that is permitted to be mixed together for concurrent output via the one or more tactile output generators (654-Yes), method 600 includes mixing (660) the additional tactile output with the plurality of tactile outputs, excluding the second portion of the respective tactile output, together into a fourth combined tactile output, and including the fourth combined tactile output in the combined tactile outputs; and outputting (662), via the one or more tactile output generators, the combined tactile outputs, including the fourth combined tactile output. Referring to FIG. 5C, in this second scenario, tactile outputs 502 and 504 are mixed with the additional/third tactile output 506A to generate combined tactile outputs 510A, but the second portion (portion 522) of tactile output 502 is excluded because the combination of the third tactile output 506A and the plurality of tactile outputs (502, 504) exceeds the threshold number of tactile outputs that is permitted to be mixed together for concurrent output via the one or more tactile output generators (654-Yes). By allowing an electronic device to mix three or more tactile outputs that are scheduled to overlap at least in part, but to exclude one or more of those tactile outputs (e.g., the one or more tactile outputs produced in response to the oldest triggering condition(s)) when the number of tactile outputs exceeds the threshold number of tactile outputs that is permitted to be mixed together for concurrent output via the one or more tactile output generators, method 600 enables multiple applications, modules, or user interface elements to provide tactile outputs that are combined when they overlap. This, in turn, provides improved tactile feedback to the user of the electronic device, which enhances the operability of the device.

In some embodiments, when performing mixing operation 660, discussed above, the second portion of the respective tactile output is selected (670), from the plurality of tactile outputs, to be excluded from the plurality of tactile outputs based on an age of an input that triggered the respective tactile output. For example, as shown in FIG. 5C, the second portion 522 of first tactile output 502 is selected based on it being the least recently triggered tactile output, as indicated by its triggering condition, corresponding to indicator 501, being the oldest of the triggering conditions for the tactile outputs being combined.

In some embodiments, method 600 includes playing (672) an audio output that is synchronized with the respective tactile output and is triggered by a same condition that triggered the respective tactile output (e.g., playing audio output 512, which is synchronized with tactile output 502, and triggered by a same condition, indicated by indicator 501, as shown in FIG. 5C); and further includes continuing to play (674) the audio output that is synchronized with the respective tactile output without regard to whether or not the second portion of the tactile output is excluded from the combined tactile outputs that are output via the one or more tactile output generators. For example, as shown in FIG. 5C, the audio component 512 of the synchronized tactile/audio output 502/512 continues to be played even if tactile component 502 of the synchronized tactile/audio output 502/512 is removed from the combined tactile output 510A. By providing synchronized tactile outputs and audio outputs, while also mixing the tactile outputs to produce combined tactile outputs to be output using one or more tactile output generators, and mixing the audio outputs to produce combine audio outputs, method 600 enables multiple applications, modules, or user interface elements to provide synchronized tactile and audio outputs that are combined when they overlap. This, in turn, provides improved tactile and audio feedback to the user of the electronic device, which enhances the operability of the device.

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6F. For example, the application of limits to the number, magnitude and/or frequency components of combined tactile outputs, produced by mixing or otherwise combining a plurality of tactile outputs and output using one or more tactile output generators, in accordance with limiting criteria of the one or more tactile output generators, described above with reference to method 600 optionally has one or more of the characteristics of the prioritization of tactile outputs corresponding to inputs on hardware elements over other tactile outputs described herein with reference to method 700, or the mixing of tactile outputs in accordance with priorities of those tactile outputs described herein with reference to method 800. For brevity, these details are not repeated here.

FIGS. 7A-7D are flow diagrams illustrating a method 700 of combining tactile outputs corresponding to triggering conditions or inputs from multiple sources, and prioritizing tactile outputs corresponding to inputs on hardware elements over other tactile outputs. Corresponding examples of tactile outputs, combined tactile outputs, and audio outputs are shown in FIGS. 5H, 5I and 5K. Method 700 is performed at an electronic device (e.g., device 300, FIG. 3, or portable multifunction device 100, FIG. 1A) with a display, a touch-sensitive surface, and a set of one or more tactile output generators. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 combines tactile outputs corresponding to triggering conditions or inputs from multiple sources, and prioritizes tactile outputs corresponding to inputs on hardware elements over other tactile outputs. Method 700 enables multiple applications to provide tactile outputs, without the applications having to take into account limits on the number of tactile outputs that can be combined, or limits on the amplitude or magnitude or frequency components of the combined tactile outputs, while ensuring that higher priority tactile outputs are output, or emphasized relative to lower priority tactile outputs. The method reduces the number, extent, and/or nature of the inputs from a user when interacting with the device or applications running on the device, thereby creating a more efficient human-machine interface. From the perspective of the user of the device, method 700 enables the user to receive multiple tactile outputs, with prioritization to ensure that higher priority tactile outputs are not excluded, or are emphasized relative to lower priority tactile outputs, and enables the user to make inputs with more confidence, faster and more efficiently, thereby resulting in fewer incorrect inputs by the user, which enhances the operability of the device. For battery-operated electronic devices, this conserves power and increases the time between battery charges.

While performing method 700, the device receives (702) a first set of one or more inputs (e.g., input 407, FIG. 4A) corresponding to user interface elements (e.g., application icon 424, FIG. 4A) displayed on the display (e.g., touch screen 112, FIG. 4A), wherein the first set of one or more inputs corresponds to a first set of one or more tactile outputs (e.g., tactile output 411, FIG. 4A, or tactile output 502, FIGS. 5H and 5I). The device also receives a second set of one or more inputs (e.g., input 403, FIG. 4A) corresponding to the one or more hardware elements (e.g., home button 204, FIG. 4A, which in some embodiments is a simulated physical button), wherein the second set of one or more inputs corresponds to a second set of one or more tactile outputs (e.g., tactile output 409, FIG. 4A, or tactile output 504F or 504G, FIGS. 5H and 5I). In some embodiments, the second set of one or more inputs corresponds (706) to a click gesture, or a portion of a click gesture, performed using a respective hardware element (e.g., home button 204, FIG. 4A). As discussed above with reference to FIG. 1C, inputs performed using a respective hardware element, represented by hardware input device 145 in FIG. 1C, are delivered to haptic feedback module 133 via a hardware input processing module 146. The resulting tactile output waveform, for example produced using waveform module 123, is then mixed by mixer 125 with overlapping tactile outputs, if any, from other sources.

Having received first and second sets of inputs, the device determines whether the first set of tactile outputs and the second set of tactile outputs overlap (710). In response to the second set of one or more inputs (708), in accordance with a determination (710-No) that the first set of tactile outputs and the second set of one or more tactile outputs do not overlap (e.g., tactile outputs 502 and 504F in FIG. 5H do not overlap), the device outputs (712), with the set of one or more tactile output generators, a tactile output sequence (e.g., combined tactile outputs 510F, FIG. 5H) that includes the first set of one or more tactile outputs and the second set of one or more tactile outputs (e.g., playing both sets of tactile outputs at full volume, the tactile output includes the first set and second set of tactile inputs played in sequence).

On the other hand, in response to the second set of one or more inputs (708), in accordance with a determination (710-Yes) that the first set of one or more tactile outputs (e.g., tactile output 502, FIG. 5I) and the second set of one or more tactile outputs (e.g., tactile output 504G, FIG. 5I) overlap, the device outputs (714), with the set of one or more tactile output generators, a modified tactile output sequence (e.g., combined tactile outputs 510G, FIG. 5I) that is modified so as to emphasize the second set of one or more tactile outputs (e.g., tactile output 504G) relative to the first set of one or more tactile outputs (tactile output 502). By mixing tactile outputs in this way, emphasizing tactile outputs corresponding to inputs from hardware elements relative to other tactile outputs, improved tactile feedback is provided to the user, for example by ensuring the user can detect the tactile outputs produced in response to user inputs on the one or more hardware elements while still allowing other tactile outputs to be generated. The improved tactile feedback enables the user make inputs with more confidence, faster and more efficiently, thereby resulting in fewer incorrect inputs by the user, which enhances the operability of the device. For battery-operated electronic devices, this conserves power and increases the time between battery charges.

In some embodiments, method 700 includes modifying (716) the tactile output sequence so as to emphasize the second set of tactile outputs relative to the first set of tactile outputs by performing one or more of: increasing an amplitude of the second set of tactile outputs and decreasing an amplitude of the first set of tactile outputs. For example, in the example shown in FIG. 5I, second tactile output 504G is emphasized relative to first tactile outputs 502 by decreasing the amplitude of first tactile outputs 502 during the overlapping portion, P3.

In some embodiments, the modified tactile output sequence includes (718) a first portion during which output of the first set of tactile outputs is gradually reduced from a first output level to a second output level. For example, in the example shown in FIG. 5I, during first portion P1 of the modified tactile output sequence 510G, the output of the first tactile output 502, or alternatively the contribution of first tactile output 502 to the modified tactile output sequence 510G, is gradually reduced from a first output level (e.g., an initial level) to a second output level (e.g., an output level lower than the initial level). In some embodiments, the first portion has a fixed duration, such as 5 ms. In some embodiments, the output level is fully reduced from an initial output level to zero during the first portion, as shown in the example in FIG. 5I. In some other embodiments, the output level is gradually reduced from the initial output level but is not fully reduced to zero within the first portion. By mixing tactile outputs in this way, with gradual reduction of the scaling of the tactile outputs from an initial level to a lower level prior to outputting the portion of the tactile output sequence that emphasizes tactile outputs corresponding to inputs from hardware elements relative to other tactile outputs, improved tactile feedback is provided to the user, enhancing the operability of the device. The gradual reduction of the first tactile output signals the user that a new tactile output or new feedback may be forthcoming, and/or avoids an abrupt transition from one tactile output to another that might otherwise distract the user.

In some embodiments, the modified tactile output sequence includes (720) a second portion of reduced tactile output, for example, a period of time during which there is tactile silence or a period of time during which the device ceases to provide instructions to the tactile output generators to generate tactile outputs. In the example shown in FIG. 5I, there is tactile silence during second portion P2 of the modified tactile output sequence. In some embodiments, the second portion has a fixed duration, such as 5 ms. In some embodiments, the second portion (e.g., portion P2, FIG. 5I) of reduced tactile output (e.g., tactile silence) is subsequent to and immediately follows the first portion (e.g., portion P1, FIG. 5I), during which the first set of tactile outputs is gradually reduced. In some embodiments, not shown in FIG. 5I, the modified tactile output includes the second portion (e.g., a period of tactile silence) without including the first portion (e.g., a period of gradual reduction from a first output level to a second output level of the first set of tactile outputs). By mixing tactile outputs in this way, with gradual reduction of the first tactile output from an initial level to a lower level, followed by a period of tactile silence, prior to outputting the portion of the tactile output sequence that emphasizes tactile outputs corresponding to inputs from hardware elements relative to other tactile outputs, improved tactile feedback is provided to the user, enhancing the operability of the device. The gradual reduction of the first tactile output followed by a period of tactile silence enables the user to receive or feel the subsequent portion of the tactile feedback, including tactile output corresponding to a user input on a hardware element, without distraction from other tactile outputs. By providing distinct tactile feedback for user inputs on one or more hardware elements, while still providing other tactile outputs when those other tactile outputs do not overlap the tactile output corresponding to user inputs on the one or more hardware elements, more accurate feedback is provided to the user with respect to user inputs on the one or more hardware elements, which in turn enables the user make inputs on hardware elements with more confidence, faster and more efficiently, thereby resulting in fewer incorrect inputs by the user. For battery-operated electronic devices, this conserves power and increases the time between battery charges.

In some embodiments, the duration of the second portion of the modified tactile sequence is selected (722) based on a magnitude of the first portion of the modified tactile sequence. An example of selecting the duration of the period of tactile silence based on the magnitude of a prior portion of the modified tactile sequence is shown in FIG. 5K and discussed above with reference to FIG. 5K.

In some embodiments, the modified tactile output sequence includes (724) a third portion (e.g., portion P3 of combined tactile outputs 510J (Low) or 510J (High), FIG. 5K) that is subsequent to the second portion (portion P2) and includes the second set of tactile outputs (e.g., portion P2, FIG. 5K), and a duration of the third portion (e.g., 7-8 ms) is longer than a duration of the second portion of reduced tactile output (e.g., 5 ms). Stated another way, the period of tactile silence immediately preceding the third portion of the modified tactile output sequence is typically shorter than the third portion of the modified tactile output sequence, where the third portion typically includes a high priority tactile output, such as the tactile output associated with an input on a hardware element. By mixing tactile outputs in this way, including providing a period of tactile silence prior to providing a portion of the modified tactile output sequence that includes a high priority tactile output, such as the tactile output associated with an input on a hardware element, with said portion of the modified tactile output sequence being longer in duration than the immediately preceding period of tactile silence, improved tactile feedback is provided to the user, enhancing the operability of the device. This combination of timing and tactile output mixing features enables the user to receive or feel tactile output corresponding to a user input on a hardware element without distraction from other tactile outputs. By providing distinct tactile feedback for user inputs on one or more hardware elements, while still providing other tactile outputs when those other tactile outputs do not overlap the tactile output corresponding to user inputs on the one or more hardware elements, more accurate feedback is provided to the user with respect to user inputs on the one or more hardware elements, which in turn enables the user make inputs on hardware elements with more confidence, faster and more efficiently, thereby resulting in fewer incorrect inputs by the user. For battery-operated electronic devices, this conserves power and increases the time between battery charges.

In some embodiments, the modified tactile output sequence includes (726) a third portion (e.g., portion P3 of combined tactile outputs 510J (Low) or 510J (High), FIG. 5K) that includes the second set of tactile outputs (e.g., tactile output 504G), and a fourth portion (e.g., portion P4 of combined tactile outputs 510J (Low) or 510J (High), FIG. 5K) during which the first set of tactile outputs (e.g., tactile output 502) is output using an output level that is gradually increased from a third output level (e.g., the same as the second output level) to a fourth output level (e.g., the same as the first output level), wherein the fourth portion (e.g., P4, FIG. 5K) is subsequent to the third portion (e.g., P3, FIG. 5K). By mixing tactile outputs in this way, with gradual transitions in tactile outputs before and after outputting the portion of the tactile output sequence that emphasizes tactile outputs corresponding to inputs from hardware elements relative to other tactile outputs, improved tactile feedback is provided to the user, enhancing the operability of the device. The gradual transitions enable the user to distinctly receive or feel the portion of the tactile output sequence corresponding to a user input on a hardware element, without distraction from other tactile outputs. By providing distinct tactile feedback for user inputs on one or more hardware elements, while still providing other tactile outputs when those other tactile outputs do not overlap the tactile output corresponding to user inputs on the one or more hardware elements, more accurate feedback is provided to the user with respect to user inputs on the one or more hardware elements, which in turn enables the user make inputs on hardware elements with more confidence, faster and more efficiently, thereby resulting in fewer incorrect inputs by the user. For battery-operated electronic devices, this conserves power and increases the time between battery charges.

In some of these embodiments, the duration of the third portion (e.g., 7-8 ms) is longer than the duration of the fourth portion (e.g., 5 ms). In some embodiments, the third portion is subsequent to and immediately follows the second portion of tactile silence, and in some such embodiments, the duration of the third portion (e.g., 7-8 ms) is longer than the duration of the second portion of tactile silence (e.g., 5 ms) and also longer than the duration of the fourth portion (e.g., 5 ms).

In some embodiments, the modified tactile output sequence includes (728) a third portion (e.g., portion P3 of combined tactile outputs 510J (Low) or 510J (High), FIG. 5K) that includes the second set of tactile outputs (e.g., tactile output 504G, FIG. 5K), and a fifth portion of reduced tactile output, wherein the fifth portion is subsequent to the third portion (not shown in FIG. 5K). In some such embodiments, shown in the top half of FIG. 5K, the third portion (e.g., P3) is followed immediately by a fourth portion (e.g., P4) of tactile silence, which in turn is followed immediately by a fifth portion (e.g., P5) during which the first set of tactile outputs (e.g., tactile output 502) is output using an output level that is gradually increased from a third output level (e.g., the same as the second output level) to a fourth output level (e.g., the same as the first output level). By mixing tactile outputs in this way, with distinct transitions and outputs in multiple successive portions of a tactile output sequence, improved tactile feedback is provided to the user, enhancing the operability of the device. The provision of these distinct portions, in sequence, enable the user to distinctly receive or feel the portion of the tactile output sequence corresponding to a user input on a hardware element, without distraction from other tactile outputs. By providing distinct tactile feedback for user inputs on one or more hardware elements, while still providing other tactile outputs when those other tactile outputs do not overlap the tactile output corresponding to user inputs on the one or more hardware elements, more accurate feedback is provided to the user with respect to user inputs on the one or more hardware elements, which in turn enables the user make inputs on hardware elements with more confidence, faster and more efficiently, thereby resulting in fewer incorrect inputs by the user. For battery-operated electronic devices, this conserves power and increases the time between battery charges.

In some embodiments, while emphasizing the second set of one or more tactile outputs over the first set of one or more tactile outputs, the device continues to process the first set of one or more inputs (730), including mixing together tactile outputs for the first set of one or more inputs. For example, the device does this so that when the device ceases to emphasize the second set of one or more tactile outputs over first set of one or more tactile outputs, the device outputs the first set of one or more tactile outputs as though they had continued to progress while they were deemphasized. As a result, the first set of one or more tactile outputs can be resumed promptly, when the device ceases to emphasize the second set of one or more tactile outputs over the first set of one or more tactile outputs, and the first set of one or more tactile outputs are still synchronized with the inputs to which they correspond. For example, while a second tactile output is produced in response to an input (e.g., a click) on a hardware element (e.g., home button 204, FIG. 4A), first user interface tactile outputs produced in response to other triggering conditions continue to be received, processed and mixed, but are reduced in amplitude or silenced during the generation of the second portion of the combined tactile output (e.g., P2, FIG. 5K). By mixing tactile outputs in this way, with tactile outputs continuing to be generated even during portions of a tactile output sequence in which those tactile outputs are silenced, a faster and smoother transition to resuming the provision of those tactile outputs is provided, and thus improved tactile feedback is provided to the user, enhancing the operability of the device. By providing more accurate feedback to the user with respect to user inputs, the user is enabled to make inputs on hardware elements with more confidence, faster and more efficiently, thereby resulting in fewer incorrect inputs by the user. For battery-operated electronic devices, this conserves power and increases the time between battery charges.

In some embodiments, outputting the modified tactile sequence (714) includes reducing (732) a scale of at least a portion of the first set of one or more tactile outputs that overlaps with the second set of one or more tactile outputs. Examples of this are discussed above with reference to FIGS. 5I, 5K and 5L. Further discussion of such scale reducing is provided below with reference to method 800 and FIGS. 8A-8D.

In some embodiments, in accordance with a determination (734) that a first portion of the combined tactile outputs meets output limiting criteria for the one or more tactile output generators, method 700 includes reducing (736) a scale of the combined tactile outputs during at least a second portion of the combined tactile outputs immediately preceding the first portion of the combined tactile outputs, and outputting (738), with the set of one or more tactile output generators, a tactile output sequence (e.g., combined tactile outputs 510C-RS, FIG. 5E, or combined tactile outputs 510E-RS, FIG. 5G) based on the combined tactile outputs that includes the second portion of the combined tactile outputs with reduced scale.

In some embodiments, after reducing the scale of the combined tactile outputs during the second portion (e.g., portion P1, FIG. 5E), method 700 includes continuing to output, via the one or more tactile output generators, the combined tactile outputs with the reduced scale during the first portion (e.g., portion P2, which follows portion P1, FIG. 5E). As a result, the amplitude of the scale-reduced portions satisfies a predefined limit, corresponding to the aforementioned output limiting criteria for the one or more tactile output generators. FIG. 5E shows an example in which a reduced scale is applied during a second portion, P2, of combined tactile output 510C, after reducing the scale of the combined tactile outputs during a first portion, P1.

Further discussion of the application of output limiting criteria for the one or more tactile output generators to tactile outputs is provided above with reference to FIG. 5E, and also FIG. 5G, as well as with reference to operations 636 and 638 of method 600.

In some embodiments, method 700 includes playing (740) an audio output (e.g., first audio output 512, FIGS. 5H and 5I) that is synchronized with the first set of one or more tactile outputs and is triggered by a same condition (e.g., a triggering condition corresponding to indicator 501, FIGS. 5H and 5I) that triggered the first set of one or more tactile outputs (e.g., first tactile output 502, FIGS. 5H and 5I), and (e.g., in conjunction with receiving the second set of one or more inputs) continuing to play (742) the audio output that is synchronized with the first set of one or more tactile outputs without modification independently of whether or not the second set of one or more tactile outputs (e.g., tactile output 504F, FIG. 5H, or tactile output 504G, FIG. 5I) is emphasized relative to the first set of one or more tactile outputs. For example, the audio component of a synchronized tactile/audio output continues to be played at a same volume even if tactile component of the synchronized tactile/audio output is de-emphasized, as shown in FIG. 5I By providing synchronized tactile outputs and audio outputs, while also mixing the tactile outputs to produce combined tactile outputs to be output using one or more tactile output generators, and mixing the audio outputs to produce combine audio outputs, method 700 enables multiple applications, modules, or user interface elements to provide synchronized tactile and audio outputs that are combined when they overlap. This, in turn, provides improved tactile and audio feedback to the user of the electronic device, which enhances the operability of the device.

In some embodiments, method 700 includes playing (744) a first audio output (e.g., audio output 512, FIG. 5I) that is synchronized with the first set of one or more tactile outputs (e.g., tactile output 502, FIG. 5I) and is triggered by a same condition (e.g., a triggering condition corresponding to indicator 501, FIG. 5I) that triggered the first set of one or more tactile outputs; and while playing the first audio output, playing (746) a second audio output (e.g., audio output 514G, FIG. 5I) that is synchronized with the second set of one or more tactile outputs (e.g., tactile output 504G, FIG. 5I) and is triggered by a same condition (e.g., a triggering condition corresponding to indicator 503G, FIG. 5I) that triggered the second set of one or more tactile outputs, wherein the first audio output is modified (not shown in FIG. 5I) to emphasize the second audio output while playing the second audio output. Thus, in at least some such embodiments, audio outputs are combined in a similar way to the tactile outputs, and in particular, when combining audio outputs, audio outputs corresponding to inputs on hardware elements are emphasized relative to audio outputs corresponding to inputs on user interface elements.

In some such embodiments, a magnitude of the first audio output is user-selected and/or a magnitude of the second audio output is user-selected (748). For example, the device may provide one or more user adjustable settings, and optionally one or more corresponding user interfaces or user interface affordances, for selecting the magnitude of the first audio output, for selecting the magnitude of the second audio output, and/or for selecting the relative magnitude of second audio output relative to the first audio output.

In some embodiments, method 700 includes, in response to the second set of one or more inputs, playing (750) an audio output that is triggered by a same condition that triggered the second set of one or more tactile outputs, wherein the audio output starts after the second set of one or more tactile outputs starts. Thus, in some such embodiments, method 700 includes, in response to the second set of one or more inputs, initiating output of the modified tactile output sequence, and subsequent to initiating to output of the modified tactile output sequence, initiating playing of the audio output that is triggered by a same condition that triggered the second set of one or more tactile outputs. For example, in some embodiments, the delay from click detection (e.g., on home button 204, FIG. 4A) to tactile output for the button click is less than 50 ms, while the delay to playing an audio output corresponding to the button click is more than 50 ms. More generally, in some embodiments, a delay from receiving the second set of one or more inputs corresponding to the one or more hardware elements to outputting the modified tactile output sequence is less than a first amount of time (e.g., 50 ms) while the delay from receiving the second set of one or more inputs corresponding to the one or more hardware elements to outputting a corresponding audio sequence is more than the first amount of time.

It should be understood that the particular order in which the operations in FIGS. 7A-7D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIGS. 7A-7D. For example, the prioritization of tactile outputs corresponding to inputs on hardware elements over other tactile outputs described above with reference to method 700 optionally have one or more of the characteristics of the application of limits to the number, magnitude and/or frequency components of combined tactile outputs and/or the mixing of tactile outputs in accordance with priorities of those tactile outputs described herein with reference to other methods described herein (e.g., methods 600 and 800). For brevity, these details are not repeated here.

FIGS. 8A-8D are flow diagrams illustrating a method 800 of combining tactile outputs corresponding to triggering conditions or inputs from multiple sources in accordance with the priorities of the tactile outputs. Corresponding examples of tactile outputs, combined tactile outputs, and audio outputs are shown in FIGS. 5A, 5H, 5I, 5J and 5L. Method 800 is performed at an electronic device (e.g., device 300, FIG. 3, or portable multifunction device 100, FIG. 1A) with a display, a touch-sensitive surface, and a set of one or more tactile output generators. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 combines tactile outputs corresponding to triggering conditions or inputs from multiple sources, and prioritizes tactile outputs during mixing based on assigned priorities. Method 800 enables multiple applications to provide tactile outputs, without the applications having to take into account limits on the number of tactile outputs that can be combined, or limits on the amplitude or magnitude or frequency components of the combined tactile outputs, while ensuring that higher priority tactile outputs are output, or emphasized relative to lower priority tactile outputs. The method reduces the number, extent, and/or nature of the inputs from a user when interacting with the device or applications running on the device, thereby creating a more efficient human-machine interface. From the perspective of the user of the device, method 800 enables the user to receive multiple tactile outputs, with prioritization to ensure that higher priority tactile outputs are not excluded, or are emphasized relative to lower priority tactile outputs, and enables the user to make inputs with more confidence, faster and more efficiently, thereby resulting in fewer incorrect inputs by the user. For battery-operated electronic devices, this conserves power and increases the time between battery charges.

While performing method 800, the device detects (802) a triggering condition for a first set of one or more tactile outputs with a first priority (e.g., receiving a first set of one or more inputs corresponding to the first set of one or more tactile outputs), and detects (804) a triggering condition for a second set of one or more tactile outputs with a second priority (e.g., receiving a second set of one or more inputs corresponding to the second set of one or more tactile outputs). In some embodiments, the first set of one or more tactile outputs with the first priority corresponds (820) to asynchronous events (e.g., a user interface event that is not in response to a user input, such as displaying a notification of an incoming message, a completion of a transaction, etc.). Similarly, in some embodiments, the second set of one or more tactile outputs with the second priority corresponds (822) to synchronous events (e.g., one or more inputs corresponding to user interface elements displayed on the display of the device performing method 800).

In some embodiments, detection operation 802 includes receiving (824) a first set of one or more inputs corresponding to user interface elements displayed on the display, wherein the first set of one or more inputs corresponds to the first set of one or more tactile outputs (e.g., tactile output 502, FIGS. 5I and 5J) having the first priority. Similarly, in some embodiments, detection operation 804 includes receiving (826) a second set of one or more inputs corresponding to one or more hardware elements, wherein the second set of one or more inputs corresponds to the second set of one or more tactile outputs (e.g., tactile output 504G, FIGS. 5I and 5J) having the second priority. In some embodiments, the second priority is higher than the first priority (828). Furthermore, in some embodiments, the second set of one or more inputs corresponds (830) to a click gesture, or a portion of a click gesture, performed using a respective hardware element (e.g., home button 204, FIG. 4A, or other button, or key on a keyboard). As discussed above with reference to FIG. 1C, inputs performed using a respective hardware element, represented by hardware input device 145 in FIG. 1C, are delivered to haptic feedback module 133 via a hardware input processing module 146. The resulting tactile output waveform, for example produced using waveform module 123, is then mixed by mixer 125 with overlapping tactile outputs, if any, from other sources.

Next, in response (808) to detecting (802, 804) the triggering condition for the first set of one or more tactile outputs and the triggering condition for the second set of one or more tactile outputs, and in accordance with a determination that the first set of one or more tactile outputs are scheduled to at least partially overlap with the second set of one or more tactile outputs, method 800 includes, in accordance with a determination (810, first priority>second priority) that the first priority is higher than the second priority (e.g., as shown in the example in FIG. 5J), the electronic device reduces (812) a scale of at least a portion of the second set of one or more tactile outputs (e.g., second tactile output 504G) that overlaps with the first set of one or more tactile outputs (e.g., first tactile output 502). For example, "reducing a scale" of at least a portion of the second set of one or more tactile outputs that overlaps with the first set of one or more tactile outputs, means reducing the scale of the portion of the second set one or more tactile outputs relative to a scale of the first set of one or more tactile outputs.

Furthermore, in some embodiments, in conjunction with reducing (812) the scale of the second set of one or more tactile outputs with the second priority, method 800 includes outputting (840) the first set of one or more tactile outputs with the first priority. For example, in the example shown in FIG. 5J, in conjunction with reducing the scale of second tactile output 504G, first tactile output 502 is output (e.g., in included in the combined tactile output 510H, which is output by the device's one or more tactile output generators).

On the other hand, in response (808) to detecting (802, 804) the triggering condition for the first set of one or more tactile outputs and the triggering condition for the second set of one or more tactile outputs, and in accordance with a determination that the first set of one or more tactile outputs are scheduled to at least partially overlap with the second set of one or more tactile outputs, method 800 includes, in accordance with a determination (810, second priority>first priority) that the second priority is higher than the first priority (e.g., as shown in the example in FIG. 5I), the electronic device reduces a scale of at least a portion of the first set of one or more tactile outputs (e.g., portion P3 of first tactile output 502, FIG. 5I) that overlaps with the second set of one or more tactile outputs (e.g., second tactile output 504G, FIG. 5I). For example, reducing a scale of at least a portion of the first set of one or more tactile outputs that overlaps with the second set of one or more tactile outputs, means reducing the scale of the portion of the first set one or more tactile outputs relative to a scale of second first set of one or more tactile outputs.

Furthermore, in some embodiments, in conjunction with reducing (814) the scale of the first set of one or more tactile outputs with the first priority, method 800 includes outputting (842) the second set of one or more tactile outputs with the second priority. For example, in the example shown in FIG. 5I, in conjunction with reducing the scale of portion P3 of first tactile output 502, second tactile output 504G is output (e.g., in included in the combined tactile output 510G, which is output by the device's one or more tactile output generators).

In some embodiments, higher priority tactile outputs are ones that correspond to user interactions where a delay above a threshold will be noticeable (e.g., 50 ms), such as feedback about user interaction with control elements and, in particular, control elements directly manipulated by user inputs (e.g., sliders, scrubbers, buttons, switches, scrolling regions, etc., some of which also provide visual feedback in response to user interaction with those control elements).

In some embodiments, in response (808) to detecting (802, 804) the triggering condition for the first set of one or more tactile outputs and the triggering condition for the second set of one or more tactile outputs, and in accordance with a determination that the first set of one or more tactile outputs are scheduled to at least partially overlap with the second set of one or more tactile outputs, method 800 includes, in accordance with a determination (810, first priority=second priority) that the first priority is the same as the second priority, combining (816) the first set of one or more tactile outputs with the second set of one or more tactile outputs without reducing a scale of the first set of one or more tactile outputs relative to the scale of the second set of one or more tactile outputs. For example, in the example shown in FIG. 5A, first and second tactile outputs 502 and 504 are combined without reducing a scale of the first tactile output relative to the scale of the second tactile output. By mixing tactile outputs in this way, reducing the scale of lower priority tactile outputs relative to higher priority tactile outputs, improved tactile feedback is provided to the user, for example by ensuring the user can detect the higher priority tactile outputs produced while still allowing other tactile outputs to be generated. The improved tactile feedback enables the user make inputs with more confidence, faster and more efficiently, thereby resulting in fewer incorrect inputs by the user, which enhances the operability of the device. For battery-operated electronic devices, this conserves power and increases the time between battery charges.

In some embodiments, method 800 includes, in response to detecting the triggering condition for the first set of one or more tactile outputs and the triggering condition for the second set of one or more tactile outputs and in accordance with a determination that the first set of one or more tactile outputs are not scheduled to overlap with other tactile outputs (e.g., as shown in the example in FIG. 5H, first tactile output 502 and second tactile output 504F are not scheduled to overlap), outputting (832), with the one or more tactile output generators, the first set of one or more tactile outputs and the second set of one or more tactile outputs without reducing a scale of the first set of one or more tactile outputs and the second set of one or more tactile outputs. As shown in the example in FIG. 5H, the first and second tactile outputs 502 and 504F are output without reducing a scale of the first tactile output 502 and the second tactile output 504F. By mixing tactile outputs in this way, improved tactile feedback is provided to the user. The improved tactile feedback enables the user make inputs with more confidence, faster and more efficiently, thereby resulting in fewer incorrect inputs by the user, which enhances the operability of the device. For battery-operated electronic devices, this conserves power and increases the time between battery charges.

In some embodiments, method 800 further includes generating (850) combined tactile outputs (e.g., combined tactile outputs 510G, FIG. 5I or 510H, FIG. 5J) by combining at least the first set of one or more tactile outputs (e.g., tactile output 502), including any portion thereof with reduced scale, and the second set of one or more tactile outputs (e.g., tactile output 504G), including any portion thereof with reduced scale; and outputting (852), with the set of one or more tactile output generators, a tactile output sequence based on the combined tactile outputs (e.g., as shown in FIGS. 5I and 5J). Furthermore, in some embodiments, the tactile output sequence includes (854) a first portion (e.g., portion P1 of combined tactile outputs 510G, FIG. 5I) during which output of the first set of tactile outputs is gradually reduced from a first output level to a second output level (e.g., as shown in FIG. 5I).

In some embodiments, method 800 includes detecting (860) a triggering condition for a third set of one or more tactile outputs with a third priority that is higher than the second priority and the first priority (e.g., third tactile output 506K, as shown in the FIG. 5L). Optionally, the third set of one or more tactile outputs with the third priority corresponds (862) to one or more hardware elements (e.g., a simulated physical button such as home button 204, FIG. 4A).

In some embodiments, in response to detecting (860) the triggering condition for the third set of one or more tactile outputs and in accordance with a determination that the third set of one or more tactile outputs are scheduled to at least partially overlap with the first set of one or more tactile outputs and the second set of one or more tactile outputs (e.g., as shown in FIG. 5L), method 800 includes reducing (866) a scale of at least a portion of the first set of one or more tactile outputs that overlaps with the third set of one or more tactile outputs, and reducing (868) a scale of at least a portion of the second set of one or more tactile outputs that overlaps with the third set of one or more tactile outputs. For example, as shown in FIG. 5L, in the portion of the first tactile output 502 and second tactile output 504 that overlaps with the third tactile output 506K, the scale of both the first tactile output 502 and second tactile output 504 are reduced (e.g., the reduced scale versions of both are included in combined tactile outputs 510K, which are output by the one or more tactile output generators of the device). Stated another way, while outputting a sequence of tactile outputs with a third priority that is higher than the first or second priority, the device reduces the amplitudes of tactile outputs of the first priority and the second priority. By mixing tactile outputs in this way, reducing the scale of lower priority tactile outputs relative to higher priority tactile outputs, improved tactile feedback is provided to the user, for example by ensuring the user can detect the higher priority tactile outputs produced while still allowing other tactile outputs to be generated. The improved tactile feedback enables the user make inputs with more confidence, faster and more efficiently, thereby resulting in fewer incorrect inputs by the user, which enhances the operability of the device. For battery-operated electronic devices, this conserves power and increases the time between battery charges.

In some embodiments, method 800 includes playing (870) an audio output (e.g., audio output 512 or 514F, FIG. 5H; or audio output 512 or 514G, FIG. 5I; or audio output 512 or 512G, FIG. 5J) that is synchronized with a first set of tactile outputs or the second set of tactile outputs, and continuing to play (872) the audio output without modification independently of whether or not the scale of at least the portion of the first set of one or more tactile outputs that overlaps with the second set of one or more tactile outputs or the scale of at least the portion of the second set of one or more tactile outputs that overlaps with the first set of one or more tactile outputs is reduced. Examples of such continued playing of the audio output are shown in FIGS. 5I and 5J.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8D. For example, the mixing of tactile outputs in accordance with priorities of those tactile outputs described herein described above with reference to method 800 optionally have one or more of the characteristics of the application of limits to the number, magnitude and/or frequency components of combined tactile outputs described herein with reference to method 600 and/or the prioritization of tactile outputs corresponding to inputs on hardware elements over other tactile outputs described herein with reference to method 700. For brevity, these details are not repeated here.

Figure 9:
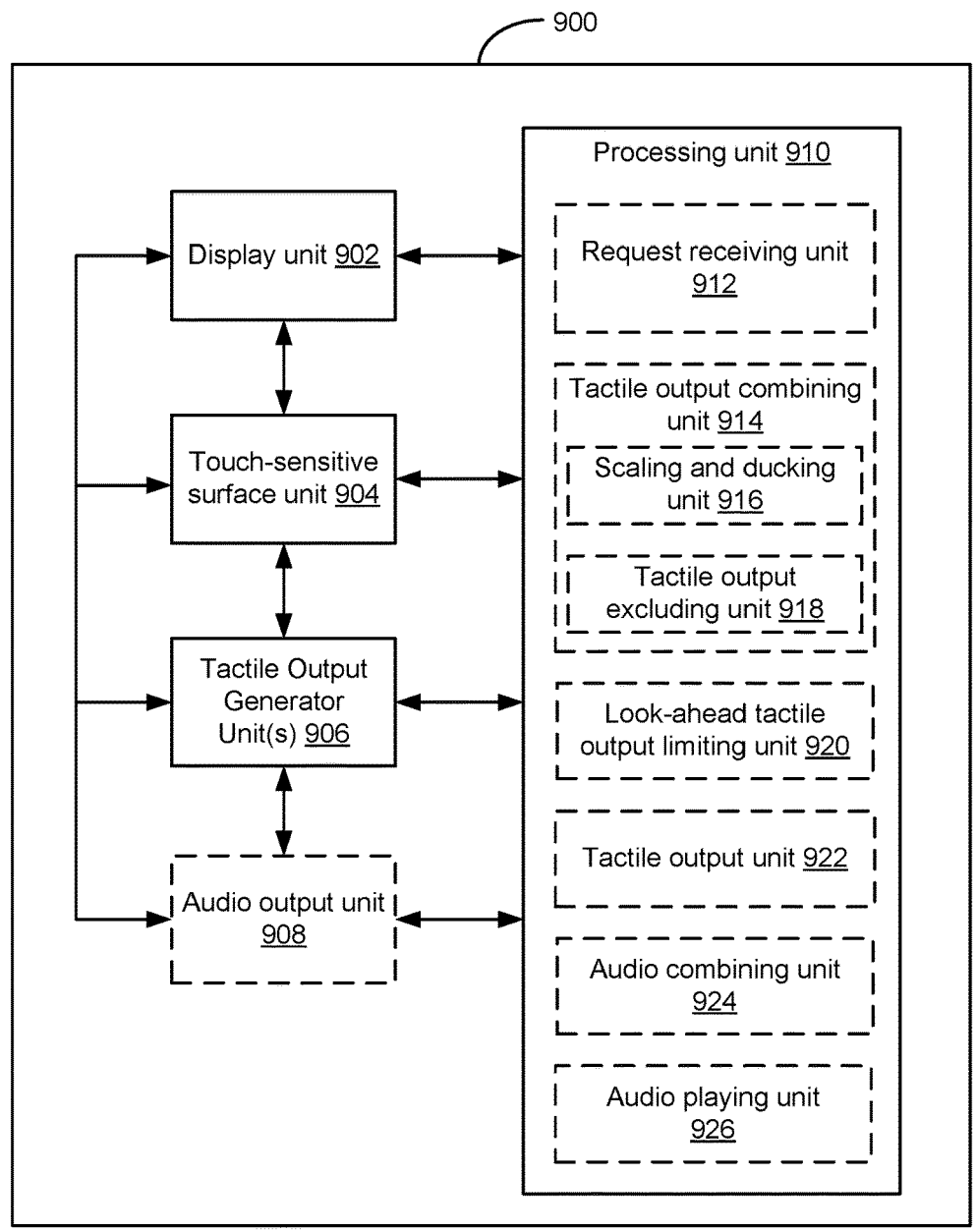
FIGS. 9-11 are functional block diagrams of an electronic device in accordance with some embodiments.

In accordance with some embodiments, FIG. 9 shows a functional block diagram of electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, electronic device 900 includes display unit 902 (e.g., including display 112) configured to display user interfaces, touch-sensitive surface unit 904 configured to receive touch inputs (on a surface, such as a display surface of display unit 902), one or more tactile output generator unit(s) 906 configured to generate one or more tactile outputs, and processing unit 910 coupled with display unit 902, touch-sensitive surface unit 904, and one or more tactile output generator unit(s) 906. In some embodiments, electronic device 900 also includes audio output unit 908 for generating audio outputs, also coupled to processing unit 910. In some embodiments, processing unit 910 includes one or more of the following sub-units: request receiving unit 912, tactile output combining unit 914, look-ahead tactile output limiting unit 920, tactile output unit 922, audio combining unit 924, and audio playing unit 926. In some embodiments, tactile output combining unit 914 includes scaling and ducking unit 916 and/or tactile output excluding unit 918.

In some embodiments, processing unit 910 is configured to receive a plurality of requests (e.g., using request receiving unit 912) to generate a plurality of tactile outputs (e.g., using tactile output unit 922) using one or more tactile output generator unit(s) 906, wherein the plurality of tactile outputs include two or more overlapping tactile outputs. Processing unit 910 is configured to, in response to receiving the plurality of requests, generate and output (e.g., using tactile output unit 922), via one or more tactile output generator unit(s) 906, combined tactile outputs. The generating and outputting includes, in accordance with a determination (e.g., made using tactile output combining unit 914 and/or look-ahead tactile output limiting unit 920) that the plurality of tactile outputs does not exceed a threshold number of tactile outputs that is permitted to be mixed together for concurrent output via one or more tactile output generator unit(s) 906, mixing the plurality of tactile outputs together (e.g., using tactile output combining unit 914) into a first combined tactile output, including the first combined tactile output in the combined tactile outputs, and outputting (e.g., using tactile output unit 922), via one or more tactile output generator unit(s) 906, the combined tactile outputs, including the first combined tactile output. The generating and outputting also includes, in accordance with a determination (e.g., made using tactile output combining unit 914 and/or look-ahead tactile output limiting unit 920) that the plurality of tactile outputs exceeds the threshold number of tactile outputs that is permitted to be mixed together for concurrent output via one or more tactile output generator unit(s) 906, mixing a subset of the plurality of tactile outputs together (e.g., using tactile output combining unit 914 and/or tactile output excluding unit 918) into a second combined tactile output that excludes at least one of the plurality of tactile outputs, including the second combined tactile output in the combined tactile outputs, and outputting (e.g., using tactile output unit 922), via one or more tactile output generator unit(s) 906, the combined tactile outputs, including the second combined tactile output.

In some embodiments, processing unit 910 is further configured to, after receiving the plurality of requests to output the plurality of tactile outputs, receive a request (e.g., using request receiving unit 912) to output an additional tactile output that at least partially overlaps with a respective tactile output in the plurality of tactile outputs. Processing unit 910 is configured to, after outputting (e.g., using tactile output unit 922) a first portion of the respective tactile output and in response to receiving the request to output the additional tactile output, in accordance with a determination (e.g., made using tactile output combining unit 914 and/or look-ahead tactile output limiting unit 920) that a combination of the additional tactile output and the plurality of tactile outputs does not exceed the threshold number of tactile outputs that is permitted to be mixed together for concurrent output via one or more tactile output generator unit(s) 906, mix the additional tactile output with the plurality of tactile outputs (e.g., using tactile output combining unit 914), including a second portion of the respective tactile output, together into a third combined tactile output, and include the third combined tactile output in the combined tactile outputs, and output (e.g., using tactile output unit 922), via one or more tactile output generator unit(s) 906, the combined tactile outputs, including the third combined tactile output. Processing unit 910 is configured to, in accordance with a determination (e.g., made using tactile output combining unit 914 and/or look-ahead tactile output limiting unit 920) that the combination of the additional tactile output and the plurality of tactile outputs exceeds the threshold number of tactile outputs that is permitted to be mixed together for concurrent output via one or more tactile output generator unit(s) 906, mix the additional tactile output with the plurality of tactile outputs, excluding the second portion of the respective tactile output, together (e.g., using tactile output combining unit 914 and/or tactile output excluding unit 918) into a fourth combined tactile output, and include the fourth combined tactile output in the combined tactile outputs, and output (e.g., using tactile output unit 922), via one or more tactile output generator unit(s) 906, the combined tactile outputs, including the fourth combined tactile output.

In some embodiments, the second portion of the respective tactile output is selected (e.g., using tactile output excluding unit 918), from the plurality of tactile outputs, to be excluded from the plurality of tactile outputs based on an age of an input that triggered the respective tactile output.

In some embodiments, processing unit 910 is further configured to play an audio output (e.g., using audio playing unit 926) that is synchronized with the respective tactile output (e.g., using audio combining unit 924) and is triggered by a same condition that triggered the respective tactile output, and processing unit 910 is configured to continue to play (e.g., using audio playing unit 926) the audio output that is synchronized with the respective tactile output (e.g., using audio combining unit 924) without regard to whether or not the second portion of the tactile output is excluded from the combined tactile outputs that are output via one or more tactile output generator unit(s) 906.

In some embodiments, one or more of the tactile outputs of the plurality of tactile outputs are part of synchronized tactile and audio outputs that include both an audio output and a corresponding tactile output that are synchronized (e.g., using audio combining unit 924 and/or audio playing unit 926) to occur with a particular temporal alignment.

In some embodiments, the plurality of tactile outputs includes a tactile output generated (e.g., using tactile output unit 922) in response to a user input directed toward a control element in a displayed user interface.

In some embodiments, the plurality of tactile outputs includes a tactile output generated (e.g., using tactile output unit 922) in response to a user input directed toward a hardware control. In some embodiments, the plurality of tactile outputs includes a tactile output generated (e.g., using tactile output unit 922) in response to the occurrence of a predefined condition.

In some embodiments, the combined tactile outputs a first portion and a second portion. Processing unit 910 is configured to, in accordance with a determination (e.g., made using tactile output and/or tactile output combining unit 914 and/or look-ahead tactile output limiting unit 920) that the second portion of the combined tactile outputs meets output limiting criteria for one or more tactile output generator unit(s) 906, reduce a scale of the combined tactile outputs (e.g., using tactile output combining unit 914 and/or scaling and ducking unit 916) during at least the first portion of the combined tactile outputs immediately preceding the second portion of the combined tactile outputs, and output (e.g., using tactile output unit 922), via one or more tactile output generator unit(s) 906, a tactile output sequence based on the combined tactile outputs that includes the first portion of the combined tactile outputs with reduced scale.

In some embodiments, processing unit 910 is configured to, in accordance with a determination (e.g., made using tactile output combining unit 914 and/or look-ahead tactile output limiting unit 920) that the second portion of the combined tactile outputs does not meet output limiting criteria for one or more tactile output generator unit(s) 906, output (e.g., using tactile output unit 922), via one or more tactile output generator unit(s) 906, the tactile output sequence without reducing the scale of the combined tactile outputs during at least the first portion of the combined tactile outputs.

In some other embodiments, processing unit 910 is configured to, after reducing the scale of the combined tactile outputs during the first portion, continue to output (e.g., using tactile output unit 922), via one or more tactile output generator unit(s) 906, the combined tactile outputs with the reduced scale during the second portion. In some embodiments, processing unit 910 is configured to, after reducing the scale of the first portion of the combined tactile outputs, apply a low pass filter to the combined tactile outputs (e.g., using scaling and ducking unit 916) so as to remove or reduce frequency components, if any, of the combined tactile outputs that are above a predefined cutoff frequency. In some embodiments, processing unit 910 is configured to, after outputting, via one or more tactile output generator unit(s) 906, the second portion of the combined tactile outputs that includes the second portion at reduced scale, gradually increase the scale (e.g., using scaling and ducking unit 916) of the combined tactile outputs during at least a third portion of the combined tactile outputs.

In some embodiments, reducing the scale of the combined tactile outputs (e.g., using scaling and ducking unit 916) is performed using a smoothly varying scale reduction parameter.

In some embodiments, receiving (e.g., using request receiving unit 912) the plurality of requests includes receiving a first set of one or more inputs corresponding to user interface elements displayed on display unit 902, wherein the first set of one or more inputs corresponds to a first set of one or more tactile outputs; and receiving (e.g., using request receiving unit 912) a second set of one or more inputs corresponding to one or more hardware elements, wherein the second set of one or more inputs corresponds to the second set of one or more tactile outputs. In some embodiments, the plurality of tactile outputs includes the first set of one or more tactile outputs and the second set of one or more tactile outputs.

In some embodiments, generating the combined tactile outputs includes, in accordance with a determination (e.g., made using tactile output combining unit 914 and/or look-ahead tactile output limiting unit 920) that the first set of tactile outputs and the second set of one or more tactile outputs do not overlap include (e.g., using tactile output combining unit 914) in the combined tactile outputs the first set of one or more tactile outputs and the second set of one or more tactile outputs; and, in accordance with a determination (e.g., made using tactile output combining unit 914 and/or look-ahead tactile output limiting unit 920) that the first set of one or more tactile outputs and the second set of one or more tactile outputs overlap, include (e.g., using tactile output combining unit 914) in the combined tactile outputs a modified tactile output sequence that is modified (e.g., using tactile output combining unit 914) so as to emphasize the second set of one or more tactile outputs relative to the first set of one or more tactile outputs.

In some embodiments, receiving the plurality of requests includes detecting a triggering condition for a first set of one or more tactile outputs with a first priority and detecting a triggering condition for a second set of one or more tactile outputs with a second priority. In some embodiments, generating the combined tactile outputs includes, in response to detecting the triggering condition for the first set of one or more tactile outputs and the triggering condition for the second set of one or more tactile outputs and in accordance with a determination (e.g., made using tactile output combining unit 914 and/or look-ahead tactile output limiting unit 920) that the first set of one or more tactile outputs are scheduled to at least partially overlap with the second set of one or more tactile outputs, in accordance with a determination (e.g., made using tactile output combining unit 914 and/or look-ahead tactile output limiting unit 920) that the first priority is higher than the second priority, reducing a scale (e.g., using scaling and ducking unit 916) of at least a portion of the second set of one or more tactile outputs that overlaps with the first set of one or more tactile outputs; in accordance with a determination (e.g., made using tactile output combining unit 914 and/or look-ahead tactile output limiting unit 920) that the second priority is higher than the first priority, reducing a scale (e.g., using scaling and ducking unit 916) of at least a portion of the first set of one or more tactile outputs that overlaps with the second set of one or more tactile outputs; and generating the combined tactile outputs (e.g., using tactile output unit 922) by combining at least the first set of one or more tactile outputs (e.g., using tactile output combining unit 914), including any portion thereof with reduced scale, and the second set of one or more tactile outputs, including any portion thereof with reduced scale.

Figure 10:
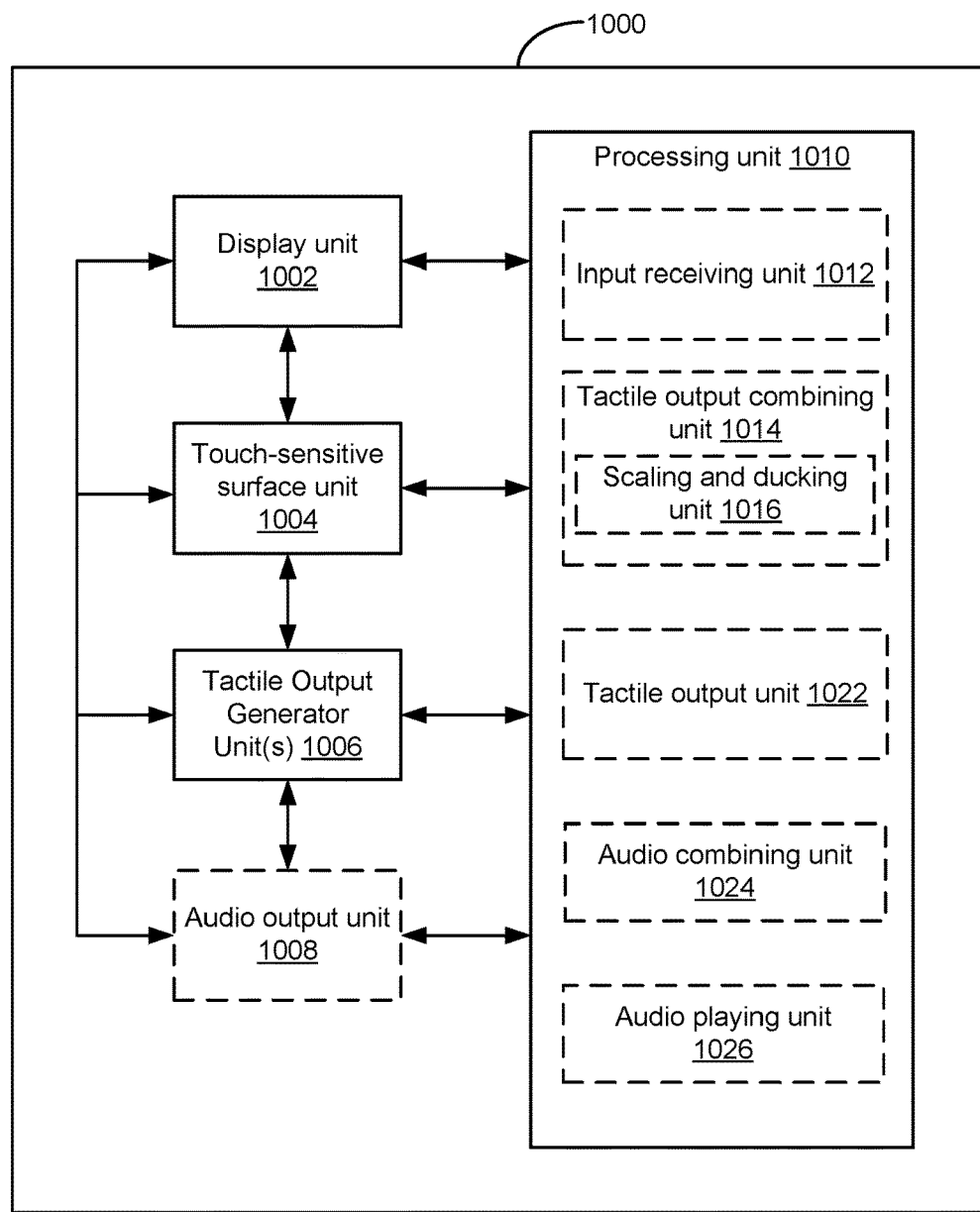

In accordance with some embodiments, FIG. 10 shows a functional block diagram of electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, electronic device 1000 includes display unit 1002 (e.g., including display 112) configured to display user interfaces, touch-sensitive surface unit 1004 configured to receive touch inputs (e.g., on a display surface of display unit 1002), a set of one or more tactile output generator unit(s) 1006 configured to generate one or more tactile outputs, and processing unit 1010 coupled with display unit 1002, touch-sensitive surface unit 1004, and one or more tactile output generator unit(s) 1006. In some embodiments, electronic device 1000 also includes audio output unit 1008 configured to generate audio outputs, also coupled with processing unit 1010. In some embodiments, processing unit 1010 includes one or more of the following sub-units: input receiving unit 1012, tactile output combining unit 1014, tactile output unit 1022, audio combining unit 1024, and audio playing unit 1026. In some embodiments, tactile output combining unit 1014 includes scaling and ducking unit 1016.

In some embodiments, processing unit 1010 is configured to receive (e.g., using input receiving unit 1012) a first set of one or more inputs corresponding to user interface elements displayed on display unit 1002, wherein the first set of one or more inputs corresponds to a first set of one or more tactile outputs. Processing unit 1010 is further configured to receive (e.g., using input receiving unit 1012) a second set of one or more inputs corresponding to the one or more hardware elements, wherein the second set of one or more inputs corresponds to a second set of one or more tactile outputs. Processing unit 1010 is further configured to, in response to the second set of one or more inputs, in accordance with a determination (e.g., made using tactile output combining unit 1014) that the first set of tactile outputs and the second set of one or more tactile outputs do not overlap, output (e.g., using tactile output unit 1022), with the set of one or more tactile output generator unit(s) 1006, a tactile output sequence that includes the first set of one or more tactile outputs and the second set of one or more tactile outputs. Processing unit 1010 is further configured to, in accordance with a determination that the first set of one or more tactile outputs and the second set of one or more tactile outputs overlap, output (e.g., using tactile output unit 1022), with the set of one or more tactile output generator unit(s) 1006, a modified tactile output sequence that is modified (e.g., using tactile output combining unit 1014 and/or scaling and ducking unit 1016) so as to emphasize the second set of one or more tactile outputs relative to the first set of one or more tactile outputs.

In some embodiments, the second set of one or more inputs corresponds to a click gesture, or a portion of a click gesture, performed using a respective hardware element.

In some embodiments, processing unit 1010 is configured to modify (e.g., using scaling and ducking unit 1016) the tactile output sequence so as to emphasize the second set of tactile outputs relative to the first set of tactile outputs by performing one or more of: increasing an amplitude of the second set of tactile outputs and decreasing an amplitude of the first set of tactile outputs.

In some embodiments, the modified tactile output sequence includes a first portion during which output of the first set of tactile outputs is gradually reduced (e.g., using scaling and ducking unit 1016) from a first output level to a second output level.

In some embodiments, the modified tactile output sequence includes a second portion of reduced tactile output.

In some embodiments, a duration of the second portion is selected based on a magnitude of the first portion.

In some embodiments, the modified tactile output sequence includes a third portion that is subsequent to the second portion and includes the second set of tactile outputs, and a duration of the third portion is longer than a duration of the second portion of reduced tactile output.

In some embodiments, the modified tactile output sequence includes: a third portion that includes the second set of tactile outputs and a fourth portion during which the first set of tactile outputs is output using an output level that is gradually increased from a third output level to a fourth output level, wherein the fourth portion is subsequent to the third portion.

In some embodiments, the modified tactile output sequence includes: a third portion that includes the second set of tactile outputs and a fifth portion of reduced tactile output, wherein the fifth portion is subsequent to the third portion.

In some embodiments, processing unit 1010 is further configured to play an audio output (e.g., using audio playing unit 1026) that is synchronized with the first set of one or more tactile outputs (e.g., using audio combining unit 1024) and is triggered by a same condition that triggered the first set of one or more tactile outputs. Processing unit 1010 is further configured to continue to play the audio output (e.g., using audio playing unit 1026) that is synchronized with the first set of one or more tactile outputs without modification independently of whether or not the second set of one or more tactile outputs is emphasized relative to the first set of one or more tactile outputs.

In some embodiments, processing unit 1010 is further configured to play first audio output (e.g., using audio playing unit 1026) that is synchronized with the first set of one or more tactile outputs (e.g., using audio combining unit 1024) and is triggered by a same condition that triggered the first set of one or more tactile outputs. Processing unit 1010 is configured to, while playing the first audio output, play second audio output (e.g., using audio playing unit 1026) that is synchronized) with the second set of one or more tactile outputs (e.g., using audio combining unit 1024) and is triggered by a same condition that triggered the second set of one or more tactile outputs, wherein the first audio output is modified to emphasize the second audio output while playing the second audio output.

In some embodiments, processing unit 1010 is configured to, while emphasizing the second set of one or more tactile outputs over the first set of one or more tactile outputs, continue to process the first set of one or more inputs, including mixing together (e.g., using tactile output combining unit 1014) tactile outputs for the first set of one or more inputs.

In some embodiments, a magnitude of the first audio output is user-selected and/or a magnitude of the second audio output is user-selected.

In some embodiments, processing unit 1010 is configured to, in response to the second set of one or more inputs, play audio output (e.g., using audio playing unit 1026) that is triggered by a same condition that triggered the second set of one or more tactile outputs, wherein the audio output starts after the second set of one or more tactile outputs starts.

In some embodiments, outputting the modified tactile sequence includes reducing a scale (e.g., using scaling and ducking unit 1016) of at least a portion of the first set of one or more tactile outputs that overlaps with the second set of one or more tactile outputs.

In some embodiments, processing unit 1010 is configured to, in accordance with a determination (e.g., made using tactile output combining unit and/or look-ahead tactile output limiting unit 920) that a first portion of the combined tactile outputs meets output limiting criteria for the set of one or more tactile output generator unit(s) 1006, reduce a scale (e.g., using scaling and ducking unit 1016) of the combined tactile outputs during at least a second portion of the combined tactile outputs immediately preceding the first portion of the combined tactile outputs and output (e.g., using tactile output unit 1022), with the set of one or more tactile output generator unit(s) 1006, a tactile output sequence based on the combined tactile outputs that includes the second portion of the combined tactile outputs with reduced scale.

Figure 11:
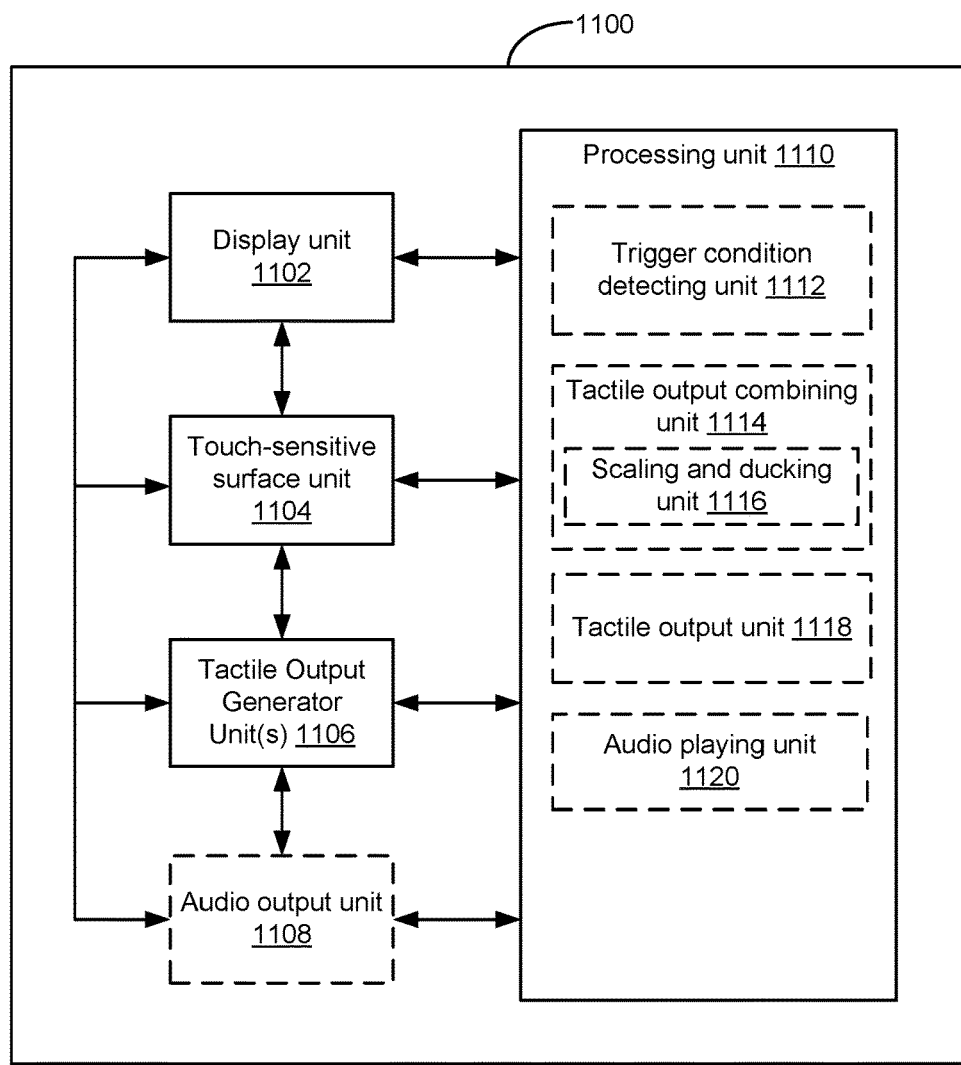

In accordance with some embodiments, FIG. 11 shows a functional block diagram of electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, electronic device 1100 includes display unit 1102 (e.g., including display 112) configured to display one or more user interfaces, touch-sensitive surface unit 1104 configured to receive touch inputs (e.g., on a surface, such as a display surface of display unit 1102), a set of one or more tactile output generator unit(s) 1106 configured to generate one or more tactile outputs, and processing unit 1110 coupled with display unit 1102, touch-sensitive surface unit 1104, and one or more tactile output generator unit(s) 1106. In some embodiments, electronic device 1100 includes audio output unit 1108, also coupled with processing unit 1110. In some embodiments, processing unit 1110 includes one or more of the following sub-units: trigger condition detecting unit 1112, tactile output combining unit 1114, tactile output unit 1118, and audio playing unit 1120. In some embodiments, tactile output combining unit 1114 includes scaling and ducking unit 1116.

In some embodiments, processing unit 1110 is configured to detect a triggering condition (e.g., using trigger condition detecting unit 1112) for a first set of one or more tactile outputs with a first priority and detect a triggering condition (e.g., using trigger condition detecting unit 1112) for a second set of one or more tactile outputs with a second priority. Processing unit 1110 is configured to, in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs, in accordance with a determination that the first priority is higher than the second priority, reduce a scale (e.g., using scaling and ducking unit 1116) of at least a portion of the second set of one or more tactile outputs that overlaps with the first set of one or more tactile outputs. Processing unit 1110 is configured to, in accordance with a determination that the second priority is higher than the first priority, reduce a scale (e.g., using scaling and ducking unit 1116) of at least a portion of the first set of one or more tactile outputs that overlaps with the second set of one or more tactile outputs.

In some embodiments, processing unit 1110 is further configured to enable generation of combined tactile outputs (e.g., using tactile output unit 1118) by combining at least the first set of one or more tactile outputs (e.g., using tactile output combining unit 1114), including any portion thereof with reduced scale, and the second set of one or more tactile outputs, including any portion thereof with reduced scale, and output (e.g., using tactile output unit 1118), with the set of one or more tactile output generator unit(s) 1106, a tactile output sequence based on the combined tactile outputs.

In some embodiments, the tactile output sequence includes a first portion during which output of the first set of tactile outputs is gradually reduced from a first output level to a second output level.

In some embodiments, processing unit 1110 is configured to, in accordance with a determination that the first priority is the same as the second priority, combine (e.g., using tactile output combining unit 1114 and/or scaling and ducking unit 1116) the first set of one or more tactile outputs with the second set of one or more tactile outputs without reducing a scale of the first set of one or more tactile outputs relative to the scale of the second set of one or more tactile outputs.

In some embodiments, processing unit 1110 is configured to, in response to detecting the triggering condition for the first set of one or more tactile outputs and the triggering condition for the second set of one or more tactile outputs and in accordance with a determination that the first set of one or more tactile outputs are not scheduled to overlap with other tactile outputs, output (e.g., using tactile output unit 1118) of the first set of one or more tactile outputs and the second set of one or more tactile outputs without reducing a scale of the first set of one or more tactile outputs and the second set of one or more tactile outputs.

In some embodiments, processing unit 1110 is further configured to detect a triggering condition (e.g., using trigger condition detecting unit 1112) for a third set of one or more tactile outputs with a third priority that is higher than the second priority and the first priority. Processing unit 1110 is configured to, in response to detecting the triggering condition for the third set of one or more tactile outputs and in accordance with a determination that the third set of one or more tactile outputs are scheduled to at least partially overlap with the first set of one or more tactile outputs and the second set of one or more tactile outputs, reduce a scale (e.g., using scaling and ducking unit 1116) of at least a portion of the first set of one or more tactile outputs that overlaps with the third set of one or more tactile outputs and reduce a scale (e.g., using scaling and ducking unit 1116) of at least a portion of the second set of one or more tactile outputs that overlaps with the third set of one or more tactile outputs.

In some embodiments, the third set of one or more tactile outputs with the third priority corresponds to one or more hardware elements. In some embodiments, the first set of one or more tactile outputs with the first priority corresponds to asynchronous events. In some embodiments, the second set of one or more tactile outputs with the second priority corresponds to synchronous events.

In some embodiments, processing unit 1110 is further configured to, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the first priority is higher than the second priority, in conjunction with reducing the scale of the second set of one or more tactile outputs with the second priority, output (e.g., using tactile output unit 1118) of the first set of one or more tactile outputs with the first priority.

In some embodiments, processing unit 1110 is further configured to, in response to detecting the triggering condition for the first set of one or more tactile outputs and the triggering condition for the second set of one or more tactile outputs and in accordance with the determination that the first set of one or more tactile outputs are scheduled to at least partially overlap and in accordance with the determination that the second priority is higher than the first priority, in conjunction with reducing the scale of the first set of tactile outputs corresponding to the first priority, output (e.g., using tactile output unit 1118), with the set of one or more tactile output generator units 1106, of the second set of one or more tactile outputs with the second priority.

In some embodiments, processing unit 1110 is further configured to play an audio output (e.g., using audio playing unit 1120) that is synchronized with a first set of tactile outputs or the second set of tactile outputs, and continue to play the audio output (e.g., using audio playing unit 1120) without modification independently of whether or not the scale of at least the portion of the first set of one or more tactile outputs that overlaps with the second set of one or more tactile outputs or the scale of at least the portion of the second set of one or more tactile outputs that overlaps with the first set of one or more tactile outputs is reduced.

In some embodiments, processing unit 1110 is further configured to receive a first set of one or more inputs (e.g., using trigger condition detecting unit 1112) corresponding to user interface elements displayed on display unit 1102, wherein the first set of one or more inputs corresponds to the first set of one or more tactile outputs having the first priority, and receive a second set of one or more inputs (e.g., using trigger condition detecting unit 1112) corresponding to one or more hardware elements, wherein the second set of one or more inputs corresponds to the second set of one or more tactile outputs having the second priority, wherein the second priority is higher than the first priority.

In some embodiments, the second set of one or more inputs corresponds to a click gesture, or a portion of a click gesture, performed using a respective hardware element.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6F, 7A-7D and 8A-8D are, optionally, implemented by components depicted in FIGS. 1A-1B or FIG. 3. For example, receiving input operations 602, 702 and detection operations 802, 804 are, optionally, implemented by contact/motion module 130; outputting combined tactile outputs and tactile output sequence operations 610, 614, 712, 714 and 852 are optionally implemented by haptic feedback module 133; while some other operations are, optionally, implemented by event sorter 170, event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display, a touch-sensitive surface, and a set of one or more tactile output generators:
        detecting a triggering condition for a first set of one or more tactile outputs with a first priority;
        detecting a triggering condition for a second set of one or more tactile outputs with a second priority; and
        in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs:
            in accordance with a determination that the first priority is higher than the second priority, reducing a scale of at least a portion of the second set of one or more tactile outputs that overlaps with the first set of one or more tactile outputs; and
            in accordance with a determination that the second priority is higher than the first priority, reducing a scale of at least a portion of the first set of one or more tactile outputs that overlaps with the second set of one or more tactile outputs.

2. The method of claim 1, including:
    generating combined tactile outputs by combining at least the first set of one or more tactile outputs, including any portion thereof with reduced scale, and the second set of one or more tactile outputs, including any portion thereof with reduced scale; and
    outputting, with the set of one or more tactile output generators, a tactile output sequence based on the combined tactile outputs.

3. The method of claim 2, wherein the tactile output sequence includes a first portion during which output of the first set of one or more tactile outputs is gradually reduced from a first output level to a second output level.

4. The method of claim 1, including, in accordance with a determination that the first priority is the same as the second priority, combining the first set of one or more tactile outputs with the second set of one or more tactile outputs without reducing a scale of the first set of one or more tactile outputs relative to a scale of the second set of one or more tactile outputs.

5. The method of claim 1, including, in response to detecting the triggering condition for the first set of one or more tactile outputs and the triggering condition for the second set of one or more tactile outputs and in accordance with a determination that the first set of one or more tactile outputs is not scheduled to overlap with other tactile outputs, outputting, with the set of one or more tactile output generators, the first set of one or more tactile outputs and the second set of one or more tactile outputs without reducing a scale of the first set of one or more tactile outputs and the second set of one or more tactile outputs.

6. The method of claim 1, including:
    detecting a triggering condition for a third set of one or more tactile outputs with a third priority that is higher than the second priority and the first priority; and
    in response to detecting the triggering condition for the third set of one or more tactile outputs and in accordance with a determination that the third set of one or more tactile outputs are scheduled to at least partially overlap with the first set of one or more tactile outputs and the second set of one or more tactile outputs:
        reducing a scale of at least a portion of the first set of one or more tactile outputs that overlaps with the third set of one or more tactile outputs; and
        reducing a scale of at least a portion of the second set of one or more tactile outputs that overlaps with the third set of one or more tactile outputs.

7. The method of claim 6, wherein the third set of one or more tactile outputs with the third priority corresponds to one or more hardware elements distinct from the display.

8. The method of claim 1, wherein the first set of one or more tactile outputs with the first priority corresponds to asynchronous events.

9. The method of claim 1, wherein the second set of one or more tactile outputs with the second priority corresponds to synchronous events.

10. The method of claim 1, including, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the first priority is higher than the second priority, in conjunction with reducing the scale of at least the portion of the second set of one or more tactile outputs with the second priority, outputting the first set of one or more tactile outputs with the first priority.

11. The method of claim 1, including, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the second priority is higher than the first priority, in conjunction with reducing the scale of at least the portion of the first set of one or more tactile outputs with the first priority, outputting the second set of one or more tactile outputs with the second priority.

12. The method of claim 1, including:
    playing an audio output that is synchronized with the first set of one or more tactile outputs or the second set of one or more tactile outputs; and
    continuing to play the audio output without modification independently of whether or not the scale of at least the portion of the first set of one or more tactile outputs that overlaps with the second set of one or more tactile outputs or the scale of at least the portion of the second set of one or more tactile outputs that overlaps with the first set of one or more tactile outputs is reduced.

13. The method of claim 1, further comprising:
receiving a first set of one or more inputs corresponding to user interface elements displayed on the display, wherein the first set of one or more inputs corresponds to the first set of one or more tactile outputs with the first priority; and
receiving a second set of one or more inputs corresponding to one or more hardware elements distinct from the display, wherein the second set of one or more inputs corresponds to the second set of one or more tactile outputs with the second priority;
wherein the second priority is higher than the first priority.

14. The method of claim 13, wherein the second set of one or more inputs corresponds to a click gesture, or a portion of a click gesture, performed using a respective hardware element.

15. An electronic device, comprising:
a display;
a touch-sensitive surface;
a set of one or more tactile output generators;
one or more processors;
memory; and
one or more programs, wherein the one or more programs are stored in the memory and configured to be executed by the one or more processors, the one or more programs including instructions for:
detecting a triggering condition for a first set of one or more tactile outputs with a first priority;
detecting a triggering condition for a second set of one or more tactile outputs with a second priority; and
in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs:
in accordance with a determination that the first priority is higher than the second priority, reducing a scale of at least a portion of the second set of one or more tactile outputs that overlaps with the first set of one or more tactile outputs; and
in accordance with a determination that the second priority is higher than the first priority, reducing a scale of at least a portion of the first set of one or more tactile outputs that overlaps with the second set of one or more tactile outputs.

16. The electronic device of claim 15, wherein the one or more programs include instructions for:
generating combined tactile outputs by combining at least the first set of one or more tactile outputs, including any portion thereof with reduced scale, and the second set of one or more tactile outputs, including any portion thereof with reduced scale; and
outputting, with the set of one or more tactile output generators, a tactile output sequence based on the combined tactile outputs.

17. The electronic device of claim 16, wherein the tactile output sequence includes a first portion during which output of the first set of one or more tactile outputs is gradually reduced from a first output level to a second output level.

18. The electronic device of claim 15, wherein the one or more programs include instructions for, in accordance with a determination that the first priority is the same as the second priority, combining the first set of one or more tactile outputs with the second set of one or more tactile outputs without reducing a scale of the first set of one or more tactile outputs relative to a scale of the second set of one or more tactile outputs.

19. The electronic device of claim 15, wherein the one or more programs include instructions for, in response to detecting the triggering condition for the first set of one or more tactile outputs and the triggering condition for the second set of one or more tactile outputs and in accordance with a determination that the first set of one or more tactile outputs is not scheduled to overlap with other tactile outputs, outputting, with the set of one or more tactile output generators, the first set of one or more tactile outputs and the second set of one or more tactile outputs without reducing a scale of the first set of one or more tactile outputs and the second set of one or more tactile outputs.

20. The electronic device of claim 15, wherein the one or more programs include instructions for:
detecting a triggering condition for a third set of one or more tactile outputs with a third priority that is higher than the second priority and the first priority; and
in response to detecting the triggering condition for the third set of one or more tactile outputs and in accordance with a determination that the third set of one or more tactile outputs are scheduled to at least partially overlap with the first set of one or more tactile outputs and the second set of one or more tactile outputs:
reducing a scale of at least a portion of the first set of one or more tactile outputs that overlaps with the third set of one or more tactile outputs; and
reducing a scale of at least a portion of the second set of one or more tactile outputs that overlaps with the third set of one or more tactile outputs.

21. The electronic device of claim 20, wherein the third set of one or more tactile outputs with the third priority corresponds to one or more hardware elements distinct from the display.

22. The electronic device of claim 15, wherein the first set of one or more tactile outputs with the first priority corresponds to asynchronous events.

23. The electronic device of claim 15, wherein the second set of one or more tactile outputs with the second priority corresponds to synchronous events.

24. The electronic device of claim 15, wherein the one or more programs include instructions for, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the first priority is higher than the second priority, in conjunction with reducing the scale of at least the portion of the second set of one or more tactile outputs with the second priority, outputting the first set of one or more tactile outputs with the first priority.

25. The electronic device of claim 15, wherein the one or more programs include instructions for, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the second priority is higher than the first priority, in conjunction with reducing the scale of at least the portion of the first set of one or more tactile outputs with the first priority, outputting the second set of one or more tactile outputs with the second priority.

26. The electronic device of claim 15, wherein the one or more programs include instructions for:
   playing an audio output that is synchronized with the first set of one or more tactile outputs or the second set of one or more tactile outputs; and
   continuing to play the audio output without modification independently of whether or not the scale of at least the portion of the first set of one or more tactile outputs that overlaps with the second set of one or more tactile outputs or the scale of at least the portion of the second set of one or more tactile outputs that overlaps with the first set of one or more tactile outputs is reduced.

27. The electronic device of claim 15, wherein the one or more programs include instructions for:
   receiving a first set of one or more inputs corresponding to user interface elements displayed on the display, wherein the first set of one or more inputs corresponds to the first set of one or more tactile outputs with the first priority; and
   receiving a second set of one or more inputs corresponding to one or more hardware elements distinct from the display, wherein the second set of one or more inputs corresponds to the second set of one or more tactile outputs with the second priority;
   wherein the second priority is higher than the first priority.

28. The electronic device of claim 27, wherein the second set of one or more inputs corresponds to a click gesture, or a portion of a click gesture, performed using a respective hardware element.

29. A non-transitory computer readable storage medium storing one or more programs, the one or more programs comprising instructions, which when executed by an electronic device with a display, a touch-sensitive surface, and a set of one or more tactile output generators, cause the device to:
   detect a triggering condition for a first set of one or more tactile outputs with a first priority;
   detect a triggering condition for a second set of one or more tactile outputs with a second priority; and
   in response to detecting the triggering condition for the first set of one or more tactile outputs and the triggering condition for the second set of one or more tactile outputs and in accordance with a determination that the first set of one or more tactile outputs are scheduled to at least partially overlap with the second set of one or more tactile outputs:
      in accordance with a determination that the first priority is higher than the second priority, reduce a scale of at least a portion of the second set of one or more tactile outputs that overlaps with the first set of one or more tactile outputs; and
      in accordance with a determination that the second priority is higher than the first priority, reduce a scale of at least a portion of the first set of one or more tactile outputs that overlaps with the second set of one or more tactile outputs.

30. The non-transitory computer readable storage medium of claim 29, wherein the one or more programs include instructions that, when executed by the electronic device, cause the device to:
   generate combined tactile outputs by combining at least the first set of one or more tactile outputs, including any portion thereof with reduced scale, and the second set of one or more tactile outputs, including any portion thereof with reduced scale; and
   output, with the set of one or more tactile output generators, a tactile output sequence based on the combined tactile outputs.

31. The non-transitory computer readable storage medium of claim 30, wherein the tactile output sequence includes a first portion during which output of the first set of one or more tactile outputs is gradually reduced from a first output level to a second output level.

32. The non-transitory computer readable storage medium of claim 29, wherein the one or more programs include instructions that, when executed by the electronic device, cause the device, in accordance with a determination that the first priority is the same as the second priority, to combine the first set of one or more tactile outputs with the second set of one or more tactile outputs without reducing a scale of the first set of one or more tactile outputs relative to a scale of the second set of one or more tactile outputs.

33. The non-transitory computer readable storage medium of claim 29, wherein the one or more programs include instructions that, when executed by the electronic device, cause the device, in response to detecting the triggering condition for the first set of one or more tactile outputs and the triggering condition for the second set of one or more tactile outputs and in accordance with a determination that the first set of one or more tactile outputs is not scheduled to overlap with other tactile outputs, to output, with the set of one or more tactile output generators, the first set of one or more tactile outputs and the second set of one or more tactile outputs without reducing a scale of the first set of one or more tactile outputs and the second set of one or more tactile outputs.

34. The non-transitory computer readable storage medium of claim 29, wherein the one or more programs include instructions that, when executed by the electronic device, cause the device to:
   detect a triggering condition for a third set of one or more tactile outputs with a third priority that is higher than the second priority and the first priority; and
   in response to detecting the triggering condition for the third set of one or more tactile outputs and in accordance with a determination that the third set of one or more tactile outputs are scheduled to at least partially overlap with the first set of one or more tactile outputs and the second set of one or more tactile outputs:
      reduce a scale of at least a portion of the first set of one or more tactile outputs that overlaps with the third set of one or more tactile outputs; and
      reduce a scale of at least a portion of the second set of one or more tactile outputs that overlaps with the third set of one or more tactile outputs.

35. The non-transitory computer readable storage medium of claim 34, wherein the third set of one or more tactile outputs with the third priority corresponds to one or more hardware elements distinct from the display.

36. The non-transitory computer readable storage medium of claim 29, wherein the first set of one or more tactile outputs with the first priority corresponds to asynchronous events.

37. The non-transitory computer readable storage medium of claim 29, wherein the second set of one or more tactile outputs with the second priority corresponds to synchronous events.

38. The non-transitory computer readable storage medium of claim 29, wherein the one or more programs include instructions that, when executed by the electronic device, cause the device, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the first priority is higher than the second priority, in conjunction with reducing the scale of at least the portion of the second set of one or more tactile outputs with the second priority, to output the first set of one or more tactile outputs with the first priority.

39. The non-transitory computer readable storage medium of claim 29, wherein the one or more programs include instructions that, when executed by the electronic device, cause the device, in response to detecting the triggering condition for the first set of one or more tactile outputs and the triggering condition for the second set of one or more tactile outputs and in accordance with the determination that the first set of one or more tactile outputs are scheduled to at least partially overlap with the second set of one or more tactile outputs and in accordance with the determination that the second priority is higher than the first priority, in conjunction with reducing the scale of at least the portion of the first set of one or more tactile outputs with the first priority, to output the second set of one or more tactile outputs with the second priority.

40. The non-transitory computer readable storage medium of claim 29, wherein the one or more programs include instructions that, when executed by the electronic device, cause the device to:

play an audio output that is synchronized with the first set of one or more tactile outputs or the second set of one or more tactile outputs; and continue to play the audio output without modification independently of whether or not the scale of at least the portion of the first set of one or more tactile outputs that overlaps with the second set of one or more tactile outputs or the scale of at least the portion of the second set of one or more tactile outputs that overlaps with the first set of one or more tactile outputs is reduced.

41. The non-transitory computer readable storage medium of claim 29, wherein the one or more programs include instructions that, when executed by the electronic device, cause the device to:

receive a first set of one or more inputs corresponding to user interface elements displayed on the display, wherein the first set of one or more inputs corresponds to the first set of one or more tactile outputs with the first priority; and receive a second set of one or more inputs corresponding to one or more hardware elements distinct from the display, wherein the second set of one or more inputs corresponds to the second set of one or more tactile outputs with the second priority;

wherein the second priority is higher than the first priority.

42. The non-transitory computer readable storage medium of claim 41, wherein the second set of one or more inputs corresponds to a click gesture, or a portion of a click gesture, performed using a respective hardware element.

* * * * *